(12) United States Patent
John et al.

(10) Patent No.: US 9,449,757 B2
(45) Date of Patent: Sep. 20, 2016

(54) SYSTEMS AND METHODS FOR WIRELESS POWER SYSTEM WITH IMPROVED PERFORMANCE AND/OR EASE OF USE

(71) Applicant: WiTricity Corporation, Watertown, MA (US)

(72) Inventors: Michael Sasha John, Larchmont, NY (US); Katherine L. Hall, Arlington, MA (US); Konrad J. Kulikowski, North Andover, MA (US); Morris P. Kesler, Bedford, MA (US); Andre B. Kurs, Chestnut Hill, MA (US); Arunanshu M. Roy, Cambridge, MA (US); Gozde Guckaya, Belmont, MA (US)

(73) Assignee: WiTricity Corporation, Watertown, MA (US)

( * ) Notice: Subject to any disclaimer, the term of this patent is extended or adjusted under 35 U.S.C. 154(b) by 455 days.

(21) Appl. No.: 14/082,426

(22) Filed: Nov. 18, 2013

(65) Prior Publication Data

US 2014/0139037 A1 May 22, 2014

Related U.S. Application Data

(60) Provisional application No. 61/727,260, filed on Nov. 16, 2012.

(51) Int. Cl.
*H01F 27/42* (2006.01)
*H01F 37/00* (2006.01)
(Continued)

(52) U.S. Cl.
CPC ............. *H01F 38/14* (2013.01); *G01R 31/088* (2013.01); *H02J 5/005* (2013.01); *H02J 17/00* (2013.01); *H04B 5/0037* (2013.01); *H04B 5/0075* (2013.01)

(58) Field of Classification Search
CPC ...... H01F 38/14; G01R 31/088; H02J 5/005; H02J 17/00; H04B 5/0037; H04B 5/0075
USPC .......................................................... 307/104
See application file for complete search history.

(56) References Cited

U.S. PATENT DOCUMENTS 645,576 A 3/1900 Telsa
649,621 A 5/1900 Tesla
(Continued)

FOREIGN PATENT DOCUMENTS

CA 142352 8/1912
CN 102239633 11/2011
(Continued)

OTHER PUBLICATIONS

"Intel CTO Says Gap between Humans, Machines Will Close by 2050", *Intel News Release*, (See intel.com/ . . . /20080821comp. htm?iid=S . . . ) (Printed Nov. 6, 2009).
(Continued)

*Primary Examiner* — Hal Kaplan
(74) *Attorney, Agent, or Firm* — Fish & Richardson P.C.

(57) ABSTRACT

A wireless power network including multiple electromagnetic resonators each capable of storing electromagnetic energy at a resonant frequency is disclosed. The multiple resonators include: a first resonator configured to be coupled to a power source to receive power from the power source; a second resonator configured to be coupled to a load to provide power to the load, and one or more intermediate resonators. The first resonator is configured to provide power from the power source to the second resonator through the one or more intermediate resonators. At least a first pair of resonators among the multiple resonators is configured to exchange power wirelessly, and at least a second pair of the resonators among the multiple resonators is configured to exchange power through a wired electrically conductive connection.

19 Claims, 32 Drawing Sheets

(51) Int. Cl.
  *H01F 38/14* (2006.01)
  *G01R 31/08* (2006.01)
  *H02J 5/00* (2016.01)
  *H04B 5/00* (2006.01)
  *H02J 17/00* (2006.01)

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |

(56) References Cited

U.S. PATENT DOCUMENTS

| | | |
|---|---|---|
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 8,912,687 B2 * | 12/2014 | Kesler .................. B60L 11/182 307/10.1 |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |

(56) References Cited

U.S. PATENT DOCUMENTS

| | | |
|---|---|---|
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |

(56) References Cited

U.S. PATENT DOCUMENTS

| | | |
|---|---|---|
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Capanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |

(56) References Cited

U.S. PATENT DOCUMENTS

| | | |
|---|---|---|
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Kesler et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1 | 3/2014 | Keeling |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2357716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |

(56) References Cited

FOREIGN PATENT DOCUMENTS

| | | |
|---|---|---|
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Physics Update, Unwired Energy", *Physics Today*, pp. 26, (Jan. 2007) (See http://arxiv.org/abs/physics/0611063.).
"In pictures: A year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.
Aristeidis Karalis et al., "Efficient Wireless non-radiative mid-range energy transfer", *Annals of Physics*, vol. 323, pp. 34-48 (2008).
Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Berardelli, P., "Outlets Are Out", ScienceNOW Daily News, Science Now, http://sciencenow.sciencemag.org/ cgi/content/full/2006/1114/2, (Nov. 14, 2006) 2 pages.
Biever, C., "Evanescent coupling could power gadgets wirelessly", NewScientistsTech.com, http://www. newscientisttech.com/article.ns?id=dn1 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).

Boyle, A., "Electro-nirvana? Not so fast", MSNBC, http://lcosmiclog.msnbc.msn.com/_news/2007/06/08/4350760- electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABC News Internet Ventures, (Dec. 12, 2006) 1 page.
Chinaview, ,"Scientists light bulb with 'wireless electricity'",www.Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).

(56) References Cited

OTHER PUBLICATIONS

Gary Peterson, "MIT WiTricity Not So Original After All", *Feed Line No. 9*, (See http://www.tfcbooks.com/articles/witricity.htm) printed Nov. 12, 2009).
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs-",(Science Editor), Telegraph.co.uk, http://www. telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).

Lee, "RFID Coil Design," Microchip Technology Inc., AN678, 21 pages (1998).
Liang et al., "Silicon waveguide two-photon absorption detector at 1.5 µm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, ,"The world's first sheet-type wireless power transmission system: Will a socket be replaced by e-wall?",Public Relations Office, School of Engineering, University of Tokyo, Japan,Dec. 12, 2006,4 pages.
Presstv, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.

(56) References Cited

OTHER PUBLICATIONS

Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M., "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).

\* cited by examiner

SYSTEMS AND METHODS FOR WIRELESS POWER SYSTEM WITH IMPROVED PERFORMANCE AND/OR EASE OF USE

CROSS REFERENCE TO RELATED APPLICATIONS

This application claims priority under 35 U.S.C. §119(e) to U.S. Provisional Application No. 61/727,260 filed Nov. 16, 2012 and entitled "Systems and Methods for Wireless Power System with Improved Efficiency".

BACKGROUND

1. Field

This disclosure relates to wireless energy transfer to power devices, also referred to as wireless power transmission.

2. Description of the Related Art

Energy or power may be transferred wirelessly using a variety of known radiative, or far-field, and non-radiative, or near-field, techniques as detailed, for example, in commonly owned U.S. patent application Ser. No. 12/613,686 published on May 6, 2010 as US 2010/010909445 and entitled "Wireless Energy Transfer Systems," U.S. patent application Ser. No. 12/860,375 published on Dec. 9, 2010 as 2010/0308939 and entitled "Integrated Resonator-Shield Structures," U.S. patent application Ser. No. 13/222,915 published on Mar. 15, 2012 as 2012/0062345 and entitled "Low Resistance Electrical Conductor," U.S. patent application Ser. No. 13/283,811 published on Oct. 4, 2012 as 2012/0248981 and entitled "Multi-Resonator Wireless Energy Transfer for Lighting," the contents of which are incorporated by reference.

Inefficient power transfer may be acceptable for data transmission but is not practical for transferring electrical energy for the purpose of doing work, such as for powering or charging electrical devices. Inefficient power transfer may not be preferred either because insufficient power may be transferred in order for a device to operate correctly, or because it will waste energy which is lost during transmission/reception.

There are various manners of improving the transfer/reception efficiency of some wireless energy transfer schemes. One method is to use directional antennas to confine and preferentially direct the radiated energy towards a receiver. However, these directed radiation schemes may require an uninterruptible line-of-sight and potentially complicated tracking and steering mechanisms in the case of mobile transmitters and/or receivers. A known non-radiative, or near-field, wireless energy transfer scheme, often referred to as either induction or traditional induction, does not (intentionally) radiate power, but uses an oscillating current passing through a primary coil, to generate an oscillating magnetic near-field that induces currents in a near-by receiving or secondary coil. Traditional induction schemes have demonstrated the transmission of modest to large amounts of power, however only over very short distances and with very small offset tolerances between the primary power supply unit and the secondary receiver unit. Electric transformers and proximity chargers are examples of devices that utilize this known short range, near-field energy transfer scheme.

Therefore, a need exists for a wireless power transfer scheme that is capable of transferring useful amounts of electrical power over mid-range distances or alignment offsets. Such a wireless power transfer scheme should enable useful energy transfer over greater distances and alignment offsets than those realized with traditional induction schemes, but without the limitations and risks inherent in radiative transmission schemes.

A non-radiative or near-field wireless energy transfer scheme that is capable of transmitting useful amounts of power over mid-range distances and alignment offsets uses coupled electromagnetic resonators with long-lived oscillatory resonant modes to transfer power from a power supply to a power drain. The technique is general and may be applied to a wide range of resonators. If the resonators are designed such that the energy stored by the electric field is primarily confined within the structure and the energy stored by the magnetic field is primarily in the region surrounding the resonator, the energy exchange may be mediated primarily by the resonant magnetic near-field and the resonators may be referred to as magnetic resonators.

SUMMARY

Resonators and resonator assemblies may be positioned to distribute wireless energy over an area. The wireless energy transfer resonators and components, including repeaters, that may be used have been described in, for example, in commonly owned U.S. Pat. No. 8,461,719 issued Jun. 11, 2013 and entitled "Wireless energy transfer systems," U.S. patent application Ser. No. 12/720,866 published on Oct. 14, 2010 as U.S. publication 2010/0259108 A1 and entitled "Wireless energy transfer using repeater resonators". The modeling and simulation of wireless energy transfer systems that may be used have been described in, for example, in commonly owned U.S. patent application Ser. No. 13/668,756 published on Jun. 20, 2012 as U.S. publication 2012/0159956 A1 and entitled "Wireless energy transfer modeling tool," the contents of which are incorporated by reference.

There is a need for technologies, devices, methods, apparati and the like, for installing, controlling, diagnosing, initiating, monitoring, adjusting, and the like, multi-resonator wireless energy systems. For example, a multi-resonator wireless power transfer system in a home may have one or more wireless power transmitters or sources, one or more wireless power receivers or devices, one or more wireless power repeaters, one or more resonators whose function may change or may simultaneously be that of a source, a device, and/or a repeater. Such a system may comprise a wireless power system manager. Further, such a system may need to account for objects which may interfere with the electromagnetic fields, for changes in electrical characteristics associated with temperature and/or other environmental factors and other factors which may need to be addressed and adjusted for in order to make wireless power transmission operate effectively and efficiently.

Therefore a need exists for simulating, configuring, calibrating, adjusting, and the like, the components of wireless power transmission systems, so that deployed components and systems are capable of transferring useful amounts of electrical power over mid-range distances. The solutions disclosed herein may allow wireless power transfer to occur more efficiently and effectively by assisting users to overcome potential wireless power system hurdles such as perturbing objects, shadowing, temperature fluctuations, broken or detuned system components, varying demands by devices powered by the system, and alignment offsets. Such wireless power transfer set-up and maintenance schemes (including related processes and protocols) should enable useful energy transfer over greater distances and with improved efficiency and reliability, than that which would be realized in the absence of these provisions.

There are disclosed herein wireless energy transfer schemes that are capable of transmitting useful amounts of power over mid-range distances and alignment offsets. In one embodiment, these inventive techniques can use coupled electromagnetic resonators with long-lived oscillatory resonant modes to transfer power from a power supply to a power drain, and possibly along repeater resonators that allow energy to "hop" (provide efficient wireless energy transfer) from one resonator to another. The resonant techniques described herein are general and may be applied to a wide range of resonators, even where the specific examples disclosed herein relate to electromagnetic resonators.

Note that the set-up, calibration, adjustment, and maintenance processes, protocols, and parameters disclosed herein may be applied to both electric and magnetic resonators, as well as other types of wireless energy systems such as directional, RF, radiative, traditional inductive, and other types of near, medium, and far-field wireless power systems and methods.

The omni-directional but stationary (non-lossy) nature of the near-fields of some resonators we will disclose enables efficient wireless energy transfer over mid-range distances, over a wide range of directions and resonator orientations, suitable for charging, powering, or simultaneously powering and charging a variety of electronic devices. As a result, a system may have a wide variety of possible applications where a first resonator, connected to a power source, is in one location, and a second resonator, potentially connected to electrical/electronic devices, batteries, powering or charging circuits, and the like, is at a second location, and where the distance from the first resonator to the second resonator is on the order of centimeters to meters.

For example, a first resonator connected to the wired electricity grid could be placed on the ceiling of a room, while other resonators connected to devices, such as robots, vehicles, computers, communication devices, medical devices, and the like, move about within the room. These devices can constantly, intermittently, or by request receive power wirelessly from the source resonator, which here may be configured as a wireless energy transmitter. From this one example, it is obvious that there are many applications where the systems and methods disclosed herein could provide wireless power.

Energy exchange between two electromagnetic resonators can be improved when the resonators are tuned to substantially the same frequency and when the losses in the system are minimal Wireless energy transfer systems may be designed so that the "coupling time" between resonators is much shorter than the resonators' "loss-times". In embodiments, wireless power transfer systems may be periodically, programmably, dynamically, or otherwise adjusted to maintain operating parameters and conditions that are conducive to efficient and effective power transfer. Effects due to temperature variations, variation in component integrity and efficiency and other potential obstacles such as shadowing or Q-perturbing objects may be addressed and compensated for in order to maintain a preferred level of system performance and avoid unwanted and unexpected deviations of wireless power stability and efficiency.

The systems and methods described herein may, in some examples, utilize high quality factor (high-Q) resonators with low intrinsic-loss rates. In addition, the systems and methods described herein may use sub-wavelength resonators with near-fields that extend significantly beyond the characteristic sizes of the resonators, so that the near-fields of the resonators that exchange energy overlap at mid-range distances. This is a regime of operation that differs significantly from traditional induction designs.

In the power transmission schemes disclosed herein, multiple devices may be charged or powered simultaneously in parallel or power delivery to multiple devices may be serialized such that one or more devices receive power for a period of time after which power delivery may be switched to other devices, and this switching may further include switching along different transmission pathways. Multiple devices may share power from one or more sources with one or more other devices either simultaneously, or in a time multiplexed manner, or in a frequency multiplexed manner, or in a spatially multiplexed manner (e.g. along different pathways). Further power may be transmitted/used in an orientation multiplexed manner, or in any combination of time and frequency and spatial and orientation multiplexing. Multiple resonator devices may share power with each other, with at least one device being reconfigured continuously, intermittently, periodically, occasionally, or temporarily, to operate as at least one of a wireless power source, transmitter, system manager, or repeater. It would be understood by one of ordinary skill in the art that there are a variety of ways to power and/or charge devices, and the variety of ways could be applied to the technologies and applications described herein.

Throughout this disclosure we may refer to certain circuit components such as capacitors, inductors, resistors, CPUs, memory, power supplies, diodes, switches and the like as circuitry or circuit elements. We may also refer to series and parallel combinations of these components as elements, networks, topologies, circuits, and the like. We may describe combinations of capacitors, resistors, diodes, transistors, and/or switches as adjustable impedance networks, tuning networks, adjustors, matching networks, adjusting elements, and the like. We may also refer to "self-resonant" objects that have both capacitance, and inductance distributed (or partially distributed, as opposed to solely lumped) throughout the entire object. It would be understood by one of ordinary skill in the art that adjusting and controlling variable components within a circuit or network may adjust the performance of that circuit or network and that those adjustments may be described generally as tuning, adjusting, matching, correcting, and the like. Other methods to tune or adjust the operation of the wireless power transfer system may be used alone, or in addition to adjusting tunable components such as inductors, capacitors, resonators, repeaters, or electrical and physical properties of resonator coils, antennas, rectennas, or banks of inductors and capacitors.

In one aspect, disclosed herein is a wireless power network having at least a first pair of resonators capable of wirelessly exchanging power with one or more other resonators and having a wired connection between the resonators in the first pair. The wired pair of resonators can be described as a "hybrid component" because they exchange power through both wireless and wired interactions. Wired power transfer between independently configured resonators is accomplished using various means including one embodiment in which electrically conductive connections are set, or adjusted, as a function of the connection (e.g., capacitance is set according to connector length) to allow power to efficiently transfer between resonators. In one embodiment modular elements, such as capacitive elements, may be adjustably implemented with the conductive connections. Using wired power transfer allows for daisy chaining of network components and associated advantages such as reduced system cost and improved system operation for certain system configurations and in near "lossy" obstacles.

Accordingly, in general with regard to this first aspect, disclosed herein is a wireless power network including multiple electromagnetic resonators each capable of storing electromagnetic energy at a resonant frequency. The multiple resonators include: a first resonator configured to be coupled to a power source to receive power from the power source (also sometimes referred to herein as a "source resonator" or "transmitter"); a second resonator configured to be coupled to a load to provide power to the load (also sometimes referred to herein as a "device resonator" or "receiver"), and one or more intermediate resonators (also sometimes referred to herein as a "repeater resonator" or "repeater"). The first resonator is configured to provide power from the power source to the second resonator through the one or more intermediate resonators. At least a first pair of resonators among the multiple resonators is configured to exchange power wirelessly, and at least a second pair of the resonators among the multiple resonators is configured to exchange power through a wired electrically conductive connection. For example, the second pair of resonators can be a transmitter and a repeater. In another example, the second pair of resonators can be a first repeater and a second repeater.

Certain embodiments of this wireless power network include one or more of the following features.

Multiple pairs among the multiple resonators are configured to exchange power wirelessly. Multiple pairs among the multiple resonators are configured to exchange power through a wired electrical connection. The multiple resonators include a third resonator configured to be coupled to another load to provide power to this other load, and wherein the third resonator receives power from the power source through one or more other resonators among the multiple resonators.

In certain embodiments, the wireless power network is deployed in a home to wirelessly power multiple household devices across a range of locations.

Furthermore, in certain embodiments, each resonator in the second pair includes a housing containing at least one inductor and at least one capacitor to define the resonant frequency for the resonator, and wherein the wired electrical connection connects to an electrical port connection in each of the housings of the resonators in the second pair.

For example, in certain embodiments, the wired electrical connection includes a length of capacitively loaded and/or inductively loaded conducting material. The loading of the conductive material can be configured to substantially maintain the resonant frequencies of the resonators in the second pair of resonators when the resonators in the second pair exchange energy through the wired electrical connection. For example, in certain embodiments, the loading of the conductive material is a capacitive loading configured to maintain the resonant frequencies of the resonators in the second pair of resonators when the second pair of resonators exchange energy through the wired connection to within 5% of the resonant frequencies of the resonators in the second pair, respectively, when the resonators in the second pair are isolated from all other resonators. In general, where capacitive loading is used, the capacitive loading scales with the length of the conductive material.

Furthermore, in certain embodiments, each housing includes a receptacle for removably engaging the length of capacitively loaded conducting material to establish the wired electrical connection. For example, the wired electrical connection may include a length of a pair of capacitively loaded stranded wires, or coaxial cable. The wired electrical connection may include shielding.

Furthermore, in certain embodiments, the length of capacitively loaded conducting material includes modular capacitive elements to adjustably load the conducting material according to the length of the wired electrical connection. This can enable a user to more easily deploy the wired pair of resonators to a desired arrangement and separation.

Furthermore, in certain embodiments, the wired electrical connection facilitates communication with circuitry within at least one of the resonators in the second pair in order to cause the circuitry to activate, deactivate, or adjust a property of at least one of the resonators in the second pair. Furthermore, for example, the wireless power network can include a controller configured to adjustably open or close the wired electrical connection between at least the resonators in the second pair. This controller can be implemented as a physical switch on the hybrid pair of resonators or through network electronics.

Furthermore, in certain embodiments, the resonators in the second pair each include at least one loop of conductive material substantially aligned in respective planes, and wherein the respective planes intersect at an angle approaching a 90-degree angle, for example, between 45 to 135 degrees, or even between 60 to 120 degrees, or even between 75 to 105 degrees. In such embodiments, the wired connection can facilitate a more efficient power transfer than that for a wireless connection because of poor magnetic coupling between the substantially 90-degree loops.

Furthermore, in certain embodiments, the resonators in the second pair are separated by a lossy barrier that substantially reduces wireless power transfer between the resonators in the second pair but does not substantially reduce the wired power transfer between the resonators in the second pair. This is yet another advantage of the wired connection. For example, the barrier can include a mass of conductive material having a size that is at least comparable to the resonators in the second pair.

In another aspect, disclosed herein is a wireless power network system testing and assessment system that is designed to obtain measurements of a wireless power network either by direct measurement or by communication with the network. The system may obtain information, through communication with the network or by user input or otherwise, about network components including geometric configuration of the components and measurements related to performance of the components. The system may adjust the operation of the network in order to assess or improve network performance, and may assess network performance by operating upon real world data and modeled data, such operating including, for example, comparison operations.

Accordingly, in general regard to this second aspect, disclosed herein is a device for testing a wireless power network, the network including at least one power source, at least one load, and multiple resonators configured to couple wireless power from the at least one power source to the at least one load. The device includes:
   a. a user interface for receiving input from a user and providing information to the user;
   b. a measurement module for measuring, whether directly or indirectly, at least one operational characteristic of the wireless power network and information about the geometric arrangement of the multiple resonators in the wireless power network;
   c. a memory for storing design specifications about the wireless power network; and d. an electronic processor configured to calculate information about a performance of the wireless power network based on the measured operational characteristic, the information about the geometric arrangement of the multiple resonators, and the stored design specifications, and further configured to provide the performance information to the user through the user interface.

Certain embodiments of this device for testing a wireless power network include one or more of the following features.

For example, in certain embodiments, the measurement component includes hardware internal to the device for directly measuring at least some of the information about the geometric arrangement of the multiple resonators in the wireless power network. For example, the measuring component hardware can include a camera. For example, the internal hardware can further include a processor and software for creating a two-dimensional or three-dimensional model of the wireless power network using images taken by the camera.

Also, for example, the measurement component can include a measurement coil configured to directly measure one or more properties of electromagnetic fields generated by the resonators to determining the at least one operational characteristic. Alternatively, for example, the operational characteristic can be measured within the wireless power network, and the measurement component in the device comprises a communication module for communicating with the wireless power network to access the measured operational characteristic and thereby measure indirectly the operational characteristic. In this case, for example, the communication module can be configured to communicate wirelessly with the wireless power network. Alternatively, or in addition, for example, the device can include a mechanical interface for creating a pluggable wired electrical connection with a resonator in the wireless power network, and wherein the communication module is configured to communicate with the wireless power network through pluggable wired connection.

In certain embodiments, the device is a portable handheld device.

In certain embodiments, the performance information includes information about adjusting the wireless power network to improve the performance of the wireless power network. For example, the information about adjusting the wireless power network to improve the performance of the wireless power network can include information about re-arranging the geometric arrangement of the multiple resonators.

In certain embodiments, at least one of the components in the wireless power network is adjustable, and wherein the device further includes a communication module configured to communicate with the wireless power network to adjust the adjustable component based on the performance information calculated by the electronic processor. For example, the adjustable component in the wireless power network can be a tunable or adjustable capacitor (e.g., a capacitor bank).

In certain embodiments, the performance information includes one or more of any of the following: an assessment of the measured operational characteristic in relation to a modeled operational characteristic computed by a modeling module; assessment of the power usage of the network for a specified amount of time; an assessment of the cost to operate the network for a specified amount of time; and an assessment of the cost to operate the network in standby mode for a specified amount of time based upon a calculated rate of power drain for the standby mode.

In certain embodiments, the performance information is derived using a calibration routine designed to adjust an operational parameter of a network component and to record a measurement corresponding to this adjustment.

In certain embodiments, the performance information is derived using a calibration routine designed to communicate with the network in order to cause an adjustment of an operational parameter of a network component and to record a measurement corresponding to this adjustment.

In a third aspect, disclosed herein is a wireless power network accessory for use with network components (such as network resonators) having a measurement and control interface. Wireless power network system components, and especially the resonators therein, may require measurement and adjustment to ensure proper functioning over time and within changing environments. Providing for modular design and for interfacing with an external accessory permits advantages including greater simplicity of manufacturing, increased functionality, greater compatibility over time, and reduced cost. Networks which include at least one interface in the housing of individual network components (such as individual resonators) allow for control and monitoring of the component to occur via a network accessory having an interface that may be temporarily, or permanently, connected to the component interface provides calibration, monitoring, and control of components.

Accordingly, in general regard to this third aspect, disclosed herein is a system for use in a wireless power network, the wireless power network including at least one power source, at least one load, and multiple network components including resonators configured to couple wireless power from the at least one power source to the at least one load. The system includes:

a. a resonator configured to exchange power wirelessly with one or more other resonators in the wireless power network, the resonator having a housing with an interface; and b. a modular accessory configured to removably engage the housing interface, wherein the modular accessory comprises a measurement component configured to measure an operational property of the resonator when the modular accessory engages the housing interface.

For example, the measured operational property may relate to an efficiency of wireless power transfer between at least two of the resonators.

In certain embodiments, this system includes one or more of the following features.

For example, in certain embodiments, the interface includes a plug (e.g., a Universal Serial Bus (USB) plug) on one of the housing and the modular accessory and a receptacle on the other of the housing and the modular accessory.

Furthermore, for example, the modular accessory to the housing interface of the resonator can establish a wired electrical connection between the modular accessory and the resonator.

Furthermore, in certain embodiments, the modular accessory further comprises a digital display for displaying information of the measured operational property and/or information related to a network component.

Furthermore, in certain embodiments, the modular accessory further comprises a processor for calculating information based on the measured operational characteristic and stored specification information about the resonator.

Furthermore, in certain embodiments, the resonator comprises an adjustable component (such as a tunable capacitor or adjustable capacitor bank) and wherein the modular accessory is operable to adjust the adjustable component when the modular accessory engages the housing interface.

Furthermore, in certain embodiments, the modular accessory includes a timer that is configured to control the resonator according to at least one of: clock time; elapsed time; and a specified time interval.

Furthermore, in certain embodiments, the modular accessory includes a communication module for communicating with another network component. Furthermore, in certain embodiments, the modular accessory includes a control module for providing control of circuitry of a network component.

Furthermore, in certain embodiments, the resonator contains circuitry allowing for the modular accessory to monitor the network component. Furthermore, in certain embodiments, the resonator further contains circuitry allowing for the modular accessory to control the network component. Furthermore, in certain embodiments, the resonator further contains communication circuitry configured for allowing for the modular accessory to communicate with the network component.

Furthermore, in certain embodiments, the resonator contains communication circuitry configured for allowing for the resonator to identify itself to the modular accessory relative to other resonators in the wireless power network.

In a related aspect, also disclosed is a modular accessory for use in a wireless power network, the wireless power network including at least one power source, at least one load, and multiple resonators configured to couple wireless power from the at least one power source to the at least one load. This modular accessory includes:
  a. an electrical connector configured to removably engage an interface on a housing of one of the resonators in the wireless power network to establish a wired electrical connection with the resonator; and
  b. a measurement component configured to measure an operational property of the resonator when the modular accessory engages the housing interface.

For example, the interface on the housing couples to electrical circuitry of the resonator inside the housing. In certain embodiments, additional features of the modular accessory may include any of those described above with respect to this third aspect.

In a fourth aspect, disclosed herein is a wireless power network management system. The wireless power network system can be managed to realize advantages such as event-based, condition-based, or time-based activation of network zones, and power conduction pathways within a particular zone which exist between at least one source and at least one device resonator. Management may be required to circumvent or otherwise respond to a network fault, such as component malfunction, or network overload, in the case where the power needs exceed the power supply capacity. Management may also be used in order to respond to various triggers including those related to time, temperature, environmental factors, user based factors, location based factors, and power needs of at least one device.

Accordingly, in general regard to this fourth aspect, disclosed herein is a controller for use in a wireless power network, the network including at least one power source, at least one load, and multiple resonators configured to couple wireless power from the at least one power source to the at least one load. The controller includes: a control module configured to selectively activate, deactivate, and/or adjust operation of at least some of the multiple resonators; and an electronic processor configured to cause the control module to selectively activate a first subset of the multiple resonators to wirelessly couple power from a first source to a first load in response to a first trigger, wherein the first subset defines a first pathway among the multiple resonators for providing power to one of the loads.

Certain embodiments of the controller include one or more of the following features.

For example, the electronic processor can be further configured to cause the control module to operate a communication module to selectively activate a second subset of the multiple resonators, different from the first subset, to wirelessly couple power from the first source to the first load in response to a second trigger, wherein the second subset defines a second pathway among the multiple resonators for providing power to one of the loads.

In another example, the electronic processor can be further configured to cause the communication module to selectively activate a second subset of the multiple resonators, different from the first subset, to wirelessly couple power to from the first source to a second load, different from the first load, in response to a second trigger, wherein the second subset defines a second pathway among the multiple resonators for providing power to one of the loads.

In another example, the electronic processor can be further configured to cause the communication module to selectively activate a second subset of the multiple resonators, different from the first subset, to wirelessly couple power from a second source, different from the first source, to the first load in response to a second trigger, wherein the second subset defines a second pathway among the multiple resonators for providing power to one of the loads.

In certain embodiments, for example, the first trigger is caused by a user input.

In certain embodiments, for example, the controller further includes a clock and wherein the first trigger is caused by programmed time schedule.

In certain embodiments, for example, the controller further includes a temperatures sensor, and wherein the first trigger corresponds to certain temperature measurement by the temperature sensor.

In certain embodiments, the wireless power network is deployed in a home to wirelessly power multiple household devices across a range of locations. For example, the controller can include at least one wall-mounted manual device to enable a user to select at least a first pathway from a set of one or more defined pathways.

In certain embodiments, the first trigger can be caused by one or more of any of the following: the network receiving information indicating that one or more loads is receiving insufficient power; a source-to-load efficiency failing to exceed a minimum threshold; the wireless power network operating according to violating at least one condition defined in a user-defined network rule.

In certain embodiments, the controller further includes a processor and memory for storing reports including a log of the pathways used by the wireless power network.

In certain embodiments, the controller further includes a user interface for providing the reports to the user.

In certain embodiments, the controller includes a motion sensor, and wherein the first trigger corresponds to certain motion measurement by the motion sensor.

In certain embodiments, the controller further includes a network fault detector, and wherein the first trigger corresponds to the detector sensing a network fault.

In certain embodiments, the controller further includes a network fault detector, and wherein the first trigger corresponds the detector obtaining a communication signal from a network component corresponding to a network fault In another aspect related to this fourth aspect, disclosed is a wireless power network including at least one power source, at least one load, and multiple resonators configured to couple wireless power from the at least one power source to the at least one load, The wireless power network further includes the controller described above for this fourth aspect.

In general, in yet another aspect, disclosed herein is a repeater resonator for use with a wireless power network, the network including at least one power source, at least one load, and multiple resonators, including the repeater resonator, configured to couple wireless power from the at least one power source to the at least one load. The repeater resonator includes: a first loop of conductive material substantially aligned in a first plane; a second loop of conductive material substantially in a second plane, different from the first plane, and wherein the first loop and second loop are conductively connected to one another; and a capacitive element coupled to the conductive loops to define a resonant frequency for the repeater resonator. The relative physical orientation of the first and second loops is adjustable.

For example, this repeater resonator can further include a rotatable member to adjust the relative physical orientation of the first and second loops, such as a rotatable hinge or ball joint.

In general, in yet another aspect, disclosed herein is a multi-loop resonator for use with a wireless power network, the network including at least one power source, at least one load, and multiple resonators, including the multi-loop resonator, configured to couple wireless power from the at least one power source to the at least one load. This multi-loop resonator includes: a first loop of conductive material substantially aligned in a first plane; a second loop of conductive material substantially in a second plane different from the first plane; a capacitive element; and a controller to selectively couple the capacitive element to the first loop or the second loop, but not both.

For example, this multi-loop resonator can further include a power source coupled to the multi-loop resonator to provide power to the multi-loop resonator through a wired connection.

Unless otherwise defined, all technical and scientific terms used herein have the same meaning as commonly understood by one of ordinary skill in the art to which this disclosure belongs. In case of conflict with publications, patent applications, patents, and other references mentioned or incorporated herein by reference, the present specification, including definitions, will control. As used herein, a first resonator configured to be coupled to a power source to receive power from the power source is sometimes referred to as a "source resonator" or "transmitter". Similarly, as used herein, a second resonator configured to be coupled to a load to provide power to the load is sometimes referred to as a "device resonator" or "receiver" or "harvester". Furthermore, as used herein, an intermediate resonator to exchange power from a first resonator to a second resonator through the intermediate resonator is sometimes referred to as a "repeater resonator" or "repeater". Moreover, each of these resonators, whether implemented as source resonator, device resonator, repeater resonator, or some combination thereof, is sometimes described herein as an example of a "network component" for a wireless power network.

Any of the features described may be used, alone or in combination, without departing from the scope of this disclosure. Other features, objects, and advantages of the systems and methods disclosed herein, or reasonably analogous alternative embodiments, will be apparent from the following detailed description and figures. Although wireless power system components (or "modules") may be shown as distinct, all components illustrated for one system component, such as a transmitter, may be implemented in other components such as the receiver. Additionally, modules of each component may be realized discretely or may be distributed across other modules, and all modules may communicate electrically or wirelessly with each other.

DETAILED DESCRIPTION OF THE INVENTION

As described above, this disclosure relates to wireless energy transfer using coupled electromagnetic resonators. However, such energy transfer is not restricted to electromagnetic resonators, and the wireless energy transfer systems described herein are more general and may be implemented using a wide variety of resonators and resonant objects. Therefore, we first describe the general technique, and then disclose electromagnetic examples for wireless energy transfer.

Resonators

A resonator may be defined as a system that can store energy in at least two different forms, and where the stored energy is oscillating between the two forms. The resonance has a specific oscillation mode with a resonant (modal) frequency, f, and a resonant (modal) field. The angular resonant frequency, $\omega$, may be defined as $\omega=2\pi f$, the resonant wavelength, $\lambda$, may be defined as $\lambda=c/f$, where c is the speed of light, and the resonant period, T, may be defined as $T=1/f=2\pi/\omega$. In the absence of loss mechanisms, coupling mechanisms or external energy supplying or draining mechanisms, the total resonator stored energy, W, would stay fixed and the two forms of energy would oscillate, wherein one would be maximum when the other is minimum and vice versa.

Figure 1:
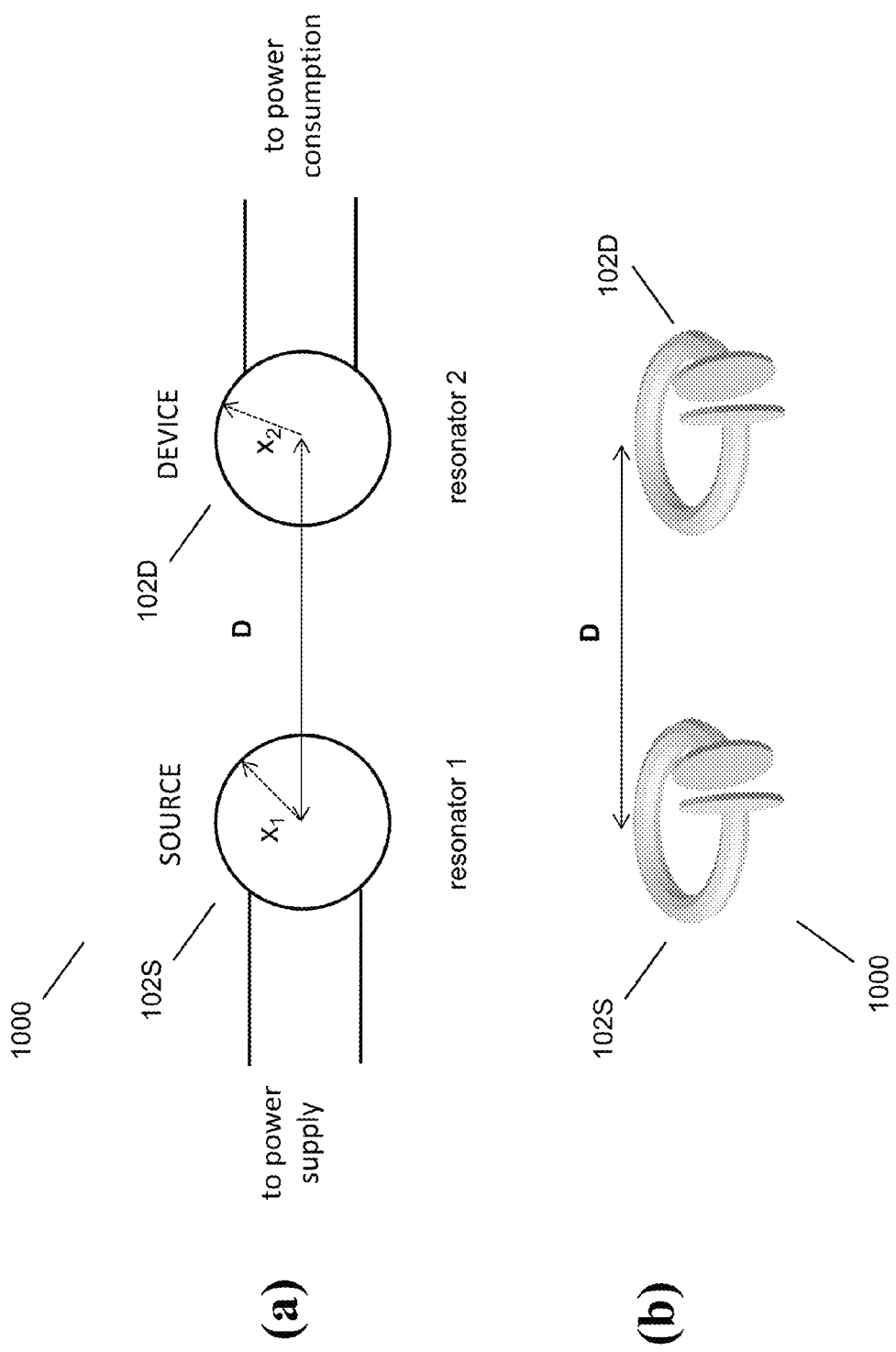
FIG. 1(a) and FIG. 1(b) depict exemplary wireless power systems containing a source resonator 1 and device resonator 2 separated by a distance D.

In the absence of extraneous materials or objects, the energy in the resonator 102 shown in FIG. 1 may decay or be lost by intrinsic losses. The resonator fields then obey the following linear equation:

$$\frac{da(t)}{dt} = -i(\omega - i\Gamma)a(t),$$

where the variable a(t) is the resonant field amplitude, defined so that the energy contained within the resonator is given by $|a(t)|^2$. $\Gamma$ is the intrinsic energy decay or loss rate (e.g. due to absorption and radiation losses).

The Quality Factor, or Q-factor, or Q, of the resonator, which characterizes the energy decay, is inversely proportional to these energy losses. It may be defined as $Q=\omega*W/P$, where P is the time-averaged power lost at steady state. That is, a resonator 102 with a high-Q has relatively low intrinsic losses and can store energy for a relatively long time. Since the resonator loses energy at its intrinsic decay rate, $2\Gamma$, its Q, also referred to as its intrinsic Q, is given by $Q=\omega/2\Gamma$. The quality factor also represents the number of oscillation periods, T, it takes for the energy in the resonator to decay by a factor of e.

Figure 2:
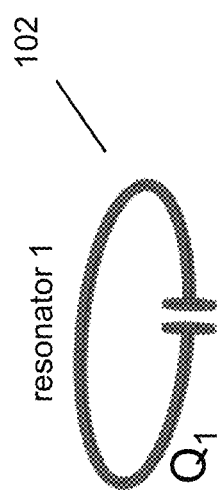
FIG. 2 shows an exemplary resonator labeled according to the labeling convention described in this disclosure. Note that there are no extraneous objects or additional resonators shown in the vicinity of resonator 1.

As described above, we define the quality factor or Q of the resonator as that due only to intrinsic loss mechanisms. A subscript index such as $Q_1$, indicates the resonator (resonator 1 in this case) to which the Q refers. FIG. 2 shows an electromagnetic resonator 102 labeled according to this convention. Note that in this figure, there are no extraneous objects or additional resonators in the vicinity of resonator 1.

Extraneous objects and/or additional resonators in the vicinity of a first resonator may perturb or load the first resonator, thereby perturbing or loading the Q of the first resonator, depending on a variety of factors such as the distance between the resonator and object or other resonator, the material composition of the object or other resonator, the structure of the first resonator, the power in the first resonator, and the like. Unintended external energy losses or coupling mechanisms to extraneous materials and objects in the vicinity of the resonators may be referred to as "perturbing" the Q of a resonator, and may be indicated by a subscript within rounded parentheses, ( ). Intended external energy losses, associated with energy transfer via coupling to other resonators and to generators and loads in the wireless energy transfer system may be referred to as "loading" the Q of the resonator, and may be indicated by a subscript within square brackets, [ ].

Figure 3:
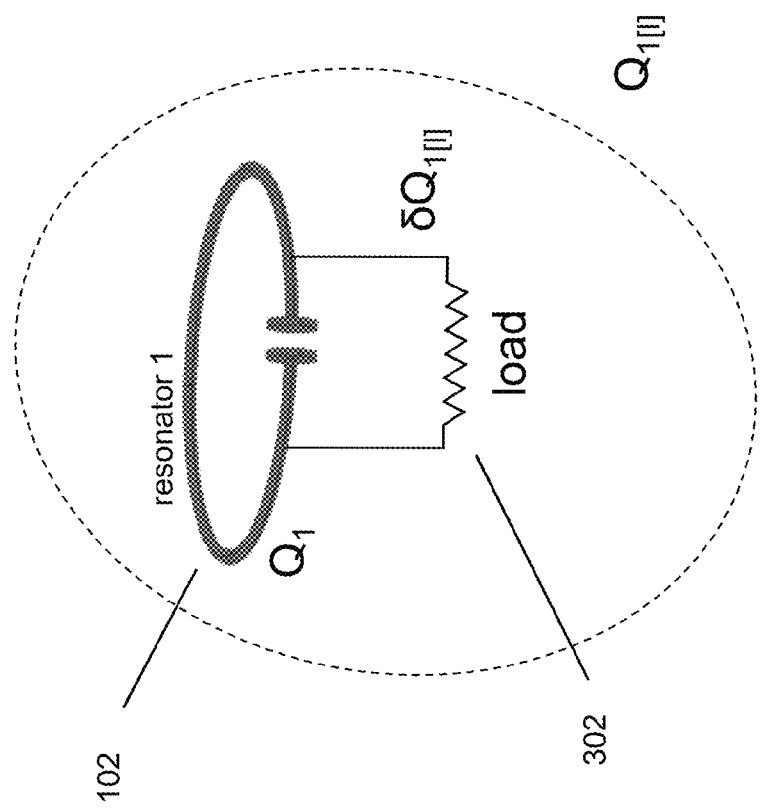
FIG. 3 shows an exemplary resonator in the presence of a "loading" object, labeled according to the labeling convention described in this disclosure.

The Q of a resonator 102 connected or coupled to a power generator, g, or load 302, l, may be called the "loaded quality factor" or the "loaded Q" and may be denoted by $Q_{[g]}$ or $Q_{[l]}$, as illustrated in FIG. 3. In general, there may be more than one generator or load 302 connected to a resonator 102. However, we do not list those generators or loads separately but rather use "g" and "l" to refer to the equivalent circuit loading imposed by the combinations of generators and loads. In general descriptions, we may use the subscript "l" to refer to either generators or loads connected to the resonators.

In some of the discussion herein, we define the "loading quality factor" or the "loading Q" due to a power generator or load connected to the resonator, as $\delta Q_{[l]}$, where, $1/\delta Q_{[l]} \equiv 1/Q_{[l]} - 1/Q$. Note that the larger the loading Q, $\delta Q_{[l]}$, of a generator or load, the less the loaded Q, $Q_{[l]}$, deviates from the unloaded Q of the resonator.

Figure 4:
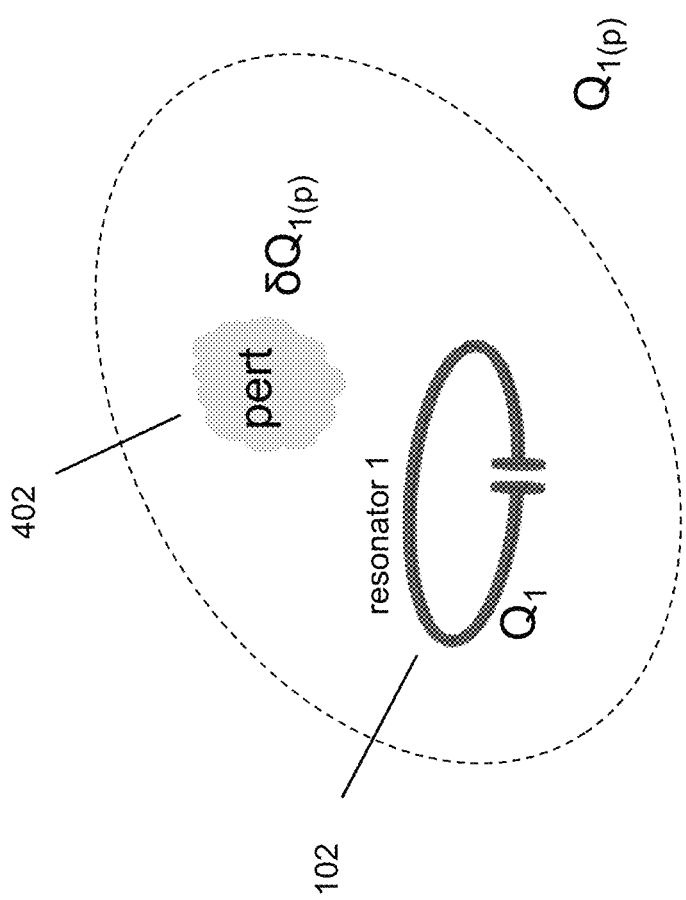
FIG. 4 shows an exemplary resonator in the presence of a "perturbing" object, labeled according to the labeling convention described in this disclosure.

The Q of a resonator in the presence of an extraneous object 402, p, that is not intended to be part of the energy transfer system may be called the "perturbed quality factor" or the "perturbed Q" and may be denoted by $Q_{(p)}$, as illustrated in FIG. 4. In general, there may be many extraneous objects, denoted as p1, p2, etc., or a set of extraneous objects {p}, that perturb the Q of the resonator 102. In this case, the perturbed Q may be denoted $Q_{(p1+p2+\ldots)}$ or $Q_{(\{p\})}$. For example, $Q_{1(brick+wood)}$ may denote the perturbed quality factor of a first resonator in a system for wireless power exchange in the presence of a brick and a piece of wood, and $Q_{2(\{office\})}$ may denote the perturbed quality factor of a second resonator in a system for wireless power exchange in an office environment.

In some of the discussion herein, we define the "perturbing quality factor" or the "perturbing Q" due to an extraneous object, p, as $\delta Q_{(p)}$, where $1/\delta Q_{(p)} \equiv 1/Q_{(p)} - 1/Q$. As stated before, the perturbing quality factor may be due to multiple extraneous objects, p1, p2, etc. or a set of extraneous objects, {p}. The larger the perturbing Q, $\delta Q_{(p)}$, of an object, the less the perturbed Q, $Q_{(p)}$, deviates from the unperturbed Q of the resonator.

In some of the discussion herein, we also define $\Theta_{(p)} \equiv Q_{(p)}/Q$ and call it the "quality factor insensitivity" or the "Q-insensitivity" of the resonator in the presence of an extraneous object. A subscript index, such as $\Theta_{1(p)}$, indicates the resonator to which the perturbed and unperturbed quality factors are referring, namely, $\Theta_{1(p)} \equiv Q_{1(p)}/Q_1$.

Note that the quality factor, Q, may also be characterized as "unperturbed", when necessary to distinguish it from the perturbed quality factor, $Q_{(p)}$, and "unloaded", when necessary to distinguish it from the loaded quality factor, $Q_{[l]}$. Similarly, the perturbed quality factor, $Q_{(p)}$, may also be characterized as "unloaded", when necessary to distinguish them from the loaded perturbed quality factor, $Q_{(p)[l]}$.

Coupled Resonators

Resonators having substantially the same resonant frequency, coupled through any portion of their near-fields may interact and exchange energy. There are a variety of physical pictures and models that may be employed to understand, design, optimize and characterize this energy exchange. One way to describe and model the energy exchange between two coupled resonators is using coupled mode theory (CMT).

In coupled mode theory, the resonator fields obey the following set of linear equations:

$$\frac{da_m(t)}{dt} = -i(\omega_m - i\Gamma_m)a_m(t) + i\sum_{n \neq m}\kappa_{mn}a_n(t)$$

where the indices denote different resonators and $\kappa_{mn}$ are the coupling coefficients between the resonators. For a reciprocal system, the coupling coefficients may obey the relation $\kappa_{mn} = \kappa_{nm}$. Note that, for the purposes of the present specification, far-field radiation interference effects will be ignored and thus the coupling coefficients will be considered real. Furthermore, since in all subsequent calculations of system performance in this specification the coupling coefficients appear only with their square, $\kappa_{mn}^2$, we use $\kappa_{mn}$ to denote the absolute value of the real coupling coefficients.

Note that the coupling coefficient, $\kappa_{mn}$, from the CMT described above is related to the so-called coupling factor, $k_{mn}$, between resonators m and n by $k_{mn} = 2\kappa_{mn}/\sqrt{\omega_m \omega_n}$. We define a "strong-coupling factor", $U_{mn}$, as the ratio of the coupling and loss rates between resonators m and n, by $U_{mn} = \kappa_{mn}/\sqrt{\Gamma_m \Gamma_n} = k_{mn}\sqrt{Q_m Q_n}$.

The quality factor of a resonator m, in the presence of a similar frequency resonator n or additional resonators, may be loaded by that resonator n or additional resonators, in a fashion similar to the resonator being loaded by a connected power generating or consuming device. The fact that resonator m may be loaded by resonator n and vice versa is simply a different way to see that the resonators are coupled.

The loaded Q's of the resonators in these cases may be denoted as $Q_{m[n]}$ and $Q_{n[m]}$. For multiple resonators or loading supplies or devices, the total loading of a resonator may be determined by modeling each load as a resistive loss, and adding the multiple loads in the appropriate parallel and/or series combination to determine the equivalent load of the ensemble.

In some of the discussion herein, we define the "loading quality factor" or the "loading $Q_m$" of resonator m due to resonator n as $\delta Q_{m[n]}$, where $1/\delta Q_{m[n]} \equiv 1/Q_{m[n]} - 1/Q_m$. Note that resonator n is also loaded by resonator m and its "loading $Q_n$" is given by $1/\delta R_{n[m]} \equiv 1/Q_{n[m]} - 1/Q_n$.

When one or more of the resonators are connected to power generators or loads, the set of linear equations is modified to:

$$\frac{da_m(t)}{dt} = -i(\omega_m - i\Gamma_m)a_m(t) + i\sum_{n \neq m}\kappa_{mn}a_n(t) - \kappa_m a_m(t) + \sqrt{2\kappa_m}\, s_{+m}(t)$$

$$s_{-m}(t) = \sqrt{2\kappa_m}\, a_m(t) - s_{+m}(t),$$

where $s_{+m}(t)$ and $s_{-m}(t)$ are respectively the amplitudes of the fields coming from a generator into the resonator m and going out of the resonator m either back towards the generator or into a load, defined so that the power they carry is given by $|s_{+m}(t)|^2$ and $|s_{-m}(t)|^2$. The loading coefficients $\kappa_m$ relate to the rate at which energy is exchanged between the resonator m and the generator or load connected to it.

Note that the loading coefficient, $\kappa_m$, from the CMT described above is related to the loading quality factor, $\delta Q_{m[l]}$, defined earlier, by $\delta Q_{m[l]} = \omega_m/2\kappa_m$.

We define a "strong-loading factor", $U_{m[l]}$, as the ratio of the loading and loss rates of resonator m, $U_{m[l]} = \kappa_m/\Gamma_m = Q_m/\delta Q_{m[l]}$.

FIG. 1(a) shows an example of two coupled resonators 1000, a first resonator 102S, configured as a source resonator and a second resonator 102D, configured as a device resonator. Energy may be transferred over a distance D between the resonators. The source resonator 102S may be driven by a power supply or generator (not shown). Work may be extracted from the device resonator 102D by a power consuming drain or load (e.g. a load resistor, not shown). Let us use the subscripts "s" for the source, "d" for the device, "g" for the generator, and "l" for the load, and, since in this example there are only two resonators and $\kappa_{sd}=\kappa_{ds}$, let us drop the indices on $\kappa_{sd}$, $k_{sd}$, and $U_{sd}$, and denote them as $\kappa$, k, and U, respectively.

The power generator may be constantly driving the source resonator at a constant driving frequency, f, corresponding to an angular driving frequency, $\omega$, where $\omega=2\pi f$.

In this case, the efficiency, $\eta=|s_{-d}|^2/|s_{+s}|^2$, of the power transmission from the generator to the load (via the source and device resonators) is maximized under the following conditions: The source resonant frequency, the device resonant frequency and the generator driving frequency have to be matched, namely $$\omega_s=\omega_d=\omega.$$

Furthermore, the loading Q of the source resonator due to the generator, $\delta Q_{s[g]}$, has to be matched (equal) to the loaded Q of the source resonator due to the device resonator and the load, $Q_{s[dl]}$, and inversely the loading Q of the device resonator due to the load, $\delta Q_{d[l]}$, has to be matched (equal) to the loaded Q of the device resonator due to the source resonator and the generator, $Q_{d[sg]}$, namely $$\delta Q_{s[g]}=Q_{s[dl]} \text{ and } \delta Q_{d[l]}=Q_{d[sg]}.$$

These equations determine the optimal loading rates of the source resonator by the generator and of the device resonator by the load as $$U_{d[l]}=\kappa_d/\Gamma_d=Q_d/\delta Q_{d[l]}=\sqrt{1+U^2}=$$
$$\sqrt{1+(\kappa/\sqrt{\Gamma_s\Gamma_d})^2}=Q_s/\delta Q_{s[g]}=\kappa_s/\Gamma_s=U_{s[g]}.$$

Note that the above frequency matching and Q matching conditions are together known as "impedance matching" in electrical engineering.

Figure 5:
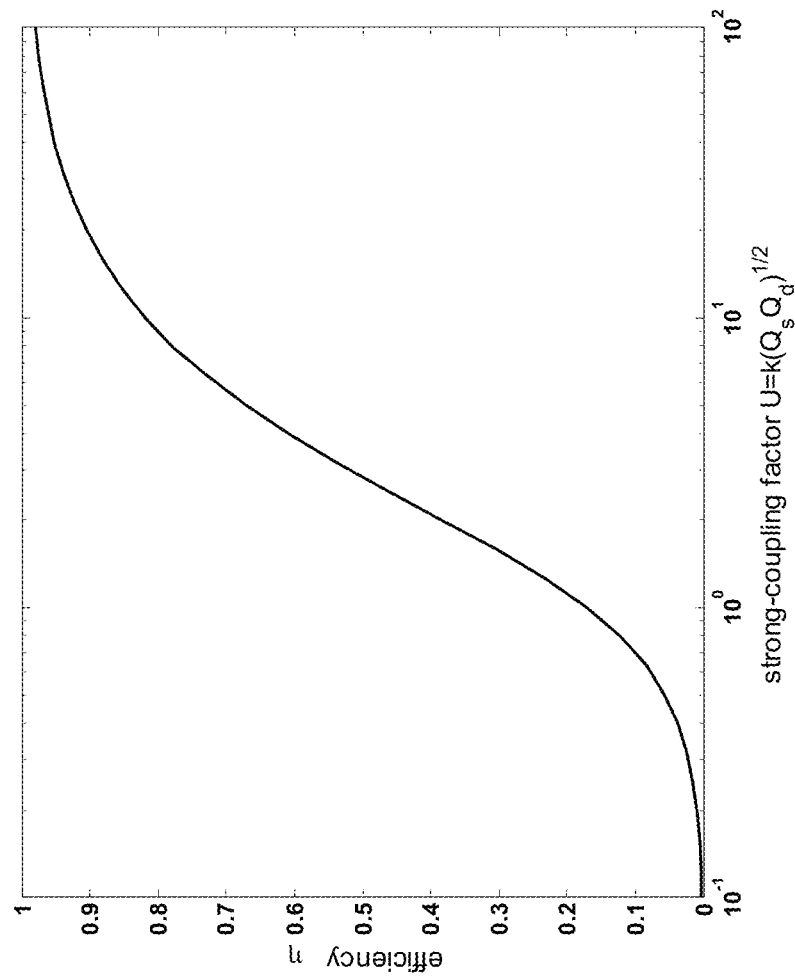
FIG. 5 shows a plot of efficiency, $\eta$, vs. strong coupling factor, $U=\kappa/\sqrt{\Gamma_s\Gamma_d}=k\sqrt{Q_sQ_d}$.

Under the above conditions, the maximized efficiency is a monotonically increasing function of only the strong-coupling factor, $U=\kappa/\sqrt{\Gamma_s\Gamma_d}=k\sqrt{Q_sQ_d}$, between the source and device resonators and is given by, $\eta=U^2/(1+\sqrt{1+U^2})^2$, as shown in FIG. 5. Note that the coupling efficiency, $\eta$, is greater than 1% when U is greater than 0.2, is greater than 10% when U is greater than 0.7, is greater than 17% when U is greater than 1, is greater than 52% when U is greater than 3, is greater than 80% when U is greater than 9, is greater than 90% when U is greater than 19, and is greater than 95% when U is greater than 45. In some applications, the regime of operation where U>1 may be referred to as the "strong-coupling" regime.

Since a large $U=\kappa/\sqrt{\Gamma_s\Gamma_d}=(2\kappa/\sqrt{\omega_s\omega_d})\sqrt{Q_sQ_d}$ is desired in certain circumstances, resonators may be used that are high-Q. The Q of each resonator may be high. The geometric mean of the resonator Q's, $\sqrt{Q_sQ_d}$ may also or instead be high.

The coupling factor, k, is a number between $0 \leq k \leq 1$, and it may be independent (or nearly independent) of the resonant frequencies of the source and device resonators, rather it may be determined mostly by their relative geometry and the physical decay-law of the field mediating their coupling. In contrast, the coupling coefficient, $\kappa=k\sqrt{\omega_s\omega_d}/2$, may be a strong function of the resonant frequencies. The resonant frequencies of the resonators may be chosen preferably to achieve a high Q rather than to achieve a low $\Gamma$, as these two goals may be achievable at two separate resonant frequency regimes.

A high-Q resonator may be defined as one with Q>100. Two coupled resonators may be referred to as a system of high-Q resonators when each resonator has a Q greater than 100, $Q_s>100$ and $Q_d>100$. In other implementations, two coupled resonators may be referred to as a system of high-Q resonators when the geometric mean of the resonator Q's is greater than 100, $\sqrt{Q_sQ_d}>100$.

The resonators may be named or numbered. They may be referred to as source resonators, device resonators, first resonators, second resonators, repeater resonators, and the like. It is to be understood that while two resonators are shown in FIG. 1, and in many of the examples below, other implementations may include three (3) or more resonators. For example, a single source resonator 102S may transfer energy to multiple device resonators 102D or multiple devices. Energy may be transferred from a first device to a second, and then from the second device to the third, and so forth. Multiple sources may transfer energy to a single device or to multiple devices connected to a single device resonator or to multiple devices connected to multiple device resonators. Resonators 102 may serve alternately or simultaneously as sources, devices, or they may be used to relay power from a source in one location to a device in another location. Intermediate electromagnetic resonators 102 may be used to extend the distance range of wireless energy transfer systems. Multiple resonators 102 may be daisy chained together, exchanging energy over extended distances and with a wide range of sources and devices. High power levels may be split between multiple sources 102S, transferred to multiple devices and recombined at a distant location.

The analysis of a single source and a single device resonator may be extended to multiple source resonators and/or multiple device resonators and/or multiple intermediate resonators. In such an analysis, the conclusion may be that large strong-coupling factors, $U_{mn}$, between at least some or all of the multiple resonators is preferred for a high system efficiency in the wireless energy transfer. Again, implementations may use source, device and intermediate resonators that have a high Q. The Q of each resonator may be high. The geometric mean $\sqrt{Q_mQ_n}$ of the Q's for pairs of resonators m and n, for which a large $U_{mn}$ is desired, may also or instead be high.

Note that since the strong-coupling factor of two resonators may be determined by the relative magnitudes of the loss mechanisms of each resonator and the coupling mechanism between the two resonators, the strength of any or all of these mechanisms may be perturbed in the presence of extraneous objects in the vicinity of the resonators as described above.

Continuing the conventions for labeling from the previous sections, we describe k as the coupling factor in the absence of extraneous objects or materials. We denote the coupling factor in the presence of an extraneous object, p, as $k_{(p)}$, and call it the "perturbed coupling factor" or the "perturbed k". Note that the coupling factor, k, may also be characterized as "unperturbed", when necessary to distinguish from the perturbed coupling factor $k_{(p)}$.

We define $\delta k_{(p)} \equiv k_{(p)}-k$ and we call it the "perturbation on the coupling factor" or the "perturbation on k" due to an extraneous object, p.

We also define $\beta_{(p)} \equiv k_{(p)}/k$ and we call it the "coupling factor insensitivity" or the "k-insensitivity". Lower indices, such as $\beta_{12(p)}$, indicate the resonators to which the perturbed and unperturbed coupling factor is referred to, namely $\beta_{12(p)} \equiv k_{12(p)}/k_{12}$.

Similarly, we describe U as the strong-coupling factor in the absence of extraneous objects. We denote the strong-coupling factor in the presence of an extraneous object, p, as $U_{(p)}$, $U_{(p)}=k_{(p)}\sqrt{Q_{1(p)}Q_{2(p)}}$, and call it the "perturbed strong-coupling factor" or the "perturbed U". Note that the strong-coupling factor U may also be characterized as "unperturbed", when necessary to distinguish from the perturbed strong-coupling factor $U_{(p)}$. Note that the strong-coupling factor U may also be characterized as "unperturbed", when necessary to distinguish from the perturbed strong-coupling factor $U_{(p)}$.

We define $\delta U_{(p)} \equiv U_{(p)} - U$ and call it the "perturbation on the strong-coupling factor" or the "perturbation on U" due to an extraneous object, p.

We also define $\Xi_{(p)} \equiv U_{(p)}/U$ and call it the "strong-coupling factor insensitivity" or the "U-insensitivity". Lower indices, such as $\Xi_{12(p)}$, indicate the resonators to which the perturbed and unperturbed coupling factor refers, namely $\Xi_{12(p)} \equiv U_{12(p)}/U_{12}$.

The efficiency of the energy exchange in a perturbed system may be given by the same formula giving the efficiency of the unperturbed system, where all parameters such as strong-coupling factors, coupling factors, and quality factors are replaced by their perturbed equivalents. For example, in a system of wireless energy transfer including one source and one device resonator, the optimal efficiency may calculated as $\eta_{(p)} = [U_{(p)}/(1+\sqrt{1+U_{(p)}^2})]^2$. Therefore, in a system of wireless energy exchange which is perturbed by extraneous objects, large perturbed strong-coupling factors, $U_{mn(p)}$, between at least some or all of the multiple resonators may be desired for a high system efficiency in the wireless energy transfer. Source, device and/or intermediate resonators may have a high $Q_{(p)}$.

Some extraneous perturbations may sometimes be detrimental for the perturbed strong-coupling factors (via large perturbations on the coupling factors or the quality factors). Therefore, techniques may be used to reduce the effect of extraneous perturbations on the system and preserve large strong-coupling factor insensitivities.

Efficiency of Energy Exchange

The so-called "useful" energy in a useful energy exchange is the energy or power that must be delivered to a device (or devices) in order to power or charge the device. The transfer efficiency that corresponds to a useful energy exchange may be system or application dependent. For example, high power vehicle charging applications that transfer kilowatts of power may need to be at least 80% efficient in order to supply useful amounts of power resulting in a useful energy exchange sufficient to recharge a vehicle battery, without significantly heating up various components of the transfer system. In some consumer electronics applications, a useful energy exchange may include any energy transfer efficiencies greater than 10%, or any other amount acceptable to keep rechargeable batteries "topped off" and running for long periods of time. For some wireless sensor applications, transfer efficiencies that are much less than 1% may be adequate for powering multiple low power sensors from a single source located a significant distance from the sensors. For still other applications, where wired power transfer is either impossible or impractical, a wide range of transfer efficiencies may be acceptable for a useful energy exchange and may be said to supply useful power to devices in those applications. In general, an operating distance is any distance over which a useful energy exchange is or can be maintained according to the principles disclosed herein.

A useful energy exchange for a wireless energy transfer in a powering or recharging application may be efficient, highly efficient, or efficient enough, as long as the wasted energy levels, heat dissipation, and associated field strengths are within tolerable limits. The tolerable limits may depend on the application, the environment and the system location. Wireless energy transfer for powering or recharging applications may be efficient, highly efficient, or efficient enough, as long as the desired system performance may be attained for the reasonable cost restrictions, weight restrictions, size restrictions, and the like. Efficient energy transfer may be determined relative to that which could be achieved using traditional inductive techniques that are not high-Q systems. Then, the energy transfer may be defined as being efficient, highly efficient, or efficient enough, if more energy is delivered than could be delivered by similarly sized coil structures in traditional inductive schemes over similar distances or alignment offsets.

Note that, even though certain frequency and Q matching conditions may optimize the system efficiency of energy transfer, these conditions may not need to be exactly met in order to have efficient enough energy transfer for a useful energy exchange. Efficient energy exchange may be realized so long as the relative offset of the resonant frequencies ($|\omega_m - \omega_n|/\sqrt{\omega_m \omega_n}$) is less than approximately the maximum among $1/Q_{m(p)}$, $1/Q_{n(p)}$ and $k_{mn(p)}$. The Q matching condition may be less critical than the frequency matching condition for efficient energy exchange. The degree by which the strong-loading factors, $U_{m[l]}$, of the resonators due to generators and/or loads may be away from their optimal values and still have efficient enough energy exchange depends on the particular system, whether all or some of the generators and/or loads are Q-mismatched and so on.

Therefore, the resonant frequencies of the resonators may not be exactly matched, but may be matched within the above tolerances. The strong-loading factors of at least some of the resonators due to generators and/or loads may not be exactly matched to their optimal value. The voltage levels, current levels, impedance values, material parameters, and the like may not be at the exact values described in the disclosure but will be within some acceptable tolerance of those values. The system optimization may include cost, size, weight, complexity, and the like, considerations, in addition to efficiency, Q, frequency, strong coupling factor, and the like, considerations. Some system performance parameters, specifications, and designs may be far from optimal in order to optimize other system performance parameters, specifications and designs.

In some applications, at least some of the system parameters may be varying in time, for example because components, such as sources or devices, may be mobile or aging or because the loads may be variable or because the perturbations or the environmental conditions are changing etc. In these cases, in order to achieve acceptable matching conditions, at least some of the system parameters may need to be dynamically adjustable or tunable. All the system parameters may be dynamically adjustable or tunable to achieve approximately the optimal operating conditions. However, based on the discussion above, efficient enough energy exchange may be realized even if some system parameters are not variable. In some examples, at least some of the devices may not be dynamically adjusted. In some examples, at least some of the sources may not be dynamically adjusted. In some examples, at least some of the intermediate resonators may not be dynamically adjusted. In some examples, none of the system parameters may be dynamically adjusted.

Electromagnetic Resonators

The resonators used to exchange energy may be electromagnetic resonators. In such resonators, the intrinsic energy decay rates, $\Gamma_m$, are given by the absorption (or resistive) losses and the radiation losses of the resonator.

The resonator may be constructed such that the energy stored by the electric field is primarily confined within the structure and that the energy stored by the magnetic field is primarily in the region surrounding the resonator. Then, the energy exchange is mediated primarily by the resonant magnetic near-field. These types of resonators may be referred to as magnetic resonators.

The resonator may be constructed such that the energy stored by the magnetic field is primarily confined within the structure and that the energy stored by the electric field is primarily in the region surrounding the resonator. Then, the energy exchange is mediated primarily by the resonant electric near-field. These types of resonators may be referred to as electric resonators.

Note that the total electric and magnetic energies stored by the resonator have to be equal, but their localizations may be quite different. In some cases, the ratio of the average electric field energy to the average magnetic field energy specified at a distance from a resonator may be used to characterize or describe the resonator.

Electromagnetic resonators may include an inductive element, a distributed inductance, or a combination of inductances with inductance, L, and a capacitive element, a distributed capacitance, or a combination of capacitances, with capacitance, C. A minimal circuit model of an electromagnetic resonator 102 is shown in FIG. 6a. The resonator may include an inductive element 108 and a capacitive element 104. Provided with initial energy, such as electric field energy stored in the capacitor 104, the system will oscillate as the capacitor discharges transferring energy into magnetic field energy stored in the inductor 108 which in turn transfers energy back into electric field energy stored in the capacitor 104.

The resonators 102 shown in FIGS. 6(b)(c)(d) may be referred to as magnetic resonators. Magnetic resonators may be preferred for wireless energy transfer applications in populated environments because most everyday materials including animals, plants, and humans are non-magnetic (i.e., $\mu_r \approx 1$), so their interaction with magnetic fields is minimal and due primarily to eddy currents induced by the time-variation of the magnetic fields, which is a second-order effect. This characteristic is important both for safety reasons and because it reduces the potential for interactions with extraneous environmental objects and materials that could alter system performance.

FIG. 6d shows a simplified drawing of some of the electric and magnetic field lines associated with an exemplary magnetic resonator 102B. The magnetic resonator 102B may include a loop of conductor acting as an inductive element 108 and a capacitive element 104 at the ends of the conductor loop. Note that this drawing depicts most of the energy in the region surrounding the resonator being stored in the magnetic field, and most of the energy in the resonator (between the capacitor plates) stored in the electric field. Some electric field, owing to fringing fields, free charges, and the time varying magnetic field, may be stored in the region around the resonator, but the magnetic resonator may be designed to confine the electric fields to be close to or within the resonator itself, as much as possible.

The inductor 108 and capacitor 104 of an electromagnetic resonator 102 may be bulk circuit elements, or the inductance and capacitance may be distributed and may result from the way the conductors are formed, shaped, or positioned, in the structure. For example, the inductor 108 may be realized by shaping a conductor to enclose a surface area, as shown in FIGS. 6(b)(c)(d). This type of resonator 102 may be referred to as a capacitively-loaded loop inductor. Note that we may use the terms "loop" or "coil" to indicate generally a conducting structure (wire, tube, strip, etc.), enclosing a surface of any shape and dimension, with any number of turns. In FIG. 6b, the enclosed surface area is circular, but the surface may be any of a wide variety of other shapes and sizes and may be designed to achieve certain system performance specifications. As an example to indicate how inductance scales with physical dimensions, the inductance for a length of circular conductor arranged to form a circular single-turn loop is approximately, $$L = \mu_0 x \left( \ln \frac{8x}{a} - 2 \right),$$

where $\mu_0$ is the magnetic permeability of free space, x, is the radius of the enclosed circular surface area and, a, is the radius of the conductor used to form the inductor loop. A more precise value of the inductance of the loop may be calculated analytically or numerically.

The inductance for other cross-section conductors, arranged to form other enclosed surface shapes, areas, sizes, and the like, and of any number of wire turns, may be calculated analytically, numerically or it may be determined by measurement. The inductance may be realized using inductor elements, distributed inductance, networks, arrays, series and parallel combinations of inductors and inductances, and the like. The inductance may be fixed or variable and may be used to vary impedance matching as well as resonant frequency operating conditions.

There are a variety of ways to realize the capacitance required to achieve the desired resonant frequency for a resonator structure. Capacitor plates 110 may be formed and utilized as shown in FIG. 6b, or the capacitance may be distributed and be realized between adjacent windings of a multi-loop conductor 114, as shown in FIG. 6c. The capacitance may be realized using capacitor elements, distributed capacitance, networks, arrays, series and parallel combinations of capacitances, and the like. The capacitance may be fixed or variable and may be used to vary impedance matching as well as resonant frequency operating conditions.

It is to be understood that the inductance and capacitance in an electromagnetic resonator 102 may be lumped, distributed, or a combination of lumped and distributed inductance and capacitance and that electromagnetic resonators may be realized by combinations of the various elements, techniques and effects described herein.

Electromagnetic resonators 102 may be include inductors, inductances, capacitors, capacitances, as well as additional circuit elements such as resistors, diodes, switches, amplifiers, diodes, transistors, transformers, conductors, connectors and the like.

Resonant Frequency of an Electromagnetic Resonator

An electromagnetic resonator 102 may have a characteristic, natural, or resonant frequency determined by its physical properties. This resonant frequency is the frequency at which the energy stored by the resonator oscillates between that stored by the electric field, $W_E$, ($W_E = q^2/2C$, where q is the charge on the capacitor, C) and that stored by the magnetic field, $W_B$, ($W_B = Li^2/2$, where i is the current through the inductor, L) of the resonator. In the absence of any losses in the system, energy would continually be exchanged between the electric field in the capacitor 104 and the magnetic field in the inductor 108. The frequency at which this energy is exchanged may be called the characteristic frequency, the natural frequency, or the resonant frequency of the resonator, and is given by ω, $$\omega = 2\pi f = \sqrt{\frac{1}{LC}}.$$

The resonant frequency of the resonator may be changed by tuning the inductance, L, and/or the capacitance, C, of the resonator. The resonator frequency may be design to operate at the so-called ISM (Industrial, Scientific and Medical) frequencies as specified by the FCC. The resonator frequency may be chosen to meet certain field limit specifications, specific absorption rate (SAR) limit specifications, electromagnetic compatibility (EMC) specifications, electromagnetic interference (EMI) specifications, component size, cost or performance specifications, and the like.

Quality Factor of an Electromagnetic Resonator

Figure 6:
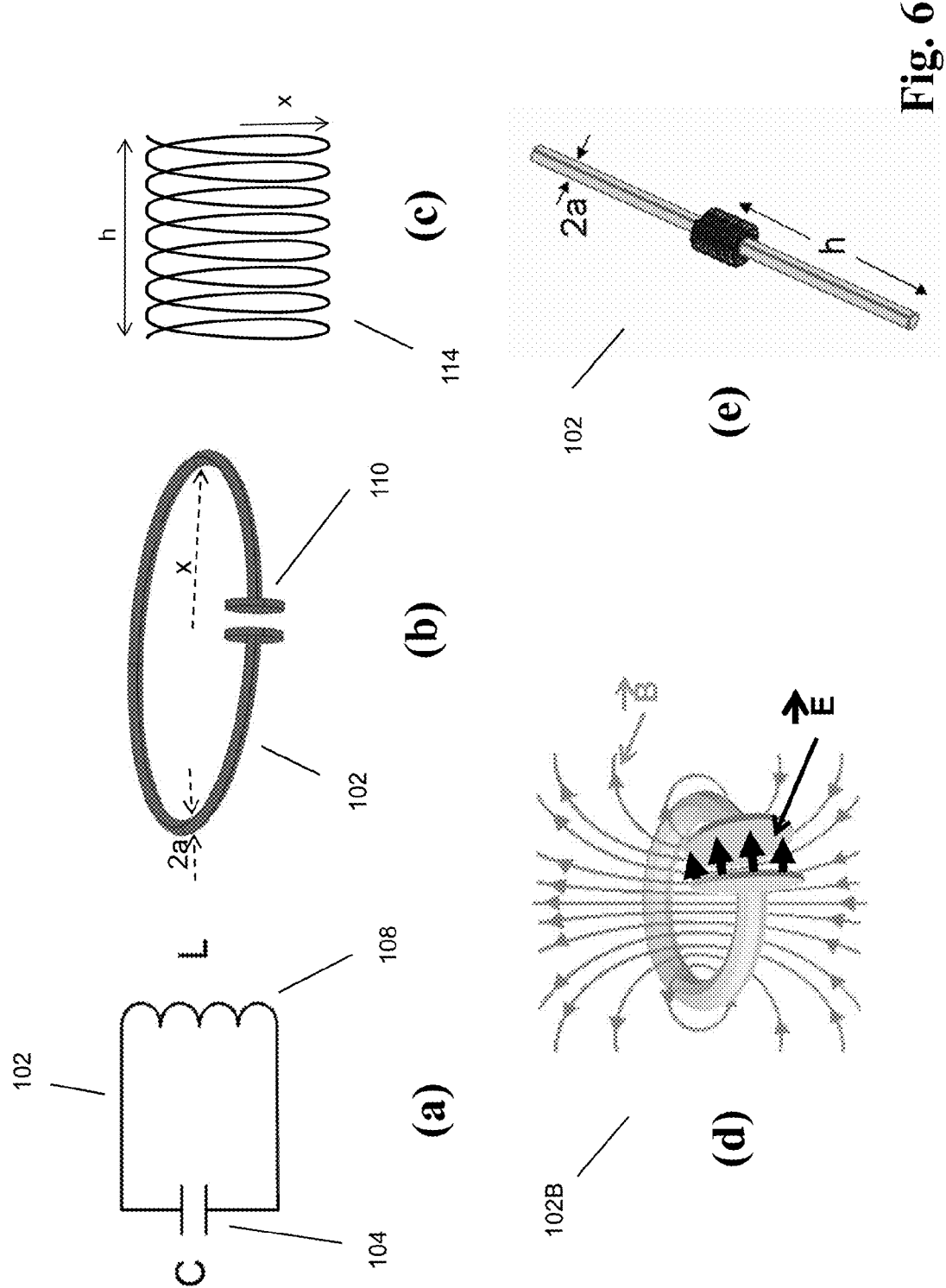
FIG. 6(a) shows a circuit diagram of one example of a resonator.
FIG. 6(b) shows a diagram of one example of a capacitively-loaded inductor loop magnetic resonator.
FIG. 6(c) shows a drawing of a self-resonant coil with distributed capacitance and inductance.
FIG. 6(d) shows a simplified drawing of the electric and magnetic field lines associated with an exemplary magnetic resonator of the current disclosure.
FIG. 6(e) shows a diagram of one example of an electric resonator.

The energy in the resonators 102 shown in FIG. 6 may decay or be lost by intrinsic losses including absorptive losses (also called ohmic or resistive losses) and/or radiative losses. The Quality Factor, or Q, of the resonator, which characterizes the energy decay, is inversely proportional to these losses. Absorptive losses may be caused by the finite conductivity of the conductor used to form the inductor as well as by losses in other elements, components, connectors, and the like, in the resonator. An inductor formed from low loss materials may be referred to as a "high-Q inductive element" and elements, components, connectors and the like with low losses may be referred to as having "high resistive Q's". In general, the total absorptive loss for a resonator may be calculated as the appropriate series and/or parallel combination of resistive losses for the various elements and components that make up the resonator. That is, in the absence of any significant radiative or component/connection losses, the Q of the resonator may be given by $Q_{abs}$, $$Q_{abs} = \frac{\omega L}{R_{abs}},$$

where ω, is the resonant frequency, L, is the total inductance of the resonator and the resistance for the conductor used to form the inductor, for example, may be given by $R_{abs}=l\rho/A$, (l is the length of the wire, ρ is the resistivity of the conductor material, and A is the cross-sectional area over which current flows in the wire). For alternating currents, the cross-sectional area over which current flows may be less than the physical cross-sectional area of the conductor owing to the skin effect. Therefore, high-Q magnetic resonators may be composed of conductors with high conductivity, relatively large surface areas and/or with specially designed profiles (e.g. Litz wire) to minimize proximity effects and reduce the AC resistance.

The magnetic resonator structures may include high-Q inductive elements composed of high conductivity wire, coated wire, Litz wire, ribbon, strapping or plates, tubing, paint, gels, traces, and the like. The magnetic resonators may be self-resonant, or they may include external coupled elements such as capacitors, inductors, switches, diodes, transistors, transformers, and the like. The magnetic resonators may include distributed and lumped capacitance and inductance. In general, the Q of the resonators will be determined by the Q's of all the individual components of the resonator.

Because Q is proportional to inductance, L, resonators may be designed to increase L, within certain other constraints. One way to increase L, for example, is to use more than one turn of the conductor to form the inductor in the resonator. Design techniques and trade-offs may depend on the application, and a wide variety of structures, conductors, components, and resonant frequencies may be chosen in the design of high-Q magnetic resonators.

In the absence of significant absorption losses, the Q of the resonator may be determined primarily by the radiation losses, and given by, $Q_{rad}=\omega L/R_{rad}$, where $R_{rad}$ is the radiative loss of the resonator and may depend on the size of the resonator relative to the frequency, ω, or wavelength, λ, of operation. For the magnetic resonators discussed above, radiative losses may scale as $R_{rad} \sim (x/\lambda)^4$ (characteristic of magnetic dipole radiation), where x is a characteristic dimension of the resonator, such as the radius of the inductive element shown in FIG. 6b, and where λ=c/f, where c is the speed of light and f is as defined above. The size of the magnetic resonator may be much less than the wavelength of operation so radiation losses may be very small. Such structures may be referred to as sub-wavelength resonators. Radiation may be a loss mechanism for non-radiative wireless energy transfer systems and designs may be chosen to reduce or minimize $R_{rad}$. Note that a high-$Q_{rad}$ may be desirable for non-radiative wireless energy transfer schemes.

Note too that the design of resonators for non-radiative wireless energy transfer differs from antennas designed for communication or far-field energy transmission purposes. Specifically, capacitively-loaded conductive loops may be used as resonant antennas (for example in cell phones), but those operate in the far-field regime where the radiation Q's are intentionally designed to be small to make the antenna efficient at radiating energy. Such designs are not appropriate for the efficient near-field wireless energy transfer technique disclosed in this application.

Figure 7:
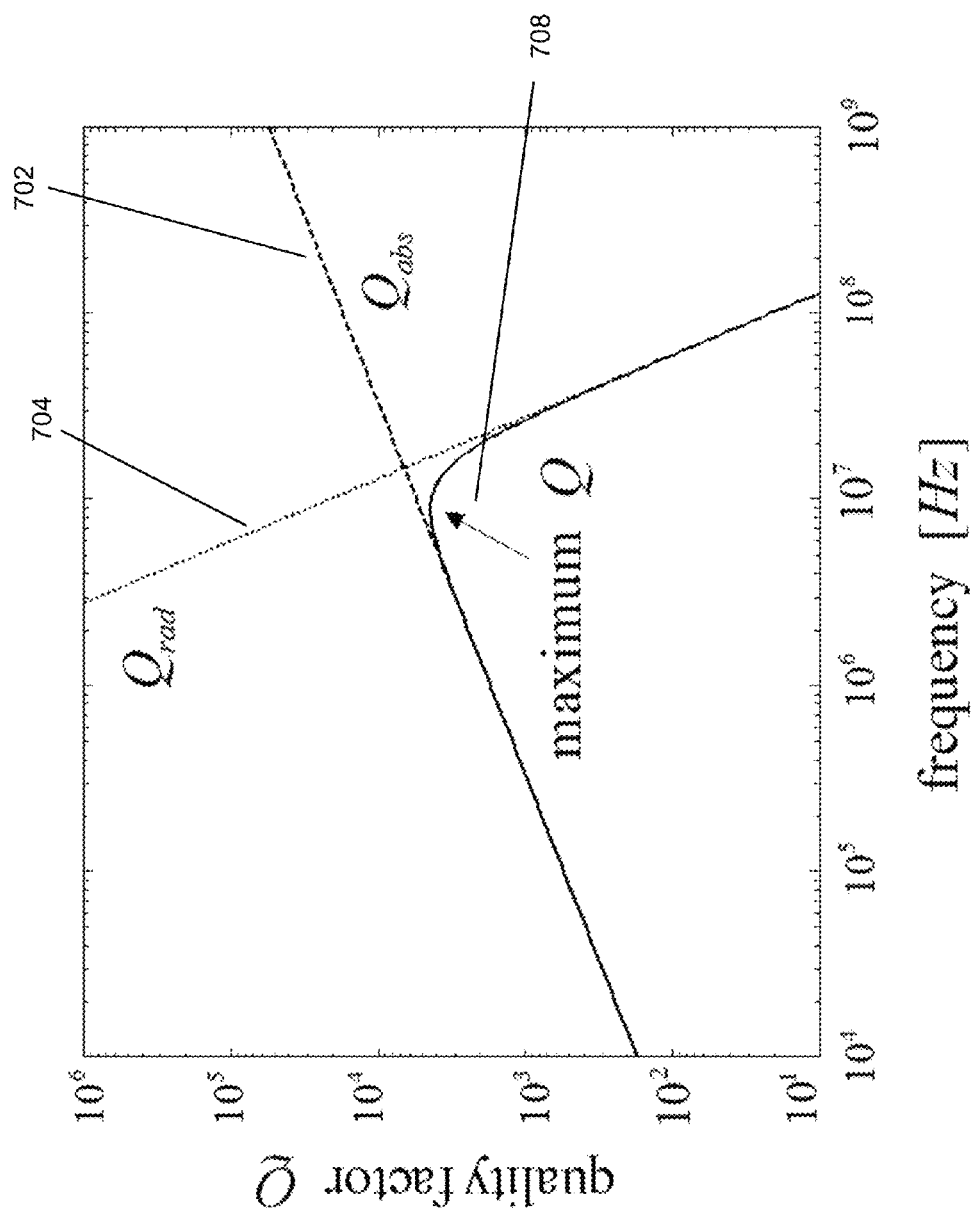
FIG. 7 shows a plot of the "quality factor", Q (solid line), as a function of frequency, of an exemplary resonator that may be used for wireless power transmission at MHz frequencies. The absorptive Q (dashed line) increases with frequency, while the radiative Q (dotted line) decreases with frequency, thus leading the overall Q to peak at a particular frequency.

The quality factor of a resonator including both radiative and absorption losses is $Q=\omega L/(R_{abs}+R_{rad})$. Note that there may be a maximum Q value for a particular resonator and that resonators may be designed with special consideration given to the size of the resonator, the materials and elements used to construct the resonator, the operating frequency, the connection mechanisms, and the like, in order to achieve a high-Q resonator. FIG. 7 shows a plot of Q of an exemplary magnetic resonator (in this case a coil with a diameter of 60 cm made of copper pipe with an outside diameter (OD) of 4 cm) that may be used for wireless power transmission at MHz frequencies. The absorptive Q (dashed line) 702 increases with frequency, while the radiative Q (dotted line) 704 decreases with frequency, thus leading the overall Q to peak 708 at a particular frequency. Note that the Q of this exemplary resonator is greater than 100 over a wide frequency range. Magnetic resonators may be designed to have high-Q over a range of frequencies and system operating frequency may set to any frequency in that range.

When the resonator is being described in terms of loss rates, the Q may be defined using the intrinsic decay rate, 2Γ, as described previously. The intrinsic decay rate is the rate at which an uncoupled and undriven resonator loses energy. For the magnetic resonators described above, the intrinsic loss rate may be given by $\Gamma=(R_{abs}+R_{rad})/2L$, and the quality factor, Q, of the resonator is given by Q=ω/2Γ.

Note that a quality factor related only to a specific loss mechanism may be denoted as $Q_{mechanism}$, if the resonator is not specified, or as $Q_{l,mechanism}$, if the resonator is specified (e.g. resonator 1). For example, $Q_{l,rad}$ is the quality factor for resonator 1 related to its radiation losses.

Section I—Wireless Energy System Probe/Calibrator

The following section describes embodiments using wireless energy transfer modeling and simulation to help a user in optimizing energy transfer efficiency. Extensive discussion of wireless energy transfer modeling and simulation is provided, for example, in commonly owned, U.S. patent application Ser. No. 13/668,756 published on Jun. 2, 2012 as US publication 2012/0159956 A1 and entitled "Wireless energy transfer modeling tool".

Figure 8:
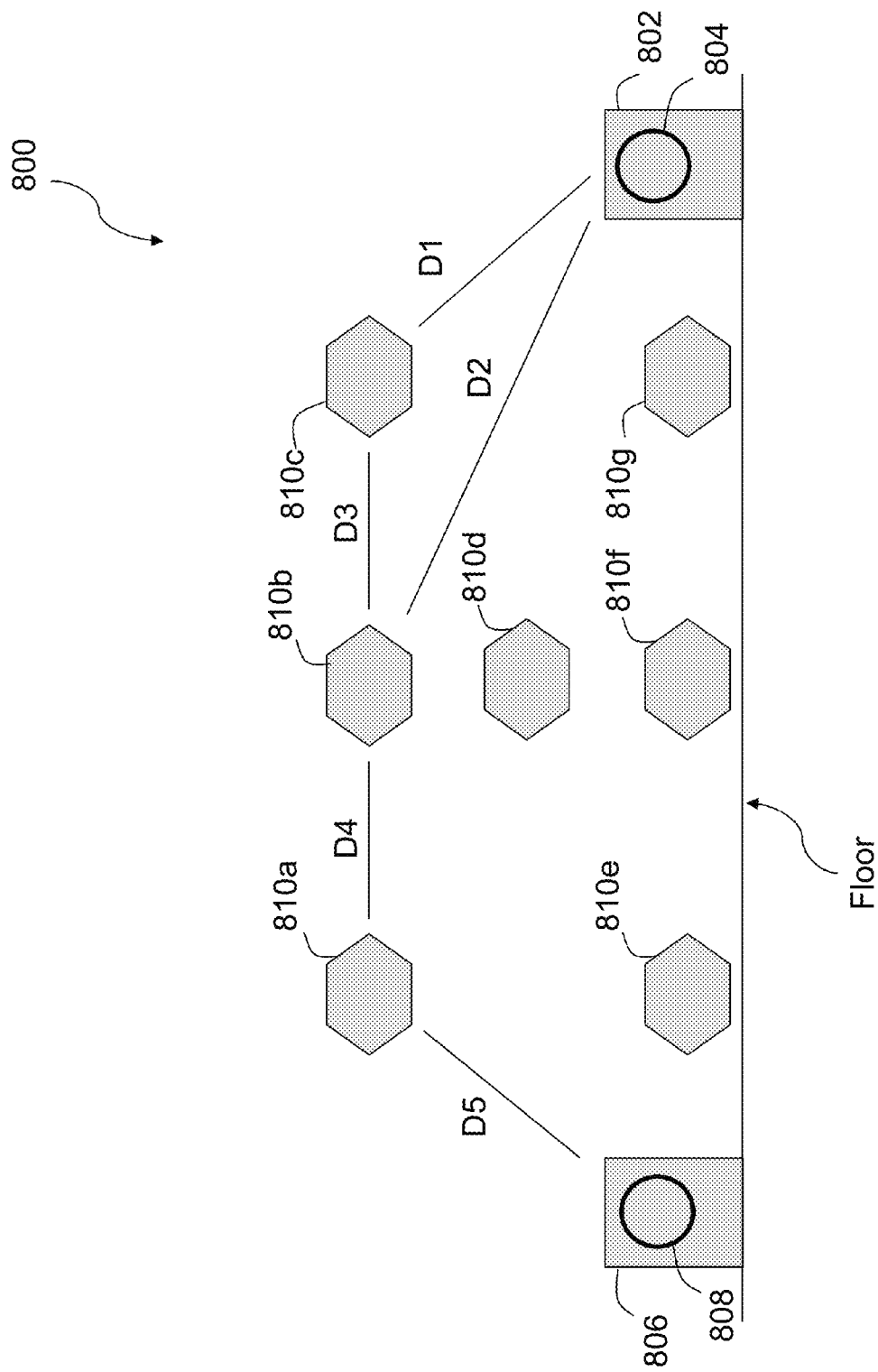
FIG. 8 depicts an exemplary wireless power system containing system components including a source resonator and device resonator separated by a set of repeater resonators separated from adjacent system components by distances Dn, where n equals 1 through 5.

FIG. 8 is a two-dimensional plan view, showing an example wireless power system 800 or "network" deployed in a room, which may comprise at least one wireless power source or transmitter 802 with at least one source resonator coil 804 and power receiver or device 806 with at least one device resonator coil 808. The power receiver 806 can be realized as a component of a device 806 such as a laptop, lamp, smartphone, or TV. In this example, the device 806 is a large screen TV situated on the floor. FIG. 8 also shows repeaters 810a-810g, which can be passive resonators that allow transmitted energy to "hop" with good efficiency in order to travel larger distances than would be practically feasible using only the transmitter 802. Repeater resonators 810 have been described in U.S. Pat. No. 7,825,543 issued Nov. 2, 2010 and entitled "Wireless energy transfer," and U.S. patent application Ser. No. 12/720,866 published on Oct. 14, 2010 as U.S. publication 2010/0259108 A1 and entitled "Wireless energy transfer using repeater resonators," which are incorporated by reference herein. As is shown in FIG. 10(a) and FIG. 10(b), the repeaters may be located on the back wall of a room, and the device 806 may be slightly closer to the wall then the transmitter 802. Although the coils 804, 808 are shown as being parallel to the page, this is for illustration purposely only. In the figures, the orientations may be made to provide a clear illustration of the figure, while in practice the system components and coils are preferably oriented for improved wireless power transmission and reception, when this is possible. The repeaters 810 can contain circuits which allow them to be tuned (e.g., by changing their impedance properties), detuned, or otherwise adjusted.

In order to efficiently transmit energy from the source coil 804 to the device coil 808, the repeaters 810 may be spaced at locations that are determined by the specifications, or "operational characteristics", of the repeater and other wireless power system 800 components. In embodiments, the source and/or device and/or repeater resonator locations may be preferably adjusted to improve some aspect of wireless power transmission. For example, if repeaters 810 are placed closely together then the cost and complexity of implementing the system 800 may increase without providing any additional benefit. If repeaters are spaced far apart, there may be inefficient transfer which can cause unwanted effects on wireless system performance. For example, the power needed by the device 806 may not adequately be supplied by the system 800 and/or efficiency of the system may be decreased.

In the determination of appropriate locations for repeaters 810, several parameters (e.g., transmission strength of transmitter) can come into play. These factors can be entered by a user and operated upon by a modeling module of a wireless power system 800, such as the modeling module 1322 shown in FIG. 13 of a portable programmer-calibrator (PPC) 1002, which has other modules that communicate with the modeling module 1322 to allow for operations which may include but may not be limited to modeling, measurement, calibration, testing, control, operation, adjustment, and simulation of a wireless power system 800. The modeling module 1322 may be configured to model at least two (2) real or simulated wireless system components, based upon their specifications (which may include real-world or modeled operational characteristics, or operational characteristics stated as accurate by the manufacturer), in order to determine the system characteristics that would be realized by at least one particular embodiment of a wireless power system. In embodiments, when the PPC 1002 is configured with sensing or communication means then empirical measurements related to the actual operation of the network 800 can be used in the modeling module 1322 as well.

Figure 9:
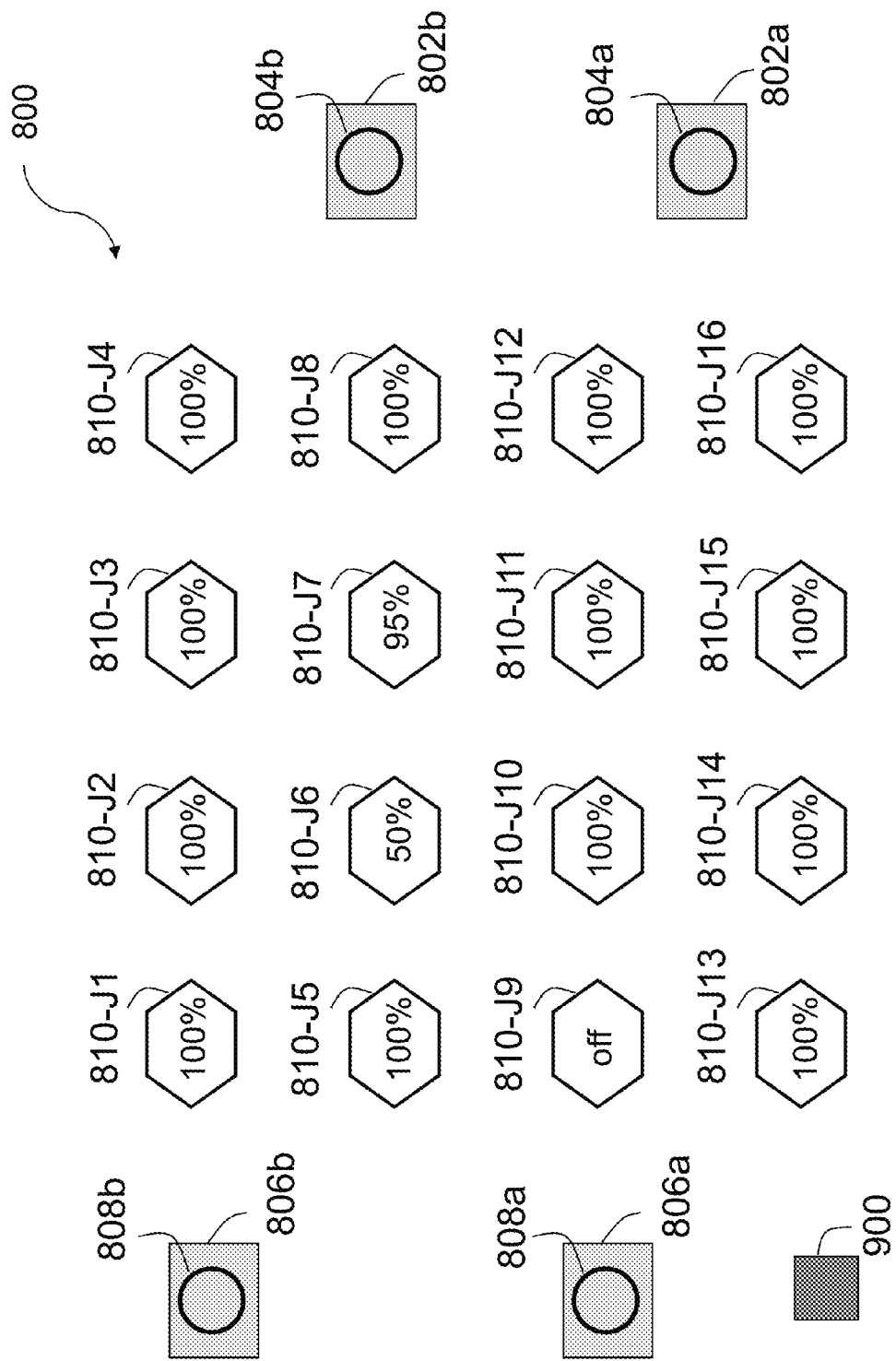
FIG. 9 depicts an alternative view of an exemplary wireless power system which includes multiple sources, devices, repeaters and a wireless power system manager.

FIG. 9 is an exemplary plan view showing an alternative example wireless power system 800 deployed in a room, which comprises first and second wireless power transmitters 802a, 802b each with at least one source resonator coil 804a and 804b. The system also contains two power receivers 806a, 806b each with at least one device resonator coil 808a and 808b. There are also repeaters 810-J1 to 810-J16 which in this illustration are tile repeaters, in other words, floor tiles with built in repeaters 810. The repeaters can be modular "repeater cells" and can be inserted into, and removed from, the tiles in order to replace faulty "repeater cells". The repeaters have been labeled with 100%, 95%, or 50% to represent the efficiencies measured during an exemplary calibration routine. Further, there is a repeater which has been programmed to be "off", which is a functional status that may have been set by toggling a control on the repeater itself, either manually or programmably (e.g., a schedule implemented by a timer in the repeater), or via a communication command sent from another component (e.g. the transmitter 802) in the wireless power system. A system component which is "off" may be adjusted so that the relevant resonator is detuned, and therefore does not interact, or minimally interacts with the other components of the wireless power system 800. Other manners of adjusting a component of the system 800 to be in an "off" state will be discussed. A wireless system manager 900 is also shown, which may be implemented either as an independent component, or as a module of a transmitter 802, repeater 810, receiver 806, modeling module 1322 of a PPC 1002, and/or device 806, such as a computer, smart-phone, or a processor chip which may be hard coded or configured to run software for providing wireless system management. When a repeater is configured with a wireless system manager 900, then it may be termed a "master" component and may communicate with and/or control other components of the wireless power system 800.

The resonators of a wireless power system 800 may be named or numbered or otherwise uniquely identified. They may be referred to as source resonators, device resonators, first resonators, second resonators, repeater resonators, and the like. It is to be understood that while two resonators such as a source resonator 804 and target resonator 808 can constitute a wireless power system other implementations may include three (3) or more resonators, as shown in FIG. 8 and in other examples. For example, a single source resonator 804 may transfer energy to multiple device resonators 808 (or to multiple devices attached to a single resonator 808). Energy may also be transferred from a first device 806 to a second, and then from the second device to the third, and so forth. Multiple source transmitters 802 may transfer energy to a single device 806 or to multiple devices connected to a single device resonator or to multiple devices connected to multiple device resonators.

Resonators 804, 808 may serve alternately or simultaneously as transmitting resonators 804, and harvesting resonators 808, or they may temporarily function as active or passive repeaters to relay power from a source in one location to a device in another location. Intermediate electromagnetic resonators may be used to extend the distance range of wireless energy transfer systems, and may be termed "repeaters" 810. As will be shown, multiple resonators may be daisy chained together (by physically contacting each other and/or by interacting wirelessly) and can serve to transmit energy over extended distances and with a wide range of sources and devices. When a high power level is to be transferred, then the power may be distributed across multiple source resonators 804 and then transferred to a target resonator 808*a*, or to multiple target resonators or devices and these resonators and/or devices may then recombine the power at a relatively distal location. Additionally, certain paths of transmission within a room may be configured for higher power transmission while other paths are independently provided with different power loads and/or for different power transmission levels.

Since the strong-coupling factor between resonators may be determined by the relative magnitudes of the loss mechanisms of each resonator and the coupling mechanism between the two resonators, the strength of any or all of these mechanisms may be perturbed in the presence of extraneous objects in the vicinity of the resonators. Extraneous perturbations may sometimes be detrimental and may lower the perturbed strong-coupling factors (via large perturbations on the coupling factors or the quality factors). Therefore, as will be described, techniques, devices, and arrangements may be used to reduce the effect of extraneous perturbations on the system and preserve large strong-coupling factor insensitivities.

In some applications, system parameters may vary in time. For example, variations may occur because components, such as sources or device resonators 804, 808, may be mobile, defective, or deficient due to aging associated with normal use or damage due to an acute event, and because the loads may be variable or because the perturbations or the environmental conditions are changing etc. In these cases, in order to achieve acceptable transmission efficiency (via reasonable matching conditions), at least some of the system parameters may need to be adjustable or tunable. As will be discussed, in cases where compensation adjustments cannot be made to a sufficient extent then power transmission may be halted completely in order to decrease the wasting of power, and alternatively an alert or message may be provided to a user of the system.

All the system parameters may be adjustable or tunable to achieve approximately the desired operating conditions. However, sufficiently efficient energy exchange may be realized even if some system parameters are not variable. In some examples, at least some of the system components may not be dynamically adjusted. Further, at least some of the sources, targets or repeater resonator circuits or devices may not be dynamically adjusted. System calibration and monitoring routines may identify when energy exchange is not optimal, and transmission may be halted or the paths of transmission may be changed. Accordingly, there may be default paths which are used, and there may also be "alternative" or "back up" paths that are relied upon when the default path does not produce the desired results.

Figure 10:
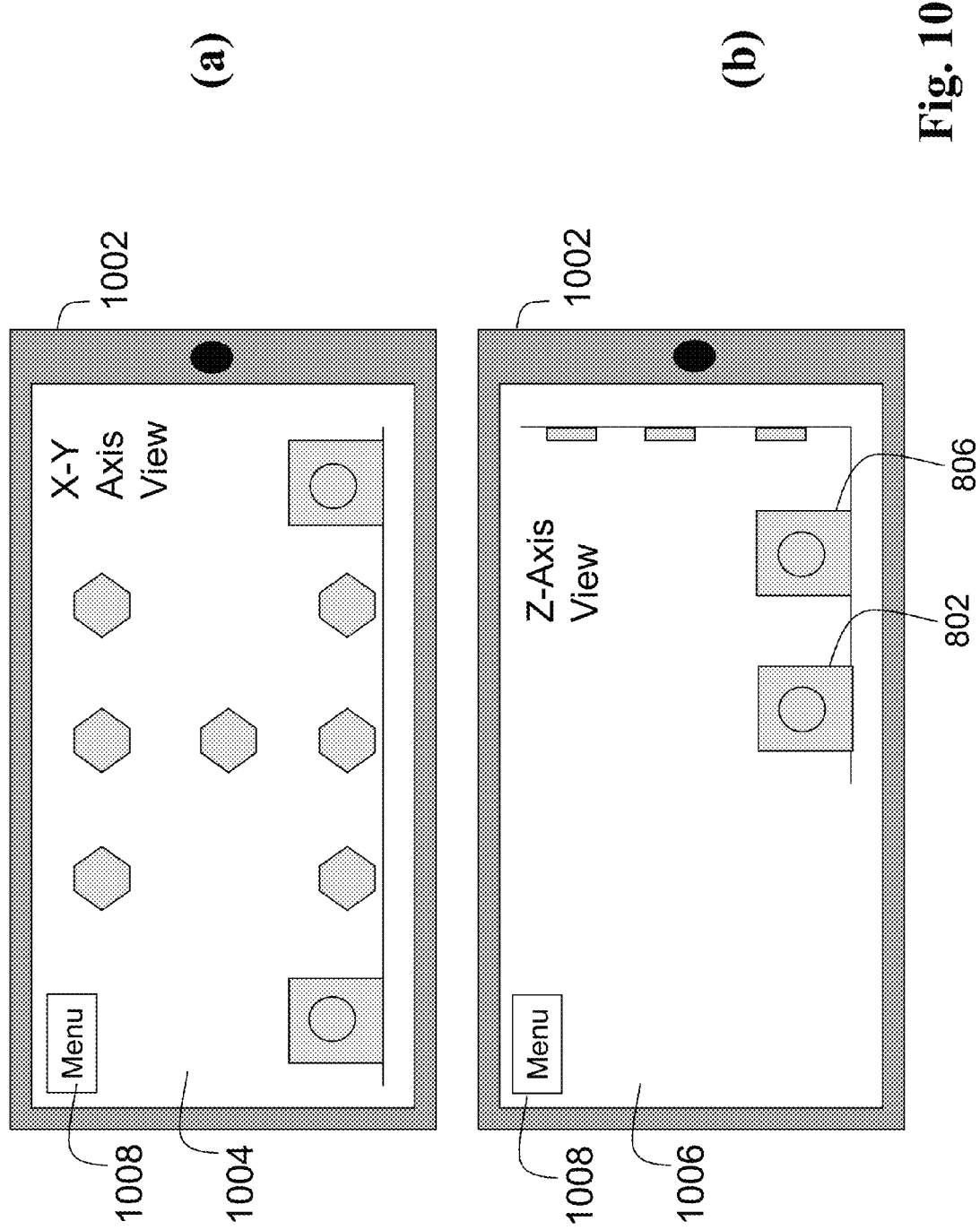
FIG. 10(a) shows a first calibration screen depicting an x-y axis of a wireless power system portable programmer-calibrator (PPC), realized on a computer tablet.
FIG. 10(b) shows a second calibration screen depicting a z-axis of a wireless power system programmer-calibration (PPC), realized on a computer tablet.

FIG. 10(*a*) shows an exemplary first calibration screen 1004 of a first type of wireless power system portable programmer-calibrator device (PPC) 1002, realized on a computer tablet and configured to run software that allows, for example, modeling, calibration, and control of a wireless power system 800. The display 1004 may depict an x-y axis representation of a wireless power system 800 as shown in FIG. 8. FIG. 10(*b*) shows a second exemplary calibration screen 1006 depicting a z-axis representation of the same room. The computer tablet can be generic tablet such as an iPad™ or Google Nexus™ which contains all the software and hardware required for PPC operation including, for example, wireless communication, processing, control, display, memory storage, power supply, GPS or other location capability, user interaction, image capture (video/camera) functionality, etc. The tablet can also be an electronic reader such as Nook™ or Amazon Kindle™ which is outfitted with wireless-power system simulation and evaluation capability (WSSE), realized by software, or a software module, or a physical module which may be attached via USB, for example, or a web-based service or program which may communicate with the tablet using wireless connectivity. The PPC 1002 can also be realized using a laptop, desktop, smartphone, or other comparable device having any or all of the processor, memory, display, and related components found in conventional computing devices. The WSSE can also be implemented as part of a modeling module 1322 implemented by the PPC 1002.

In order to set-up, maintain, adjust, and calibrate a wireless power system 800 in various settings, a user may wish to be able to relatively easily establish a wireless power system 800 that operates more or less as expected. The WSSE can assist with this initial set-up as well as with other tasks. In exemplary embodiments, and based upon the needs of the power system, the shape and characteristics of the environment in which the system 800 may operate, and the structures which may be present in, or which may enter, the environment during operation, a user may be able to determine where to situate various components of the wireless power system 800, may be able to set (or tell the system to set) correct operating parameters, and may be able to determine if the system is working effectively or has a problem.

The WSSE may allow a user to calculate and/or predict parameters and efficiencies when setting up a wireless system 800. For example, if a room is a 15' by 15' room with a transmitter on one side and a TV on the other, the user may use the WSSE to determine how many repeaters may be used to transmit power between the wireless source and the TV. The user may take a snapshot of the room or download a three dimensional model of the room into the WSSE and may operate the WSSE to determine an optimal number of repeaters in order to achieve a certain wireless power transfer efficiency which may be a user settable parameter and that may have a minimum value reflecting practical issues such as heat dissipation and human exposure limits A user may restrict certain regions of the room where repeaters may or may not be placed and the WSSE may optimize repeater placement given those restrictions. In embodiments, a used may specify the types of repeaters and/or the cost of repeaters and/or the size of repeaters that the WSSE may use to route wireless power from a source to the TV. In embodiments, a WSSE may include the ability to model other wireless power transfer techniques and may instruct users to use a variety of wireless power schemes in order to realize efficient power distribution in a room. For example, a WSSE may recommend that power delivery to fixed position devices in a room such as a TV, refrigerator, couch, window air conditioning unit, and the like, be realized using directed radio frequency or optical beams and that highly resonant wireless power sources and/or repeaters and/or devices be installed in regions of the rooms where devices are likely to be movable. We envision a highly capable WSSE that can be continually improved through software, firmware, hardware and the like improvements. In addition, a WSSE may be able to store files representing certain spacers within a home, certain components available from near-by stores, certain implementations that have been favorably deployed, and the like. The WSSE may be able to download reviews from the internet and assign scores to certain wireless power components, brands, implementations and the like based on various types of ratings or acquired user reviews and preferentially suggest system implementations that use those components.

The performance of a wireless power system 800, containing at least two components and operating according to a set of parameter values and protocols, can be calculated using modeling operations provided by the WSSE in order to provide predicted wireless system performance data. The data may include operating characteristics related to the modeled performance of a first and second component of a wireless power system 800. The performance results may be calculated using at least one modeling algorithm in the modeling module 1322 that incorporates values reflecting wireless power system 800 characteristics. For example, a basic algorithm may rely upon an operational characteristic for a first and second component of the network, such as the amount of power that is received when the components are separated by 1 foot, and may also rely upon a distance measure related to the first and second component. The algorithm may also incorporate a wireless power system characteristic value that is related to: A) a wireless power transmission protocol that will be used by a first component of the system 800; B) power needs of a second component of the system 800; C) temperature information; D) information related to the relative orientation between at least two resonator coils; E) information provided by a user; F) information that is sensed by at least one sensor of the PPC 1002; G) information that is communicated to the PPC 1002; H) information related to at least one barcode, serial number, or model number; I) information related to a virtual model; J) a set of at least one image captured by a digital camera; and K) GPS and/or RFID data. A further algorithm may include information related to three (3) or more system components, and also may include operational characteristics of these components and distance measures related to the component positions.

The modeled performance results may include the costs for running the system as a function of an interval such as hour, day, month or year as well as incorporating estimates for running the system in a standby, low power, or active state related to average usage of various types of devices. The performance result data may also include a likely range of performance as well as performance rating. For example the range of performance results for a certain measure (e.g., cost) may be categorized. The top 25% may be a preferred range, whereby the system is operating very efficiently and according to the model. The top 26-50% range may represent good, likely, or "acceptable" system performance. The 51-75% range may reflect what might occur if one or more system components is not functioning correctly and is "bad" or "failing". The "76-100%" range of performance may be "unacceptable". In one embodiment the user may compare measured system performance to simulated system performance and evaluate the results within the "performance zone" which corresponds to the empirical results. In an automatic mode, the PPC 1002 may use the modeled results as part of a calibration routine. In this routine the PPC 1002 can do a comparison and reconfigure the system or instruct a user to reconfigure the system if real and modeled results are not similar enough.

If the room is the room shown in FIG. 8(*a*) then the WSSE can represent that room graphically as is shown in FIGS. 10(*a*) and 10(*b*). The model of the room may be created using a graphic-based user interface that allows users to drag and drop components into a simulated model of the room. Alternatively, if the PPC 1002 is configured with a digital camera, then the user may operate the PPC 1002 to take a picture or video of the room and insert or assign values/labels for system components to objects on the screen using a menu option 1008 which, when selected, may provide the user with additional screens housing additional options. For example, the user may click on any object which has been identified on the screen 1004 and define the component which it represents (e.g. a repeater, a transmitter, etc.) as well as assign a value such as the model number or other relevant parameter related to the system component. These options can also be obtained from look-up tables in the WSSE (or modeling module 1322 or memory module 1312). For example, if the user inputs the model number into the PPC 1002, then the modeling module 1322 can use a look up table to associate this with the operating parameters for that model number. Accordingly, the user can input the model number, parameter values, or specifications of a wireless power transmitter 802, repeaters 810*a* and 810*c*, and a device 806 such as a TV, as well as the receiver being used 806 and the protocol which is used by the receiver. The user can then be informed by the WSSE about differences in efficiency, cost per unit hour of use, or other operational characteristic of the wireless power system that would result by adjusting the system 800 according to a particular system specification and operational parameter values. For example, the effects of replacing the repeaters 810*a* and 810*c* with different models of repeaters, or varying the distance measures of the repeaters 810*a* and 810*c*, (either by entering the values using text value or by graphically moving the components on the screen) could be calculated by the WSSE. Distance measures can be discrete distances, ranges, or likely regions (which may be defined by a user graphically indicating which portions of the region are "hot zones" which are those regions in which it is more likely for a device to be present). The wireless power components may be simulated with respect to two dimensional or 3-dimensional distances. Additionally, components may be defined by relative position, orientation, pose, and angles of source and device resonator coils.

Double clicking on any of the components of the screen may allow a user select and then adjust parameters related to a wireless system component. Further, in the case where the room where the system will be implemented is not nearby, then the user can use the PPC 1002 to create a two-dimensional or three-dimensional virtual-world model such as a room. In the case where the components have been purchased and installed then the user can also input the information about each component by entering their serial numbers or using the webcam of the PPC 1002 to scan barcodes of the components. The user can also create models based upon real and/or simulated system 800 components. For example, after entering data related to the actual configuration of a wireless system 800 that is implemented within a room, the user can add additional components (e.g., related to spare system components that may not yet be installed or additional components that the user is considering purchasing) and the PPC 1002 could operate its simulation programs including operation of the modeling module 1322 to show the user the effect of various scenarios. In response to these modeling results, the user may actually install additional system components, swap out already deployed components with alternative components, or order more components. Ordering more components may be managed by purchasing and transaction software provided in the PPC 1002, which places orders over the internet and may also provide for payment of the items using its communication module 1308.

The modeling module 1322 may also be configured to automatically optimize a room design or power transfer scheme based on data related to a selected set of system components and the dimensions of a room, set of rooms, or entire house. The system performance result calculated by the PPC 1002 may then be presented to the user using module 1306. Automatic optimization can be constrained by the user indicating regions where system components may reside or where these may not reside, and the optimization process provided by the WWSE may incorporate these parameters and/or any user inputs. When the simulation program automatically optimizes the arrangement of components of the wireless network 800, the optimization may be calculated according to a set priority. For example, a user could prioritize factors such as cost, reliability of performance, or allowing components to reside within certain ranges of location. Additionally, data related to operating cost and system performance may be presented to the user as tables or graphs. For example, performance results may be plotted as the cost and performance curves related to a particular wireless power system scenario. This representation may be valuable for a user and/or system installer since these results may not change linearly with adjustment to various system components or their locations. Further, certain parameters could be restricted, in various manners. For example, the system design being simulated may require a particular type or strength of wireless power transmitter, and/or the location of a transmitter may be restricted to a certain region. It might also be useful in some instances to allow repeaters to be added to the model, and to allow the operational characteristics of repeater to be specified. Different manufacturers may distinguish themselves by providing the WSSE module with design and optimization software programs that may be customized for their particular system components or wireless power transfer protocols.

The PPC 1002 may also be designed to wirelessly communicate with at least some of the components of the system 800 in order to learn their identity. In this case, the PPC 1002 can also be configured to provide automated or semi-automated automated "power network discovery" and this can occur if a user selects the appropriate menu option 1008. A GPS, RFID, or other technology may assist with this type of automated discovery process. The identifying technology can be implemented within each component in order to allow the computer to construct the room, set-up with no, or little, manual user entry. Although the communication and/or identification technology can reside within the components of the power network system 800, such as in the environmental/location module of a repeater 810, the communication/identification technology can be implemented within a separate calibration facilitation accessory (which may be embodied in a pager-sized device) that can have a subset of the modules of the PPC 1002. The user can place the calibration facilitation accessory on any of the components of the wireless network during the network discovery process so that these may be readily identified. The calibration facilitation accessory can be realized as a programmer accessory 210 which may further connect to system components. Further, during system modeling and calibration the PPC 1002 can set, or the user can manually set, wireless network components into a "discovery mode" in which the components can operate according to routines defined in the control module 1304 to provide an identification "ping" signal, supply wireless power, supply wireless power in a short pattern over an expected interval, dither frequency or impedance, or otherwise assist the PPC 1002 in identifying system components and their operating parameters so that appropriate parameter values may be modeled and/or set. In one embodiment signaling and communication may be performed using an in-band communication channel that uses the same, or similar, fields as are used for energy transfer. Many schemes are known for achieving in-band communication on a power channel such as modulating the power signal to provide information (e.g. timed pulsing or amplitude modulation). In other embodiments the signaling may be implemented using out-of band communication, or a mixture of both in-band and out-of-band. In yet another embodiment, the wireless power components may be "probed" with a signal that may be reflected back to the PPC. The reflected signal may comprise, location information, component structure information, power handling information, environmental information, information regarding the perturbed Q of any wireless power resonators and the like.

The wireless power simulation system 800 and the PPC 1002 can operate so that data is entered into the simulation software using wireless communications and the simulation software may be further configured to operate a communication system. When the PPC 1002 is configured to operate as part of a wireless power network system 800 it may be configured as a wireless power network controller which may be operable to provide various properties and features. For example, at least one of the components of the wireless power network 800 can provide for wireless communication capability with the device PPC 1002 operating the simulation software. In this case, a particular component or "node" of the wireless power system 800 may be assigned a parameter value that sets it as a master component of the network. A master component (which may be implemented as a wireless system manager 900) can be responsible for communicating with the PPC 1002 operating the modeling software and at least one other component of the network 800. A master device may be configured to achieve at least communication in which it can request information from the other wireless power components which it may then relay to the PPC 1002. A master device may be configured to determine an operating mode of the wireless power network 800 by controlling the other components of the system.

Communications between system components and a master component or the PPC 1002 can be sent using data which is openly available or which may be encrypted for security purposes. In order to provide for only certain intended components participating or controlling the wireless power system 800, the communication protocols may require that communications between system components be authenticated. Alternatively, system components can be required to be authenticated before communication from them is accepted or processed by the PPC 1002 or master system component, which may be serving as a network controller. Authenticated communications may be useful in settings where more than one wireless network 800 exists within a given region or where portable wireless energy devices, such as a laptop of a user who is only temporarily located within the network, may be present. Since the simulation and control modules may be operated from many types of devices that can serve as a PPC 1002, master components or other components of the system that communicate wirelessly with a PPC 1002 may be provided with communication protocols wherein a user may be authenticated in order to reconfigure the power network 800. In embodiments, any user, or any user with a password may reconfigure at least a subset of components of the wireless power network system 800. Additionally, the system components may be characterized so that any user may reconfigure one or more characteristics of the power network, or a selected set of characteristics of the wireless power network. In this manner, in addition to default parameter settings which may be used by the wireless power network, ad-hoc power network configurations can be established, at least temporarily. The PPC 1002, and/or master system component, may be programmable so that the ad-hoc power network settings may revert after a selected duration, or when a revert-to-default criterion is met.

The PPC 1002 may allow a wireless power user and/or system installer to learn about differences in operating efficiency/capacity that may be realized by incorporating at least one additional repeater 810b, or even several additional repeaters, 810d, 810e, 810f, and 810g into the system 800, and to learn what the effect would be of transmitting power along a single path or using multiple and/or different paths. For example, wireless power efficiency and/or power delivery capabilities may be accessed using path D1-D3-D4-D5 alone or in conjunction with a path that moves from 810c to 810d to 810e for example. Additionally, the user and/or installer could examine the system performance and costs of putting a first repeater at position 810b rather than 810c, so that the power had to travel along D2 rather than D1.

By plugging the PPC 1002 into, for example, a system component such as 810a, or by sensing the field that 810a was generating when the system was operated, the PPC could use the WSSE of the modeling module 1322 (and its energy consumption module component) to compare the actual to modeled performance of the system and provide these comparison results to the user/installer. The comparison results may include estimates of both modeled and actual cost to operate the system. The comparison results may be operated upon by the modeling module, and may also enable the PPC 1002 to provide suggestions to the user for adjusting the parameters of the system in order to improve system performance.

Figure 11:
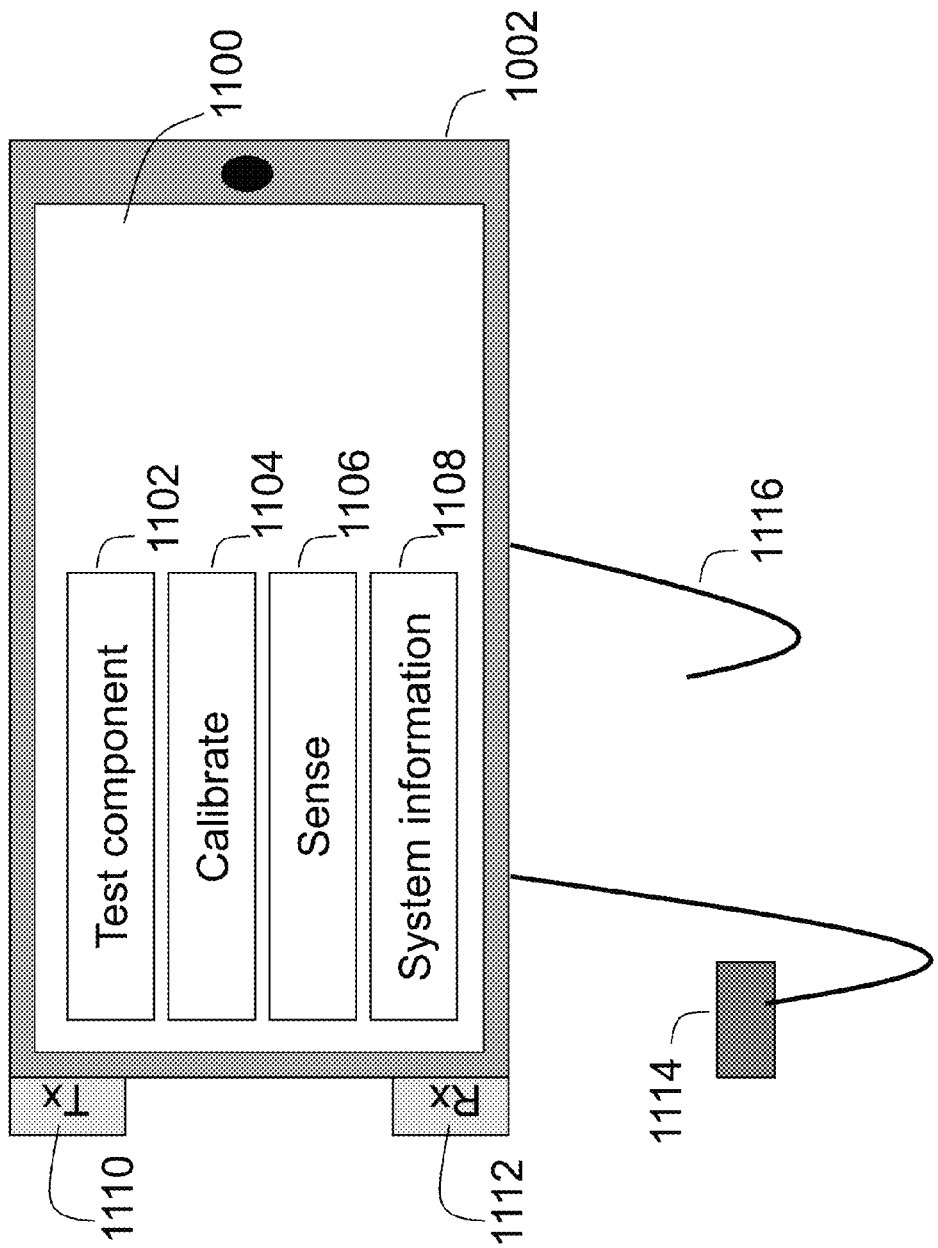
FIG. 11 shows a wireless power system portable programmer-calibrator (PPC) device with a menu screen.

FIG. 11 shows an exemplary PPC 1002 running an example version of WSSE software. In this example, the menu button 1008 of FIG. 10(a) was selected by a user and the MAIN screen 1100 is now displayed. The MAIN screen 1100 may be configured to show options related to the PPC 1002 operation. In this illustration, these include a selection "test component" 1102 which may allow the PPC 1002 to test a device 806, repeater 810, or transmitter 802 in order to determine if it is working correctly. In the case of testing a transmitter 802, selecting "Test Component" may cause the PPC 1002 to send a request for power to the transmitter 802 (which might toggle the transmitter to an "on" or "reply" state). After the PPC 1002 senses the transmitted power and/or the reply signal to ascertain the transmitter's characteristics, the PPC 1002 may send a communication signal that it no longer needs power (which may cause the transmitter to turn to its "off" state). In this manner, the PPC 1002 could test the transmitter 802 by mimicking what might occur during cell-phone charging routine, for example, without the user having to wait for the cell-phone to charge fully and then send an "off" request. The tests which might be run for different components might be defined in a test module of the control module 1304, and/or might be defined by the user.

The "calibrate" option 1104 can cause a calibration routine to be run, as defined in the control module 1304. The routine may use the transmitter module 1110 or receiver module 1112, which are configured to transmit or receive wireless power signals and which may be configured as a distributed form of the transmission and reception modules 1314, 1302 of the PPC running under control of the controller module 1304. Modules 1110 and 1112 may be configured with necessary hardware, such as resonator coils (or may attach to such coils) and capacitors, and these modules may be configured with USB connectors in order to connect to USB ports of the PPC 1002. Modules 1110 and 1112 may also be configured as stand-alone accessories that may have wired or wireless communication circuitry in order to communicate with the PPC 1002. In FIG. 11 the modules 1110, 1112 are shown connected to the PPC 1002 via its USB ports. Because these ports may not provide sufficient power to the modules 1110, 1112, these modules may also have power cords that connect to sources of conventional AC power.

The "Sense" option 1106 can cause a sensing routine to be run as defined by a sensing protocol of the control module 1304, and can operate on sensed signals that are received through the power receiver module 1112. In one example of a sensing routine, the user may select the "sense" option in order to measure the power being relayed from a repeater 810 which is relaying power from a remote transmitter 802.

Selecting the "Enter System Info" option 1108 can invoke a menu where users are able to identify components of the wireless system 800 by entering, for example, operating parameters or model numbers (which may be indexed through look-up tables). When the PPC 1002 has a camera, at least some of this information can be scanned in from a serial number, bar code, or other visual identifier. This information can also be obtained using WiFi communication, RFID technology, near field communication, and other available wired or wireless communication facilities from devices 806. Further the transmitter and receiver modules 1110, 1112 or other modules of the PPC 1002 may be configured with infrared, GPS, cellular positioning, temperature, laser, pressure, light and other sensors to obtain information about an environment (distance, temperature, etc.) which can be processed by the environmental/location module 1324.

The PPC 1002 of FIG. 11 may be configured with a resonator accessory 1114, which may function as a source, repeater and/or device resonator and/or which may be configured as a traditional inductive coil. The resonator accessory 1114 may be shaped like a wand and may be self-contained, or may have input ports for receiving different types of resonator coils and associated circuitry. For example, resonator coils, can have base modules that are configured circuitry and shaped to allow these to be interchangeably plugged into the resonator accessory 1114. The resonator accessory 1114 may provide additional functionality because it can be separated from modules 1110, 1112. For example, if the PPC 1002 is calibrating a system component such as repeater 810, then the PPC 1002 transmits wireless power to the repeater 810 and simultaneously attempts to measure the field which the repeater 810 emits. By using the resonator accessory 1114 as a receiver, the PPC 1002 can sense fields that are away from the PPC. Likewise, the resonator assembly may be configured as a wireless source and the wireless fields may be sensed using the receiver 1112 of the PPC. In some embodiments, the PPC may comprise more than one resonator assembly. The PPC 1002 can use its communication module 1308 to communicate with at least one remote transmitter 802 to cause the initiation of wireless power signals and to energize a wireless power system rather than relying upon its own transmitter 1110. In embodiments where the transmission fields of a remote transmitter 802 may be unknown, or the transmitter is too distant from a repeater 810 to energize it, the ability to transmit wireless signals from a local transmitter as part of system measurement and calibration routines implemented by a control module 1304 may be of great benefit.

Further, the PPC 1002 may be provided with an interface accessory 1116 which may allow the PPC 1002 to communicate with components of the wireless system 800 using either wireless or wired communication (e.g., a USB cable). For example, instead of measuring the field that is relayed by a repeater device 810, it may be possible to connect to an input/output (I/O) port (e.g., a USB port) of the repeater 810, and to sense information related to internal components, such as currents, voltages, power levels, etc. In this manner a device may be probed directly without measuring the resulting field. Further, the interface accessory 1116 may be able to connect to the I/O port 1702*b* and to obtain measurements or data related to various aspects of the repeater 810 operation, such as capacitance, voltage, or other values of the circuitry. This can occur if the I/O port 1702*b* of the repeater 810 is attached directly to repeater components, or if the I/O port 1702*b* is configured to communicate with a control module 1304 or communication module 1308 of the repeater 810. Further, the PPC 1002 may be configured to send control commands to the repeater 810 through the I/O port 1702*b* which may cause the control module 1304 of the repeater to adjust its internal operations and circuitry by way of its adjustment module 1318. This can occur while a power field is being transmitted by the PPC 1002 and can assist in determining if a component of the repeater 810 is working correctly under load.

Figure 12:
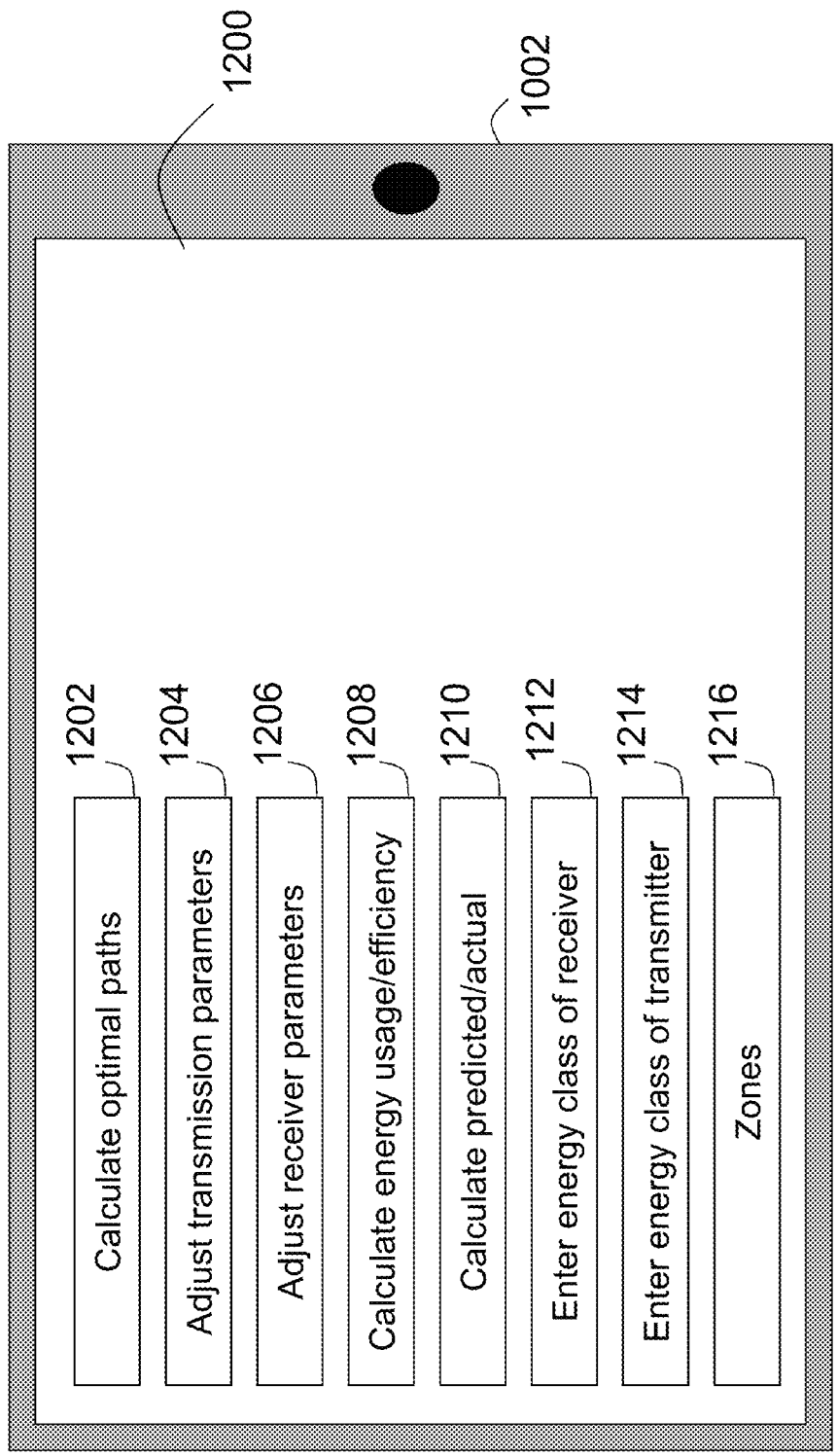
FIG. 12 shows a second calibration screen of a wireless power system portable programmer-calibrator (PPC) device.

FIG. 12 shows other exemplary functions that may be realized by a PPC and an exemplary screen of the PPC 1002. The block diagram identifies some of the exemplary functions that may be displayed on a system configuring screen 1200. The exemplary option to calculate optimal paths 1202 may allow users to see which potential power paths are best for transmitting energy according to empirical calibration results and/or modeled/simulated performance predictions of a system. The screen may also allow the user to access, identify, calculate, design and the like, main power paths, as well as back-up power paths, which can be used if a remote device 806 indicates it is not receiving sufficient power due to a disruption in or too many devices being fed by a main path, for example. Further, the screen may display icons, text fields, movable items, connecting lines, spinners, sliders, and the like that allow users to configure power paths, power levels, etc. which may be selected to operate at certain times during the day or for certain durations of time, for example. In an embodiment, all available power paths may be controlled to be used during the evening hours when a family is at home while a subset of power paths are controlled for use during the day, when usage is less (or vice versa if the user is normally away from their house in the evenings).

The option to "adjust transmission parameters" 1204 may allow a user to program a wireless power transmitter and to adjust the frequencies of the signals used in transmission, transmission times, strengths, and patterns, and other parameters of transmission protocols which may be implemented in by the control module 1304 of the transmitter 802.

The option to adjust receiver parameters 1206 may allow a user to program a wireless power receiver and to adjust the frequencies of the signals which may be intended to be captured (i.e. the characteristics of the resonator circuit), wireless receiving schedules, and other parameters of receiver protocols which may be implemented by the control module 1304 of the receiver 806.

The option to calculate energy usage/efficiency 1208 may allow a user to determine how much power may be used per hour, day, month, or year, and the user can see how toggling certain parameters, or increasing efficiency at certain points of the wireless power system 800 can alter energy usage.

The option to calculate energy predicted/actual 1210 may allow a user to compare measured results of a system to modeled results in order to determine system efficiency, which may be decreased by such factors as ill performing components, obstacles that affect the perturbed Q, etc.

The options to enter energy class 1212, 1214 may allow the user to enter information about the class of receiver or transmitter component, for example different classes may provide wireless energy at certain levels, at certain distances, or according to different criteria which may be met to be included in the class. This is akin to the different wired electrical protocols that are used to provide electricity or information in different countries around the world.

The option referred to as "zones" 1216 may allow a user to enter information about what system components are to be included in different zones. In embodiments, zone 1 can be emergency devices such as smoke alarms, garage doors and other devices that require electricity even in the case of an emergency. Exemplary zone 2 can be the first floor of a house, whereas zone 3 can be the second floor, and zone 4 can be outdoor zones related to sprinkler systems or driveway heating systems. Zones can be selected and modified and rules can be applied to different zone. An exemplary embodiment of power control using the "zone" functionality is to set a rule such as "only power zone 4 between 5 and 7 p.m. on weekdays".

Figure 13:
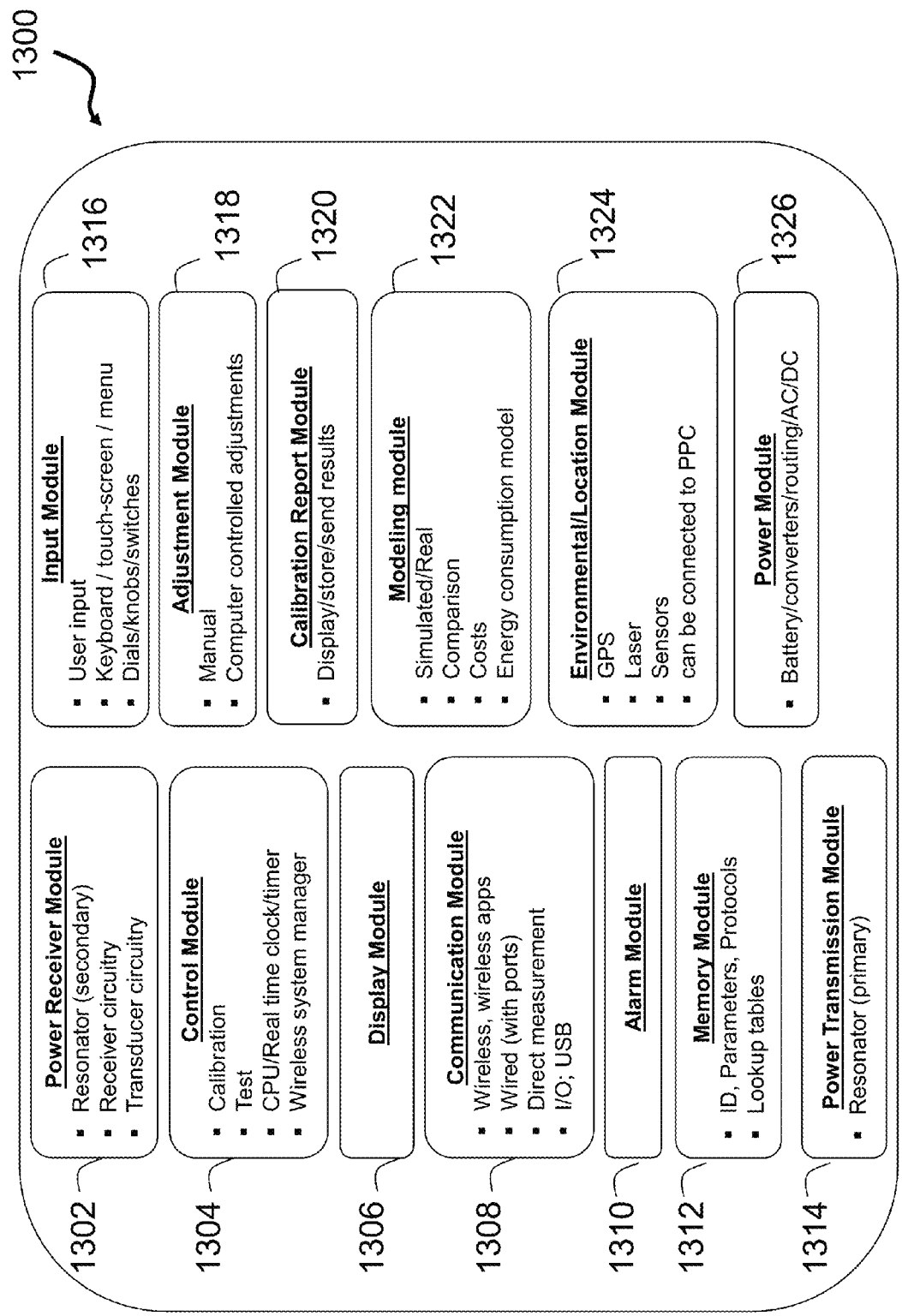
FIG. 13 shows the modular components of a preferred embodiment of a wireless power system portable programmer-calibrator (PPC) calibration device.

FIG. 13 shows exemplary modular components of a preferred embodiment of a PPC 1002. The components of the PPC 1002 shown in FIG. 13, can be similar or even identical for the transmitter 802, receiver 806, repeater 810, and system manager 900 can be similar or even identical. The components can be realized in a distributed or modular fashion and components of some modules may be shared with, or may share components of other modules. Distributed components may utilize modules or components of other devices to which the modules are connected or to which they communicate in a wired or wireless manner. In these figures, not all the modules may be included. For example, as disclosed, a simple PPC 1002 may only include a power receiver module, a control module and a display. Further, as will be disclosed, a particular module of one system component may be a little different than that analogous module in a different component. For example, the power module 1326 of a PPC 1002 may not provide for connection to a wired source (such as a conventional wall socket), while the power module 1326 of the transmitter 802 may usually provide for a wired power source in order to obtain larger amounts of power that may be required for power transmission to occur. Further while the communication module 1308 of the PPC 1002 may be configured to initiate communication with a repeater 810, the communication module 1308 of the repeater 810 may be configured to respond to communication initiated by the PPC 1002. Accordingly, many of these differences will be disclosed in this specification, but will also be understood by those skilled in the art, when such details relating to these differences are omitted in this disclosure.

Additional Embodiments of Portable Programmer-Calibrators (PPCs)

As has been disclosed, programming and calibration of the component of a wireless system 800 may improve the overall performance of wireless power systems and may give users/installers the capability of optimizing their systems for coverage, cost, component count and the like. In the case where any component of the system is not functional or is only partially functional, it would be preferred if such a component could be identified, tested, and possibly adjusted or replaced. Without the components and techniques disclosed herein, it may be difficult to identify the faulty components in a system consisting of more than a few components. In response to calibration results, system components may benefit from being adjusted by being programmed or reprogrammed A portable programmer-calibrator (PPC) can provide for such programming, both during and after a calibration session. Programming and calibration may also be realized in a distributed fashion using multiple PPCs. Although we have already disclosed some of the PPC function in FIGS. 10-12, PPCs may be configured to provide additional functions now described. Further, the PPC 1002 may be configured to only provide a single function, or a subset of these functions.

An exemplary embodiment of the PPC 1002 can be seen in FIG. 13 where modules which may be realized by hardware and/or software constitute the PPC operational system 1300, which may be housed entirely within a single device or distributed across other components of the wireless power system 800. In a simple embodiment, a PPC 1002 may be a meter configured to measure a field produced by a component of the wireless system 800. In this case, the meter might contain a receiver module 1302 having at least one resonator and receiver circuitry related to harvesting power from an oscillating electromagnetic field. The receiver module 1302 may also contain transducer circuitry modifying the harvested power before it is measured and/or used to provide power to the PPC 1002. The PPC 1002 may further contain a control module 1304 with calibration control circuitry which can control the other modules of the PPC 1002 such as the receiver module 1302 and the harnessing of wireless power field. The control module 1304 can also contain a CPU for performing calculations and performing a calibration according to a calibration protocol and parameters as well as a real time clock.

The PPC 1002 may also contain a display module 1306 for displaying information relating to measurements such as the field strength of a magnetic field that is measured during calibration. When measuring a transmitter, the meter can be placed a given distance from the transmitter and might display a characteristic (field strength) which was measured. In an alternative embodiment the receiver module 1302 may be provided with circuitry for measuring and displaying at least two characteristics of the wireless field, such as field strength and frequency of the field oscillation. In a further embodiment the calibration control module can control the harvesting circuitry to adjust its characteristics as it is measuring the wireless field. For example, the control module 1304 may operate to ramp the capacitance of resonator across a range, take measurements at different instantaneous capacitance values and determine what the peak frequency was (which is a function of the capacitance) in which the maximum energy harvesting was measured (such a calibration method can be shown in a method of FIG. 14, along with greater specificity).

In an alternative embodiment, the PPC 1002 may be configured with at least one communication module 1308 which can communicate either wirelessly or using a cable (wired), with other components of the wireless system such as a remote transmitter 802 or wireless system manager 900, in order to control the signals that may be transmitted. For example, the PPC 1002 can communicate with the transmitter 802 to cause it to transmit wireless power signals related to a calibration routine implemented by the control module 1304. The user could watch the PPC display to see the characteristics of signals that were sensed from either the transmitter 802 or from a repeater 810. The PPC 1002 may sense the fields directly through circuitry in contact with a resonator 808 of a harvester 806, or may obtain readings using its communication module 1308 using either wireless or wired means such as a cable (e.g., USB) that is attached to a device 800 or harvester 806. The ability to communicate with a system component such as a repeater 810 using wired signals may be advantageous because simultaneously sensing a wireless power field and a data communication signal from a system component, such as a repeater, may be challenging in various situations. Further when the PPC 1002 senses wireless signals which may be putatively being emitted by a particular system component, while the PPC 1002, or other system components are transmitting signals, it may be difficult to dissociate the signals which are emanating from different sources. By measuring what is going on inside a component of the wireless power system, more accurate readings may be obtained. The communication module 1308 can provide for communication, control or power signals to be sent or received between the PPC 1002 and other devices of the system 800. In embodiments, the PPC operational system 1300 can include an alarm module 1310.

The PPC 1002 can be further provided with a memory module 1312 which can store the calibration results, IDs of system components that have been or will be calibrated, as well as various parameters and protocols related to calibration routines which the control module 1304 may implement. The memory module 1312 can store a log of PPC 1002 operations and communications (an "operating history"), including records of information that may have been transferred or received and timestamps for each record. The memory module 1312 can also store historical information which may be obtained through communication with other network components, such as operating histories of devices with which it communicates, including a history of parameter changes. In addition, information related to system settings, performance, historical operating parameters, and the like, may be stored remotely, such as in the cloud, and may be available to be retrieved by a variety of devices such as laptops, cell phones, PPCs, and the like, through wireless and or wired communication links.

In an alternative embodiment, the PPC 1002 could contain its own power transmission module 1314, which may be configured to transmit calibration or other wireless power signals through at least one source resonator, so that a user could monitor the effects of that energy transmission such as how much energy is being harvested by different devices which can be sensed by the PPC 1002, displayed by a visual indicator on a device 810, or communicated by a system component to the PPC 1002 or wireless system manager 900. Similar to the receiver module 1302, the transmission module 1314 can have its own circuitry for adjusting the characteristics of the signals that are transmitted.

In an alternative embodiment, the PPC 1002 could contain a transmitter module 1314 which may be realized using a transmitter coil that could be moved away from the PPC's harvesting resonator of the power receiver module, as shown in 1114 of FIG. 11. Accordingly, the transmitter module 1314 could transmit a wired power signal to a system component such as a repeater 810 and the power receiver module 1302 of the PPC 1002 could measure the field produced by the repeater 810. In this case, the transmitted signals and harvested signals might experience decreased overlap/interference.

As shown in FIG. 11, a transmitter 1110 and receiver 1112 may be too close to each and may interact in a way that reduces the accuracy of the functions being performed by the PPC. By providing a transmitter/receiver "wand" accessory 1114, the transmitter or receiver can be moved far enough away from the PPC 1002 to improve the accuracy of the PPC functions. In an alternative embodiment, rather than a self-contained wand, this accessory can be terminated with various calibration coils for sending or harvesting wireless energy with different characteristics. In a further embodiment, the PPC 1002 could have an interface cable 1116 that connects to a system component such as a repeater, and when the transmitter 802 transmits a signal, the PPC 1002 can obtain its measurements directly from circuitry within the repeater 810 in order to perform the calibration routine rather than sensing results from its own sensing means 1114, 1112.

The PPC 1002 can further be provided with an input module 1316 which allows a user to adjust and control the PPC 1002. The input module 1316 may include all circuitry related to obtaining user input from any received communication signals, manual/virtual/graphic controllers of the PPC 1002 such as a touch screen and any dials and knobs. The adjustment module 1318 of the PPC 1002 may be configured to operate on the user input information and to adjust the operation of the PPC 1002 and/or other PPC modules (e.g., 1314), or any system components that may be in the process of being programmed.

The PPC 1002 can be used to calculate improved paths for transmitting wireless signals. For example, the PPC may have a modeling module 1322 that can be programmed with a model of room that contains distance measurements between components of the wireless system 800. The PPC can also store calibration result measurements, derived from its calibration report module 1320, for each component in the wireless system in its memory module 1312. Using both of these pieces of information the PPC modeling module 1322 can calculate the efficiency of different paths and also can allow the user to choose those paths which will provide greater efficiency (or it can do this itself). If a preferred path is chosen, the PPC may relay information, settings, parameters and the like to the components of the wireless power transfer in order to make them operate as the user has specified. As example, the PPC may instruct certain repeaters to detune from the system operating frequency, to open circuit their resonators, to insert and adjustable load, and the like so that they may realized the operating conditions necessary to support the power path chosen by the user/installer of the wireless power system.

An example of how this type of path defining operation may benefit a user of the network can be illustrated using the case of a floor carpeted with X rows and Y columns of repeater tiles, which in this exemplary embodiment will be set to be 4 rows and 4 columns. In the example deployment shown in FIG. 9, a tile repeater 810-J6 at location (2, 2) was found to be performing at 50% efficiency during a calibration session. In the case where the PPC 1002 cannot reprogram the repeater 810-J6 or otherwise adjust it to potentially improve its performance, it may be advantageous to avoid the potentially negative impact of this repeater tile 810-J6 on the system performance by effectively removing this repeater from the system. Repeater 810-J6 could be physically removed from the system by a user/installer who might remove that particular carpet tile, or might replace that carpet tile by one containing a new resonator, or may replace the tile with a piece of tile that does not include any wireless power functionality. Repeater 810-J6 could also be logically removed from the system, by detuning or open circuiting the resonator for example. Alternatively, if by replacement or improvement of the existing repeater structure 810-J6, it performance could be improved, for example by raising the efficiency from 50% to 85%, it may be reasonable to keep the repeater active in the intended path.

Various characteristics that may be considered by the modeling module can include, but are not limited to:

Number/geometry/orientation/type/componentry of repeaters. For example, if only repeaters 810a, 810b, and 810c are to be installed in the area depicted in FIG. 8, then the amount of power that might be safely delivered across the area may be different than in more repeaters, namely repeaters 810a to 810g, were installed. The modeling software of a PPC could show users what the predicted system performance will be based upon the characteristics of the transmitter(s), the number, geometry, orientation, type and componentry of the repeaters, the receivers and the objects and materials in the local environment.

Distance between pairs of repeaters. For example, if by keeping the maximum distances between adjacent components of the first path (i.e. D1, D3, D4 and D5) below 3 feet, transmission efficiency was kept at 95%, and this was the minimum amount of power needed to power device 800, then the distances would need to be 3 feet or less apart.

Distance from transmitter to repeater. In another example, modeling can determine the difference in the amount of power and/or the efficiency of the transfer if a first repeater is 810c, vs. 810b (i.e. if the distance to the first repeater is D1 instead of D2). Further this modeling may suggest that power transmission characteristics, or repeater characteristics may be set differently in order to obtain a desired result.

Number of paths. For example, if there is a first potential power path which goes from 804 to 810c to 810b to 810a to 806, and a second potential power path which goes from 804 to 810g, to 810f, to 810e, to 806, then the power provided at a target could be less than if there was just one potential power path. In that case, if there were not addition devices requiring power along both potential power paths, a user may prefer the wireless power system adjust itself so that only one potential power path is enabled, thereby improving the end-to-end performance of the system for the specified use case. That is, in embodiments, it may be preferable to allow a user to determine how many and which power paths should be established for a particular application.

Interaction of paths. For example, the first and second potential power paths discussed above may be close enough that there may be interactions between the components identified as belonging to one path or the other. The modeling module could be used to calculate the performance of the system as various components are added and removed from the paths, therefore allowing the user to see the functional implications of allowing potential power transmission paths to interact or not.

Repeater model/characteristics. For example, there may be different models/types of repeaters which may have different sizes, power hopping efficiencies, power handling capabilities and the like.

Interactions between distance and number of paths. For example, it may be that by adding repeaters 810e, 810f, and 810g to the wireless power transmission region that the maximum distance between repeaters could be increased from 1 foot to 2 feet, due to redundant transmission paths.

Comparisons between two configurations of repeaters. For example, modeling may allow a user to determine if it is more efficient (or preferred according to any other user requirement or desired operating characteristics) to have a first potential power path (810a, 810b and 810c) and a second potential power path (810e, 810f, 810g), or to have a single potential power path which has repeaters spaced half as far apart (i.e. at each D/2 rather than at each D).

Redundant use. In another example, a user may want to know if it is better to route energy from 810c, to 810b to 810a to 806 and 810g to 810f to 810e to 806, or if it is okay to route from 810c to 810b to 810a and also from 810c to 810d to 810e so that in this case repeater 810c is used by two (or more) paths.

Malfunctioning repeater. In the case where repeater 810d may not support energy "hopping" with the desired and/or expected efficiency (which can be evaluated as will be discussed), reports and/or results from the modeling module may advise the user/installer as to whether it is better to remove, detune, or otherwise turn-off the repeater at 810d and just send energy from 810c, to 810b, to 810a, and then to the target or to utilize multiple power paths to transfer the energy.

Multiple transmitters/receivers. For example, the modeling module may calculate and report the energy saving's/benefits of using one transmitter for path 1 and 1 transmitter for path 2, or using a single transmitter which powers both 810c and 810g from a midpoint.

Various values may be entered into the modeling module for parameter values including, for example: how much power will be needed ($P_{need}$) at the device 806; how much power will be transmitted ($P_{trans}$); the distance between repeaters ($R_{dist}$, if the distances are uniform, $R_{dist1} \ldots R_{distn}$, if the distances vary); the distance between the transmitter and the closest repeater ($T_{Rdist}$); the number of paths by which power may be transmitted ($P_{paths}$): the efficiency of the repeaters ($P_{eff}$); and number of repeaters ($R_{num}$); the influence on one path by another ($P_{influence}$); the model #'s of the wireless power system components; and the characteristics of various components.

Any and all of the calculations that the modeling module may execute may be similar to and/or related to calculations that are currently performed using electromagnetic simulation models and tools described at least in U.S. Pat. No. 7,741,734 issued on Jun. 22, 2010 and entitled "Wireless non-radiative energy transfer," U.S. Pat. No. 7,825,543 issued on Nov. 2, 2010 and entitled "Wireless energy transfer," U.S. Pat. No. 8,076,801 issued Dec. 13, 2011 and entitled "Wireless energy transfer, including interference enhancement," U.S. Pat. No. 8,362,651 issued Jan. 29, 2013 and entitled "Efficient near-field wireless energy transfer using adiabatic system variations," U.S. Pat. No. 8,461,719 issued Jun. 11, 2013 and entitled "Wireless energy transfer systems," and U.S. patent application Ser. No. 13/668,756 published on Jun. 20, 2012 as 2012/0159956 A1 and entitled "Wireless energy transfer modeling tool," and incorporated by reference in their entirety herein. In embodiments, the components of a wireless power transfer system may be described by their intrinsic Q's, the perturbed Q's, their coupling coefficients, k, their Strong Coupling Figure of Merit, U, their coupling rates, k, their loss rates, G, and by or using any of the formalisms such as coupled mode theory, circuit theory, as described in this and the incorporated references. In embodiments, calculations may be performed for a variety of system parameters, ranges of system parameters and the like. For example, calculations may be performed for different system operating frequencies, for different source sizes, for different repeater-to-repeater U's, for different load impedances, and the like. In embodiments, a modeling module may run simulation software with similar capabilities to those currently associated with WiTricity's simulation tool referred to as WiCAD. As systems and modeling capabilities improve, we anticipate that improved modeling capabilities may also be incorporated into modeling modules of the PPC described herein.

The PPC modeling module 1322 may operate upon the calibration results for tile repeaters which were obtained during a calibration routine and stored in the reports module 1320, and can graphically present different potential deployment choices to a user using the display module 1306. For example, the PPC 1002 can allow the user to calculate the energy usage which may occur by implementing different wireless power schemes and paths. The user can calculate the efficiency that would be obtained by turning a repeater tile off by toggling that module "off" in the model. The user could then compare that calculated performance to the calculated performance for the path including the potentially sub-par tile repeater by toggling the sub-par repeater "on" in the model. These results might also be compared to what would occur by sending power along various alternative routes. For example, the user may compare what would occur by sending power from the transmitter 802a or 802b to the receiver 806b along path 810-J5 to 810-J8. Alternatively, the user can determine what would occur by sending power along a first path J1-J4, and through J8 compared to what would occur by sending power along a second path from J8 to J11 to J10 to J5 to 806b, compared to a third path J8-J7-J2-J1-806b. In the first route, the energy travels through 5 repeaters but they are closer together than the 4 repeaters which comprise the second path. Further the modeling module can allow a user to determine what would occur using both routes to transmit power simultaneously both in terms of efficiency, total power transmitted (in terms of what would be available to the device 806b) and other variables.

The PPC model module 1322 can further operate the communication module 1308 to then allow the user to program the components of the wireless network (e.g. 802, 806, 810-J1 to 810-J16) in order to implement the selected solution. After a solution is programmed, the PPC's modeling module 1322 may be used to verify the solution works as intended, using the comparison routines provided by the modeling module 1322. For example, the modeling module 1322 may calculate certain measurements that should be obtained in a particular point in the wireless power network, and can instruct a user to make one or two measurements. These measurements can then be compared to the modeling results in order to verify that the wireless power network is working as expected, and that the measurements are within the user-selected and/or model-specified limits. In the case where the measurements within a specified accuracy, then the wireless power system may be considered properly installed and set-up and wireless power transfer can be initiated. If the measurements are not within a specified accuracy for the modeled system, then additional calibration of the system may be done and, if needed, additional calculations and models may be suggested and evaluated.

Figure 14:
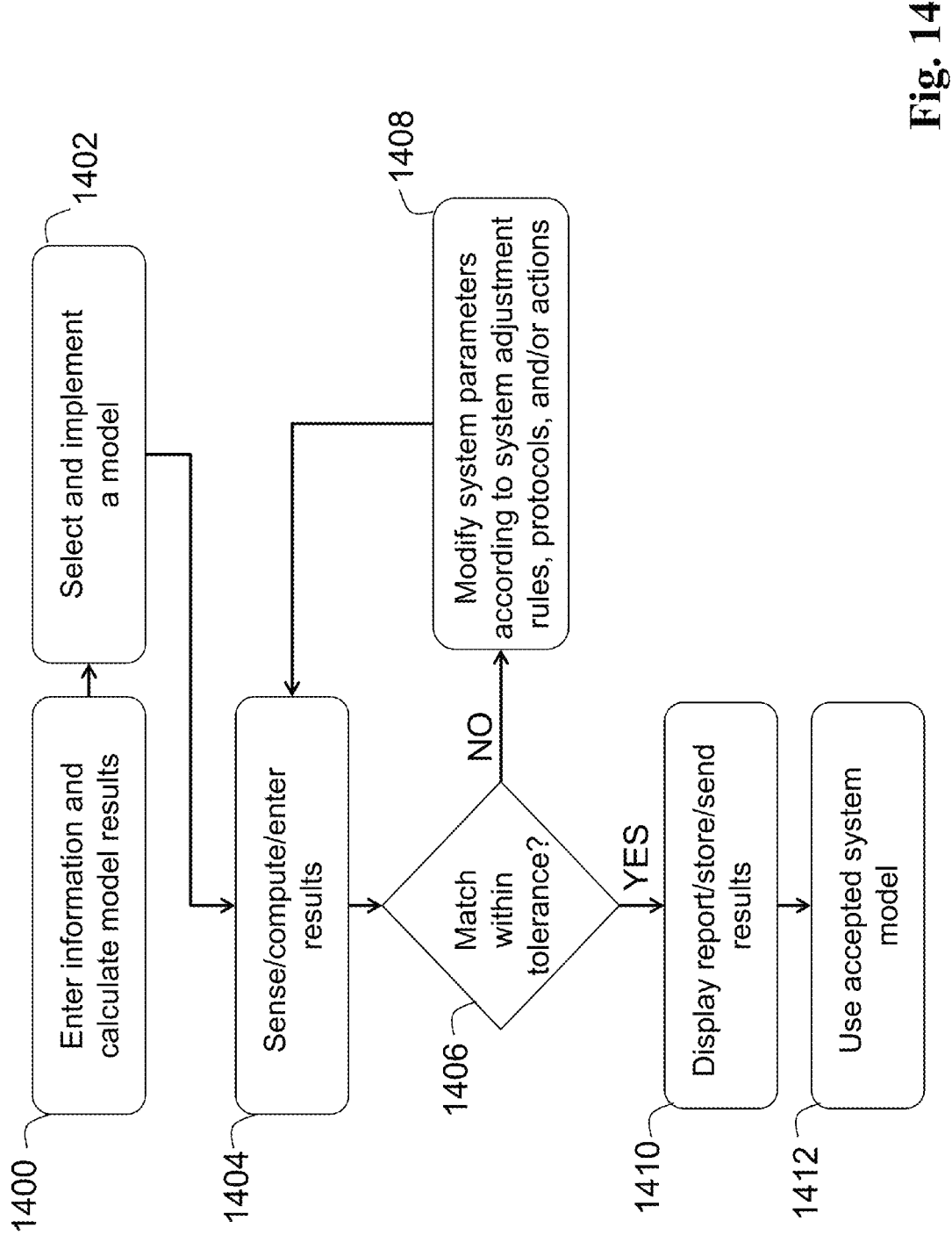
FIG. 14 shows a method for calibrating a wireless power system.

An example of this procedure can be understood by examining the components shown in FIG. 9 and the method outlined in FIG. 14. In this example, assume the components in the room depicted in FIG. 9 have undergone at least one calibration routine. Assume also that the 50% efficiency associated with repeater tile 810-J9 is an indication that repeater tile 810-J9 is less functional than the other repeaters in the array. Step 1400 includes the entering of information and calculating model results. Step 1402 includes selecting and implementing a model. A user/installer may use a PPC modeling module 1322 to model a potential power path that includes repeater tile 810-J9, and may instruct a user and/or installer to measure at least one of a current, voltage, power level, field strength, and the like, at various positions along the path. These empirical measurements can be compared 1406 against the results that were modeled in order to determine if the real performance of the network is within a selected acceptable tolerance limits. If so, the results may be stored 1410 and the system may be operated 1412. If not then system parameters may be modified according to system adjustment rules 1408 the results may be re-evaluated and/or sensed 1404 before being turned on.

The power module 1326 of the PPC 1002 may provide modeling, measurement and design capabilities for devices comprising power storage utilities such as batteries, capacitors, super-capacitors and the like. In embodiments, a PPC may be able to model and measure circuitry related to power conversion, such as DC to DC converters, DC to AC converters, and AC to DC converters, buck and/or boost converters, rectifiers, synchronous rectifiers, regulating rectifiers, over-current/voltage/temperature circuits, as well as other types of regulation and power safety circuitry. The power module 1326 may also support measurement of how much power remains, how much power is being used, a historical record of how much power was harvested, transmitted, or used, and the like.

A wireless power system can have a wireless power transmitter that is configured to transmit a wireless power signal to a device and also a wireless power receiver that is configured to measure a signal being harvested by a device. The transmitter and receiver can be in the same device or two different physically distinct devices, and at least one of these devices may be configured to implement calibration software that may be operated within a control module 1304 that is configured to perform a calibration procedure by modifying either the signal that is transmitted, or the harvesting parameters of the receiver, according to a calibration procedure protocol that can be stored in a memory module 1312. Alternatively, the software can be operated in a wireless power system manager device which controls and manages the various components of the system. Alternatively, the software can be implemented in a PPC 1002.

The PPC 1002 may be configured with an environmental/location module 1324 which may be able to calculate the position of a component and to provide this position information as part of the calibration routine. The PPC 1002 may operate its modeling module 1322 to build a model of the system by requesting (e.g. or RFID information obtained via the communication module 1308), sensing (e.g. via optical sensor of the environmental/location module 1324), and/or assigning or allowing a user to assign, via user input module 1316 an identification value to any device which it is calibrating.

The PPC modeling module 1322 can also create a model of where the different system components are located relative to each other based upon the identification code of each device and its location. The PPC 1002 software may be configured to operate communication circuitry 1308 to communicate with a system component to obtain information and send commands that control the component.

The PPC 1002 may be a portable device that is hand held or may be a device such as a device positioned on a cart with wheels. In this case, the horizontal distance from the floor can be adjusted in order to control the distance between the target device (e.g., floor tile) and the PPC for increased accuracy of measurement. The PPC can also contain location/triangulation circuitry, transmitters, and sensors needed to calculate the position within a room and determine if it is in the correct location to perform a calibration reading (which can be realized as part of module 1324). For example, a calibration reading may not be accurate if the PPC 1002 is two or three feet away from an intended location. When the devices are repeaters 810 such as floor tiles, or components that are located behind walls of a house, then the calibration procedures may be improved when the PPC performs its calibration from at least one or a set of specific locations.

The PPC can be configured to communicate with a wireless system manager 900 and to obtain information about the one or more devices that are being calibrated such as information sensed from the device (e.g. the ID of the device, its power requirements, it's priority in a hierarchical set of devices, etc.), the location of the calibration device and/or the device that is being calibrated if this is at a distance. A calibration device or system manager can contain a location program which senses location information to increase the likelihood that the calibration device is located precisely with respect to a device being calibrated or monitored.

During the calibration routine, a PPC can program a device it is intending to calibrate in order to tune that particular device and detune one or more adjacent devices so that the calibration signals may be sent and sensed in a controlled manner.

A PPC may use a calibration routine that implements N calibration signals which are presented in series during the procedure. The signals can change in power, center frequency, orientation, or any other characteristic parameter. For example, a calibration routine may use a high power signal and a lower power signal and measure the amount of power harvested when each signal is present in order to determine that a resonator is transmitting or harvesting in an intended manner. Because there may be nonlinearities in the transmission or harvesting, it may be valuable to collect multiple operational data points and to assess more than one of these data points as part of the calibration evaluation.

In an alternative calibration routine, a PPC can modulate the center frequency of the wireless power where X is the intended operating frequency at which a device is supposed to harvest maximum power, and X±f1 and X±f2 are both measured in order to determine the specificity of a system.

Further, since a calibration routine may be configured for deriving a set of operating parameters that work best, and then adjusting the parameters of the receiving device or the transmitter to achieve improved transmission, sweeping the frequency over a range, may not only allow the device to be evaluated, but may also serve to determine the optimized system parameters that may be used after calibration.

In an alternative embodiment, a wireless power system comprises a PPC 1002, which may or may not provide functions other than programming. In this case, the PPC 1002 may have an interface 1116 and circuitry 1308 for communicating with a system component such as a repeater 810, and a repeater 810 may be configured with an interface 1702b (shown in FIG. 17) and circuitry for communication 1308 with the PPC 1002. In embodiments, a repeater 810 may be a relatively simple device, comprising relatively few components, but the ability to provide for programming may greatly increase the functionality of a repeater 810. In embodiments, some repeaters may comprise a programming facility and some may not. In embodiments, systems may be comprised of only programmable repeaters, of no programmable repeaters, or of a mix of any ratio of programmable to non-programmable repeaters. In embodiments, a programming interface 1116 can include a physical connection 1702b for connecting a PPC 1002 to a system component and permitting signals to be communicated between the PPC 1002 and the component 810. An interface can also be realized as wireless communication circuitry of the communication modules 1308 permitting signals to be communicated between the programmer 1002 and the device 806. The PPC 1002 programming module, may be part of the adjustment module 1318, and can be configured to allow the PPC to program the control module of the repeater 1308, whereby the parameters of hardware of the repeater 810, which are implemented by its control module 1304 may be adjusted. The PPC 1002 can also be configured with a monitoring module, which may be realized as either a power receiver module 1302 configured to allow the PPC 1002 to monitor power signals relayed by the repeater 810, or by a communication module 1308, which receives relevant data such as the characteristics of power harvested by the repeater 810 or other characteristics of the repeater 810 operation, such as the values of programmable parameters which are sent to the PPC by the communication module 1308 of the repeater 810. The programmer 1002 can comprise a display module 1306 configured to allow the programmer 1002 to display information such as the power harvested by the repeater 810 which it is monitoring. The programmer 1002 can also be provided with wireless communication circuitry 1308 to permit signals to be communicated between the programmer 1002 and a remote system component, such as a remote power transmitter 802, power system manager 900, or other PPC 1002.

Further the PPC 1002 can be a programmer-only device (i.e. there is no calibration functionality provided to the PPC) which can be configured with an input module 1316 which is controlled by at least one manual adjuster such as a knob which allows a user to modulate a parameter which may be related to the operation of a programmer 1002, or may be a parameter which is communicated to a device 806 being programmed. For example, a user may turn the knob, and the programmer 1002 may send a signal to a device 806 being programmed which serves to change the capacitance of the resonator circuit associated with the resonator coil 808 of the device being programmed. In this manner the controls of the programmer 1002 can serve to control the devices 806 being programmed. The programmer 1002 can also have other controls which interact with the input module 1316 to allow the user to modify the operations of the programmer 1002. While the programmer may only contain a few circuits and may use the power of the devices it is programming when this power is received via a wired connection of the communication module 1308 or power module 1326, the PPC 1002 may also be designed as a more sophisticated device which includes many of the components found in today's portable electronics such as software, a CPU including a real time clock, a memory, communication circuitry, ports such as USB ports, wireless communication capabilities, network discovery and access capabilities and a power source, to name a few. A programmer 1002 control module 1304 may be configured to enact an energy monitoring protocol whereby a characteristic of the energy that is monitored is stored in a memory module 1312. In embodiments, characteristics of the energy may be monitored over time according to a monitoring protocol implemented by the control module 1304. The system component being programmed, such as a device 806 or repeater 810, may be configured with circuitry for adjusting its wireless power harvesting characteristics based upon communicating with the programmer 1002. When there is provided means for communication between the repeater 810 and the programmer 1002, then the repeater 810 may be configured with circuitry for providing the identification data (e.g., its model or serial number) to the programmer device 1002.

Energy Consumption Module

An energy consumption module (ECM) can provide a number of important advantages to a wireless power system. An ECM can be implemented as part of a modeling module 1322 and can monitor, measure, and model the performance of a wireless power system 800 in order to calculate, report, and/or display consumption results. A consumption result may reflect how much power is transmitted from a transmitter 802 or received at a target component (e.g., harvester 806 or repeater 810). Although an ECM may be provided in the PPC 1002, it also may be provided as a module of at least one component in a wireless system 800, such as the wireless system manager 900, or may be distributed across components. Although an ECM is realized with the modeling module, and can operate on simulated system components with defined operating characteristics, its value may also be realized by measuring empirical energy provision, harvesting, and usage, for example. An ECM may also utilize a mixture of real and simulated wireless power system 800 components in order to determine the modeled result of adding an additional component to an existing system.

In embodiments, it may be preferable to be able to measure how much energy is transmitted from a source 802 in order to understand the amount of transmitted power that has been provided. Various consumption results can be calculated by an ECM, such as the energy transmitted. The consumption result can be calculated and reported as a measure relating to an integrated sum, a historical average, a measurement for short interval of time or instantaneously, or an estimate of hourly, daily, or monthly energy usage. Consumption results may be modeled over virtual time periods, for example, based upon the present amount of energy transmission or a sample from a recent period that may be defined by a user, or may be based upon actual measures over those time periods. Because energy may be transmitted on a "per-request" basis rather than on a continuous or periodic schedule, the amount of energy that has been used for transmission may not be easily determined without the use of an ECM. Accordingly, consumption results can be computed for "per-request" usage.

An energy transmission monitor, realized by an ECM, may be part of a power transmission module 1314. An ECM may be configured in order to send a wireless alert (e.g., text or e-mail message) to a user via a communication module 1308, or may display a visual or other indicator, using the display module 1308, if energy transmission usage goes beyond consumption criteria such as upper or lower energy transmission thresholds which may be stored in a memory module 1312. An unintended increase in energy usage may be important to detect and operated upon so that consumers do not end up using much more power than they anticipated. For example, the transmitted energy in a wireless power system may unexpectedly increase to compensate for system efficiency changes owing to changes in temperature, a faulty resonator of a wireless power transmitter, receiver and/or repeater, or any other factors that may influence efficiency of a wireless power reception and/or transmission system.

In embodiments, it may be desirable to measure a consumption result such as how much energy has been received by a particular component of the wireless power system in order to understand the amount power that has actually been received by an intended target and also to identify potential losses in an end-to-end system.

In embodiments, it may be desirable to measure and derive a consumption result such as the transmission efficiency by comparing the power transmitted with the power received. In one embodiment, this may be done by an ECM of a modeling module 1322 using data transmitted wirelessly to the ECM from different components of the wireless power system 800. This information can also be inputted by a user, such as by using a software interface, can be measured by a system component within which the ECM resides, at least in part, or can be computed based upon information sent to the ECM from a calibration device 1002 after a calibration session is performed, in the case where the ECM does not exist within the calibration device 1002 itself. An ECM can also operate upon historical data stored by at least one wireless system component, such as the master component 900, which may communicate the data to the ECM. Additionally, the master component may obtain, or measure, historical data from the other system components and then provide these data to the ECM.

An ECM may be realized primarily in software, hardware, or a mixture of the two and can be realized discretely within the modeling module 1322 or may use components from other modules. An ECM may provide its consumption results to a display, communicate these results over a wireless communication system, and/or store these results within a historical log within the memory of a least one component in which it is realized. An ECM may be configured to detect a consumption result such as a change in the efficiency of a system and if the consumption results exceed a consumption criterion then a consumption contingent operation may result such as alerting a user and/or system provider to such changes. If a consumption result exceeds a consumption criterion the ECM may also perform other operations such as: a) changing an operating characteristic of the wireless power system 800 such as the amount of energy that is transmitted; b) requesting permission from a user and/or system provider to make a change to the wireless power system 800; c) adjusting an operating characteristic of the wireless power system for at least a selected interval of time.

A wireless power system may result in unanticipated cost and energy usage when it is used in manners that were unintended or when components of the system are not working correctly. For example, if a device 806 such as a cell-phone transmits a request to any available transmitter 802 to be charged and a transmitter 802 transmits a power signal that is not harvested well by the device 806, then the system may operate inefficiently. Further, if there are unexpected power drains due to, for example, a malfunctioning repeater 810, then this may also increase energy consumption above what would be expected or desired by a user. In embodiments, it may be desirable to allow a user to provide, or to interact with an ECM that may provide information about energy costs, or costs at different times of day, so that the ECM can calculate consumption results, for the entire system or system components such as transmitters or receivers. The consumption results may include for example, energy usage (e.g., watt hours), costs, and summary statistics related to time intervals including hours, days, months, time intervals such as 9 a.m. to 5 p.m. More than one ECM may be implemented within a wireless power system such as being included within a repeater 810, device 806, or other component of the wireless power system 800 in order to assist a user in determining how the costs of the system are distributed across the different components of the system 800.

An ECM can be realized as a component within a wireless power system 800 which has at least two wireless power system components including a wireless power transmitter 802 and a receiver 806. An ECM can be configured to measure the amount of power that has been received by one or more selected network components. An ECM can be configured to compare the amount of electricity that has been received by at least one component of the network with the amount of power that has been transmitted by a different component of the network in order to obtain a consumption result related to relative energy reception level known as a "transmission efficiency". Another type of relative energy consumption result that may be calculated is the amount of power that has been received by at least one component of the wireless power network compared to a reference value (such as a historical amount of power received by that component). Another type of consumption result is the amount of power that has been received by at least one component of the wireless power network which reflects an absolute energy reception level. An absolute energy transmission amount or level is a consumption result that may be calculated as the energy required to operate the transmitter. If energy transmission or the power required to provide this transmission increases above or decreases below a consumption criterion, then the ECM may perform a consumption operation defined for that consumption condition. Correspondingly, if power reception increases above or decreases below a consumption criterion, then the ECM may perform a consumption operation defined for that consumption condition. Additionally consumption criteria may apply to the variance of energy reception or transmission, whereby if the variance exceeds a range defined as a consumption criterion (as may occur if there is instability of wireless network system performance), then a compensatory or other operation may occur. The consumption criterion can be applied to an absolute or relative consumption result.

When modeling or adjusting a system, the user or device can hold certain parameters constant, and adjust at least one other system parameter. In embodiments, multiple parameters may be simultaneously or sequentially adjusted. For example, distance, orientation of the coils, and transmission coil type in relation to at least two system components can be held constant, while transmission frequency, temperature range, and geometry of the receiver coil (shape, size, or number of coil loops) can be adjusted.

Section II—Repeater Management

A wireless power transfer system may incorporate a repeater resonator configured to exchange energy with one or more source resonators, device resonators, or additional repeater resonators. A repeater resonator may be used to extend the range of wireless power transfer. A repeater resonator may be used to change, distribute, concentrate, enhance, and the like, the magnetic field generated by a source or another resonator of a wireless power system. A repeater resonator may be used to guide magnetic fields of a source resonator around lossy and/or metallic objects that might otherwise block the magnetic field. A repeater resonator may be used to eliminate or reduce areas of low power transfer, or areas of low magnetic field around a source. A repeater resonator may be used to improve the coupling efficiency between a source and a target device resonator or resonators, and may be used to improve the coupling between resonators with different orientations, or whose dipole moments are not favorably aligned.

An oscillating magnetic field produced by a source magnetic resonator can cause electrical currents in the conductor part of the repeater resonator. These electrical currents may create their own magnetic field as they oscillate in the resonator thereby extending or changing the magnetic field area or the magnetic field distribution of the source.

In embodiments, a repeater resonator may operate as a source for one or more device resonators. In other embodiments, a device resonator may simultaneously receive a magnetic field and repeat a magnetic field. In still other embodiments, a resonator may alternate between operating as a source resonator, device resonator or repeater resonator. The alternation may be achieved through time multiplexing, frequency multiplexing, self-tuning, or through a centralized control algorithm. In embodiments, multiple repeater resonators may be positioned in an area and tuned in and out of resonance to achieve a spatially varying magnetic field. In embodiments, a local area of strong magnetic field may be created by an array of resonators, and the position of the strong field area(s) may be moved around by changing electrical components or operating characteristics of the resonators in the array.

In embodiments, a repeater resonator may be a capacitively loaded loop magnetic resonator. In embodiments a repeater resonator may be a capacitively loaded loop magnetic resonator wrapper around magnetic material. In embodiments, the repeater resonator may be tuned to have a resonant frequency that is substantially equal to that of the frequency of a source or device or at least one other repeater resonator with which the repeater resonator is designed to interact or couple. In other embodiments, the repeater resonator may be detuned to have a resonant frequency that is substantially greater than, or substantially less than the frequency of a source or device or at least one other repeater resonator with which the repeater resonator is designed to interact or couple. Preferably, the repeater resonator may be a high-Q magnetic resonator with an intrinsic quality factor, $Q_r$, of 100 or more. In some embodiments, the repeater resonator may have quality factor of less than 100. In some embodiments, $\sqrt{Q_s Q_r} > 100$. In other embodiments, $\sqrt{Q_d Q_r} > 100$. In still other embodiments, $\sqrt{Q_{r1} Q_{r2}} > 100$.

In embodiments, a repeater resonator may include only the inductive and capacitive components that comprise the resonator without any additional circuitry for directly or physically connecting to sources, loads, controllers, monitors, control circuitry and the like. In some embodiments the repeater resonator may include additional control circuitry, tuning circuitry, measurement circuitry, or monitoring circuitry. In embodiments, repeater resonators may be inductively coupled to tuning, sensing, powering, control, at the like circuitry. Additional circuitry may be used to monitor the voltages, currents, phases, inductances, capacitances, and the like of the repeater resonator. The measured parameters of the repeater resonator may be used to adjust or tune the repeater resonator. A controller or a microcontroller may be used by the repeater resonator to actively adjust the capacitance, resonant frequency, inductance, resistance, and the like of the repeater resonator. A tunable repeater resonator may be necessary to prevent the repeater resonator from exceeding its voltage, current, temperature, or power limits. A repeater resonator may for example detune its resonant frequency to reduce the amount of power transferred to the repeater resonator, or to modulate or control how much power is transferred to other devices or resonators that couple to the repeater resonator.

In some embodiments, the power and control circuitry of the repeater resonators may be powered by the energy captured by the repeater resonator. The repeater resonator may include AC to DC, AC to AC, or DC to DC converters and regulators to provide power to the control or monitoring circuitry. In some embodiments the repeater resonator may include an additional energy storage component such as a battery or a super capacitor to supply power to the power and control circuitry during momentary or extended periods of wireless power transfer interruptions. The battery, super capacitor, or other power storage component may be periodically or continuously recharged during normal operation when the repeater resonator is within range of any wireless power source.

In some embodiments the repeater resonator may include communication or signaling capability such as WiFi, Bluetooth, near field communications, and the like that may be used to coordinate power transfer from a source or multiple sources to a specific location or device or to multiple locations or devices. Repeater resonators spread across a location may be signaled to selectively tune or detune from a specific resonant frequency to extend the magnetic field from a source to a specific location, area, or device. Multiple repeater resonators may be used to selectively tune, or detune, or relay power from a source to specific areas or devices.

The repeater resonators may include a device into which some, most, or all of the energy transferred or captured from the source to the repeater resonator may be available for use. The repeater resonator may provide power to one or more electric or electronic devices while relaying or extending the range of the source. In some embodiments low power consumption devices such as lights, LEDs, displays, sensors, and the like may be part of the repeater resonator.

Figure 15:
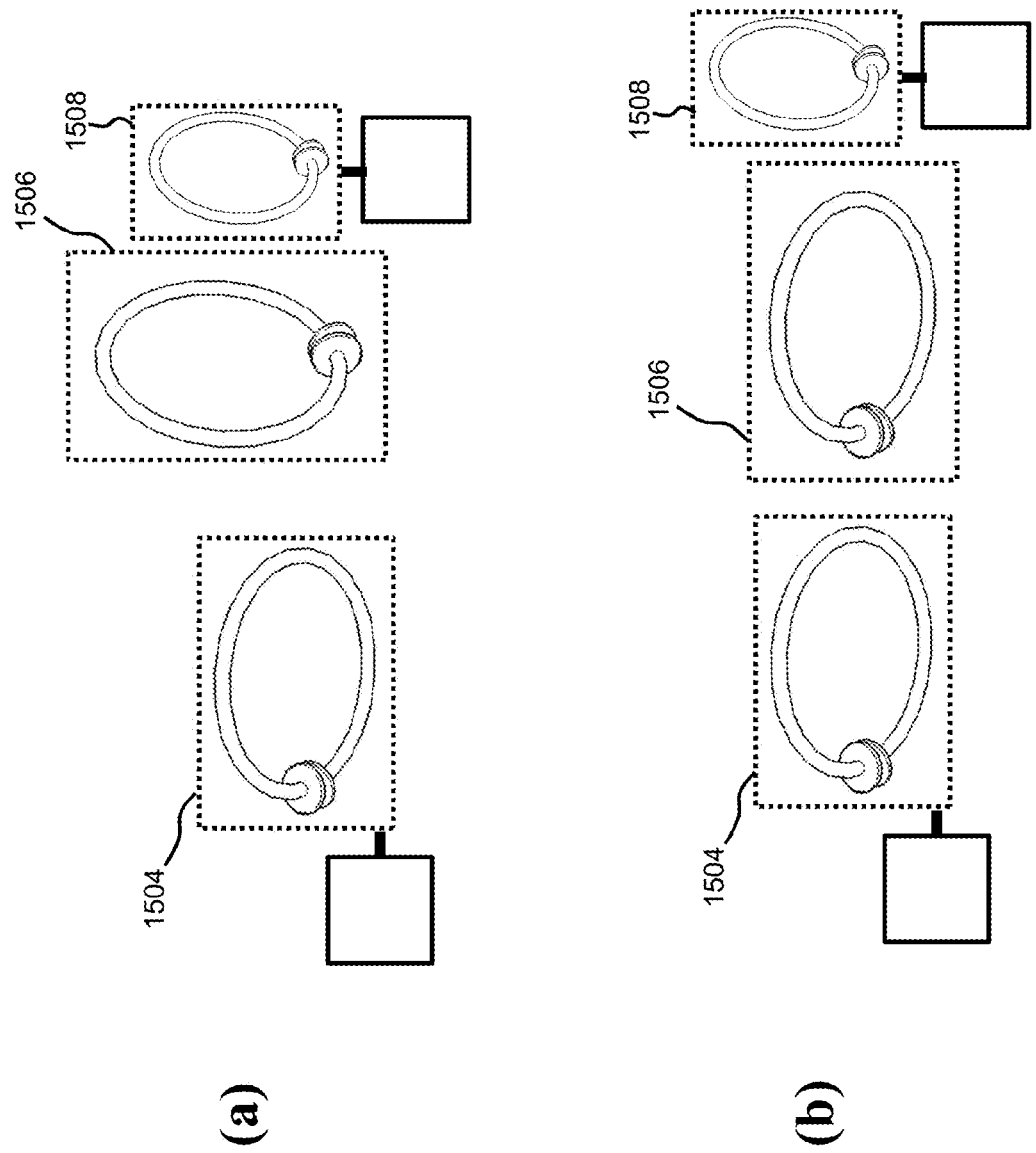
FIG. 15(a), (b) are diagrams showing two resonator configurations with repeater resonators.

In some embodiments a repeater resonator may be used to improve coupling between non-coaxial resonators or resonators whose dipole moments are not aligned for high coupling factors or energy transfer efficiencies. For example, a repeater resonator 1506 may be used to enhance coupling between a source 1504 and a device 1508 resonator that are not coaxially aligned by placing the repeater resonator 1506 between the source 1504 and device 1508 aligning it with the device resonator 1508 as shown in FIG. 15(*a*) or aligning with the source resonator 1504 as shown in FIG. 15(*b*).

Figure 16:
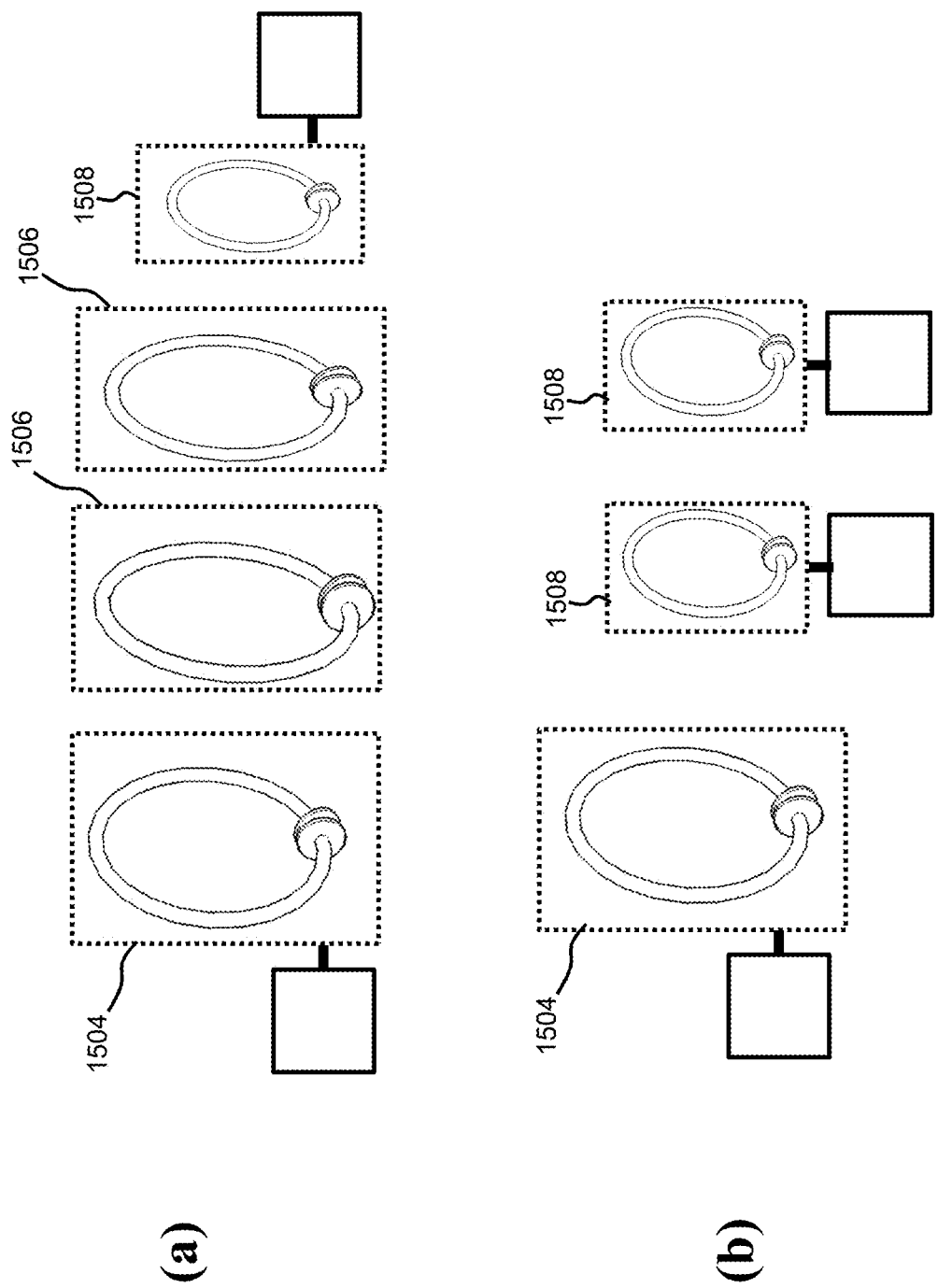
FIG. 16(a) is a diagram showing a configuration with two repeater resonators.
FIG. 16(b) is a diagram showing a resonator configuration with a device resonator acting as a repeater resonator.

In some embodiments multiple repeater resonators may be used to extend the wireless power transfer into multiple directions or multiple repeater resonators may be arranged one after another to extend the power transfer distance as shown in FIG. 16(*a*). In some embodiments, a device resonator that is connected to load or electronic device may operate simultaneously or alternately as a repeater resonator for another device, repeater resonator, or device resonator as shown in FIG. 16(*b*). Note that there is no theoretical limit to the number of resonators that may be used in a given system or operating scenario, but there may be practical issues that make a certain number of resonators a preferred embodiment. For example, system cost considerations may constrain the number of resonators that may be used in a certain application. System size or integration considerations may constrain the size of resonators used in certain applications.

In some embodiments the repeater resonator may have dimensions, size, or configuration that is the same as the source or device resonators. In some embodiments the repeater resonator may have dimensions, size, or configuration that is different than the source or device resonators. The repeater resonator may have a characteristic size that is larger than the device resonator or larger than the source resonator, or larger than both. A larger repeater resonator may improve the coupling between the source and the repeater resonator at a larger separation distance between the source and the device.

In some embodiments two or more repeater resonators may be used in a wireless power transfer system. In some embodiments two or more repeater resonators with two or more sources or devices may be used.

Repeater Monitoring and Control

A user or installer of a wireless energy transfer system may be faced with the task of setting up a system, which may include one or more sources, one or more devices, and/or one or more repeaters. During installation or use of the wireless energy transfer system, the one or more sources, devices, and repeaters may need to be adjusted for optimizing energy transfer efficiency or any other parameter of the wireless power transmission system. In some embodiments, the one or more sources and devices may be installed or otherwise positioned once while the one or more repeaters may be positioned freely. The user can activate, position, or otherwise adjust repeaters to optimize power efficiency or any other parameter of the wireless power transmission system.

Figure 17:
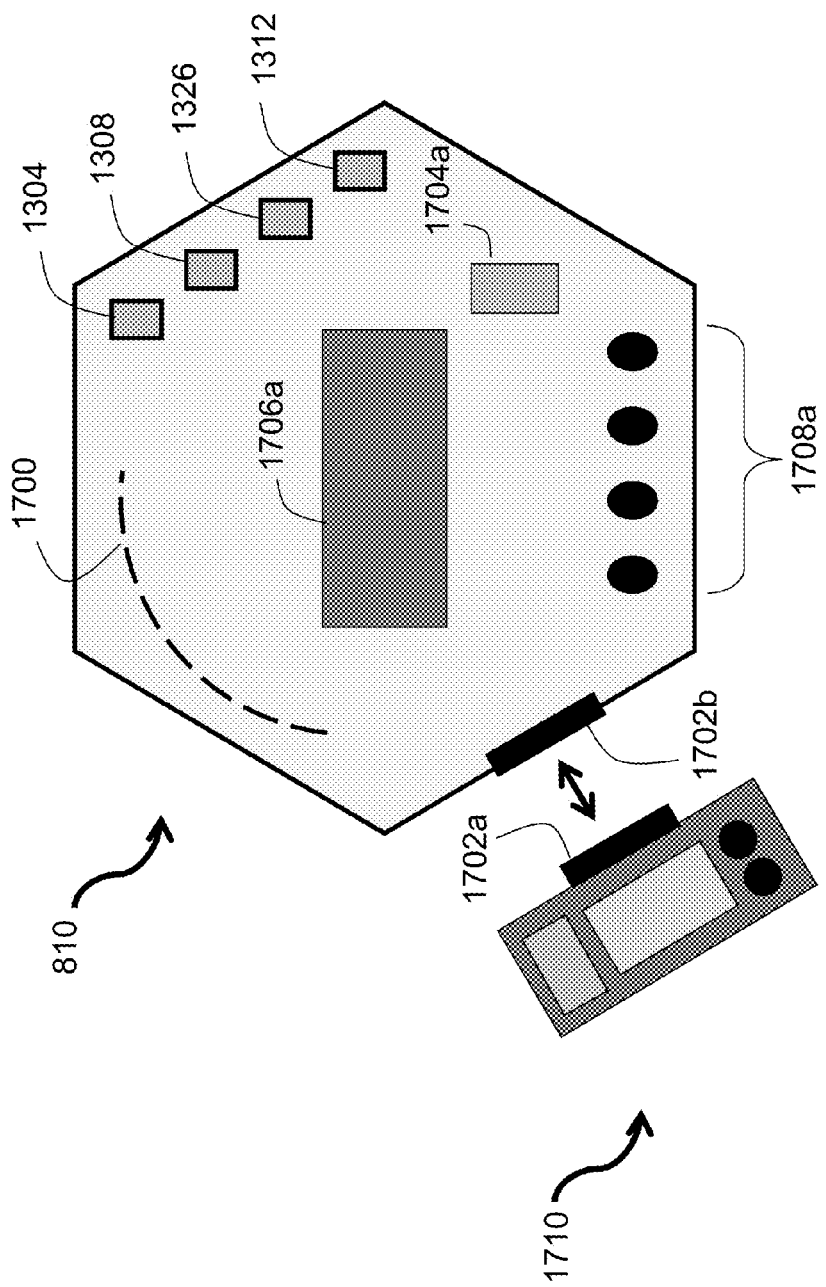
FIG. 17 shows an exemplary repeater and a repeater programmer.

FIG. 17 shows an embodiment of a repeater 810, which may be configured to allow wireless energy to "hop" amongst a set of resonators. The repeater 810 can include a resonator coil (shown as a dotted arc 1700 in the figure signifying a portion of the coil within the repeater housing) configured to relay wireless energy and a control module 1304 configured for control and monitoring of the repeater 810 components. The control circuitry of module 1304 may be configured, for example, to cause the repeater 810 to decrease power harvesting by adjusting circuitry associated with the resonator in order to disrupt power harvesting. The decrease in power harvesting can be accomplished by methods such as adjusting the circuitry of the resonator to cause detuning of the resonator and/or opening a circuit so that electricity does not flow along its otherwise intended path.

The control circuitry 1304 can be controlled by at least one manual control of a set of manual controls 1708a such as a knob or on/off switch provided on the housing of the repeater 810. In one embodiment, this manual control can be used to allow a user to manually tune the resonance frequency of a repeater 810, and the repeater can display how much power is being harvested (or stored) using a display 1706a in order to assist the user in manually tuning/detuning the repeater 810. Alternatively, a communication module 1308 may be provided which is configured to send and receive wired or wireless control signals that cause the circuitry of the modules of the repeater 810 to be controlled. In this manner the repeater can be turned on and off using an external device such as a PPC 1002 using wireless communication 1308, 1308 or may be controlled by signals communicated using a port 1702b, wherein the port is configured allow physical connection to a PPC 1002 that is configured to monitor and control the repeater 810.

When the control circuitry 1308 is configured to monitor a characteristic of the harvested and/or stored power, it can be further configured to provide this information to a display 1706a or by communicating with a PPC 1002, or a remote transmitter 802 of a power network. The repeater 810 may be configured with a power storage module 1326 configured for storing wireless power according to a power management protocol. The power management protocol may dictate storing power during times when it is unlikely that other devices 806 will use power generated by the wireless power field generated by the repeater 810. These power storage interval times may be coded into the memory 1312 of the repeater 810 which may be compared to time values of a real time clock of the CPU of the control module 1304. The power storage interval times may be stored in a remote wireless power transmitter 802 which may send control commands to the repeater 810, or may be stored in a control/monitoring accessory 210 that has a port 1702a that may be configured to be attached to the port 1702b of the repeater 810. The power storage module 1326 may also be configured for storing wireless power according to a remote signal that may be sent from a device 806 which it may normally power. For example, a device 806 such as a TV may send a control signal to the repeater 810 when the TV is turned on or turned off and the repeater 810 can store the energy it receives only when the TV is turned off. In this manner the TV power needs are not interfered by the repeater operations related to recharging its power supply 1326.

A control/monitoring accessory 1710 can provide certain advantages in various embodiments of the present invention. For example, the repeater 810 can be manufactured to be relatively simple such as only having a resonator, adjusting circuitry for adjusting the wireless power harvesting, and communication circuitry for communicating through the port. Various other components which may exist in the repeater can instead exist within a control/monitoring accessory 1710. The control/monitoring accessory 1710 can be attached to the port 1702b acutely in order to adjust the repeater and then can be disconnected. Alternatively, a control/monitoring accessory can be attached to a simple repeater for a longer interval in order to provide increased functionality during that interval. In embodiments, the capabilities and/or functionalities of a repeater resonator may be temporarily, intermittently, periodically or permanently altered by a dongle accessory which may be connected to the repeater module in a wired or wireless fashion.

A repeater may be "associated" with a single device 806 such as a TV in this exemplary embodiment. This association may occur by programming communication modules 1308 of the repeater 810 and the communication modules 1308 of the harvester 806 of the device 806 to communicate with each other. When a repeater 810 is associated with a device 806, then it may operate to only modify its operation based upon communication with the particular device 806 and to ignore other wireless signals from other devices. In this manner a repeater 810 can serve as a dedicated wireless power supply for a device 806. A repeater 810 can also be controlled by wired signals which may be communicated from adjacent system components through its port 1702b. For example, a device 806 such as a TV mounted on a wall, may have wired connection to the ports 1702b of two repeaters 810 on the wall and may send control commands over the wired connection to the repeaters 810 that harvest wireless energy sent from a remote transmitter 802.

Both the monitoring and control circuitry of the control module 1304 of the repeater 810 can be configured so that the circuitry can be programmably modified. For example, the module 1304 can be modified to only monitor the repeater 810 during certain times, or can be modified to monitor the circuitry of the repeater 810 and only send signals using the communication module to a remote device 806 or transmitter 802 when certain conditions occur. In one embodiment the monitoring circuitry of the control module 1304 may be programmed to monitor temperature using an environmental/location module 1322 and to send a signal to a remote transmitter 802 if the temperature is a below or above a range for which the repeater 810 may operate well. This feature provides the advantage that the remote transmitter 802 may not waste energy transmitting energy when the repeater 810 is not able to efficiently harvest and/or repeat the energy due to an inappropriate temperature range. Alternatively, the remote transmitter 802 may adjust its transmission characteristics (e.g., increase the amount of energy it sends) in order to compensate for decreased harvesting/repeating efficiency at the repeater 810. The control circuitry 1304 of the repeater 810 can be programmably modified in order to, for example, turn the repeater 810 on and off at different times, or control any other aspect of the repeater's operation.

A remote transmitter 802 can recognize and control repeaters 810 when the control circuitry 1304 of the repeater 810 is further configured to respond to control commands which may be transmitted with an ID. This ID may be hard coded or programmably assigned to the repeater 810. For example, the ID can exist in the memory module 1312 of the repeater 810, and may use RFID technology. When the repeater 810 is further configured with a temperature sensor in its environmental/location module 1324, then the monitoring circuitry of the control module 1304 can be configured so that if the temperature of the room is outside of a certain range that control circuitry 1304 either modifies the circuitry of the repeater 810 to increase energy harvesting/repeating efficiency, halts energy harvesting/repeating, or sends a signal to a remote transmitter 802. Accordingly, the repeater's temperature module 1324 and the control module 1304 can modify the power harvesting operations of the power receiver module 1302, or remote power transmission from a transmitter 802, based upon the data provided by the temperature sensor 1704a of the environmental/location module 1324.

The repeaters 810 can have individual identification numbers provided by electronics, RFID, or labeling disposed on the housing of a repeater (e.g., serial numbers). A display 1706a of a repeater 810 can be configured to display information related to repeater ID information, related to the characteristics, serial number, or model of the repeater 810. The display 1706a can also show data related to wireless power harvesting including current power level, recent statistics related to power harvesting. The display can also display other information calculated in the repeater modules or which may be sent by components of the wireless power system 800 and received by the repeater 810.

The display 1706a can be an LED panel which may display at least one color of light in order to provide lighting, such as ambient room lighting. The display 1706a can also provide signaling by changing colors during certain conditions such as turning green when power is being effectively harvested/repeated or flashing yellow if there is a problem. The repeater 810 may have a sensor 1704a or timer in its control module 1304 in order to provide lighting via the display 1706a only at certain times, such as a light sensor for only emitting light at night. The repeater display may also be configured to display a clock time.

The control electronics of the control module 1304 can be adjusted by a user by means of the set of controls 1708a. This may include including mechanical switches (on/off switch), and "dimmer knobs" which can control such aspects as lighting level, or which can provide for manual tuning of the circuitry associated with the resonator (e.g., adjustable resistors or capacitors).

A wireless power transfer system 800 may incorporate repeaters 810 configured to exchange energy with one or more transmitter 802 resonators, device 806 harvesting resonators, additional repeater 810 resonators or other wireless system components. A repeater 810 may be used to extend the range of wireless power transfer. An oscillating magnetic field produced by a source magnetic resonator can cause electrical currents in the conductor component (i.e. "resonator", "coil", or "secondary") of the repeater 810. These electrical currents may create their own magnetic field as they oscillate in the resonator thereby extending or tailoring the magnetic field area or "distribution" of the transmitted field.

A single repeater 810 or pairs of repeaters as shown in FIGS. 15-16 may be used to tailor, distribute, concentrate, and enhance, the magnetic field generated by a source at the location of the repeater. A repeater 810 may also be used to guide magnetic fields of a source resonator around lossy and/or metallic objects that might otherwise block or perturb, the magnetic field in an undesired manner. The PPC 1002 can assist in situating the repeaters 810 by modeling and then assessing the resulting fields of different candidate locations. A repeater 810 may be used to improve the coupling efficiency between a source and a target resonator. For instance, repeaters can be used to improve the coupling between resonators with differing orientations (buy relaying a projected field onto a plane that is different from the original field), or whose dipole moments are not favorably aligned. A further example is a network where a first resonator is in a null (k=0) of a second resonator, such as two type-A resonators that are perpendicular to each other and with their centers aligned. At that position, there may be little or no coupling between the resonators. A repeater, oriented at some angle relative to both resonators, for example 45 degrees, positioned in the vicinity of the perpendicular pair, provides for energy to now be coupled because the repeater is not in either of the other resonators' null. Using N repeaters situated at angles of 90/N+1, may further improve transmission.

In order to assist in aligning fields, repeaters may be mounted on structures that allow their rotations in the x/y/z plane to occur as per FIGS. 20(a)-(e), and FIGS. 28-30. The structures or sets of repeaters may use an electric motor to change the angle of the repeater, or the repeater coil, in response to commands communicated from a source 802, device 806, or other system component, or in response to data it senses when it automatically tests two or more orientations. When adjusting orientation in response to sensed data, the adjustment module 1318 may operate a protocol which activates an electric motor in order to change the orientation of the repeater. As shown in FIG. 29(a), in one embodiment, a resonator coil of a repeater can be reoriented by a motor in a resonator base 2900, and the angle which produces the best wireless power coupling may be selected, at least temporarily under control of the adjustment module 1318. Likewise, as shown in FIG. 29(b), a repeater

Figure 30:
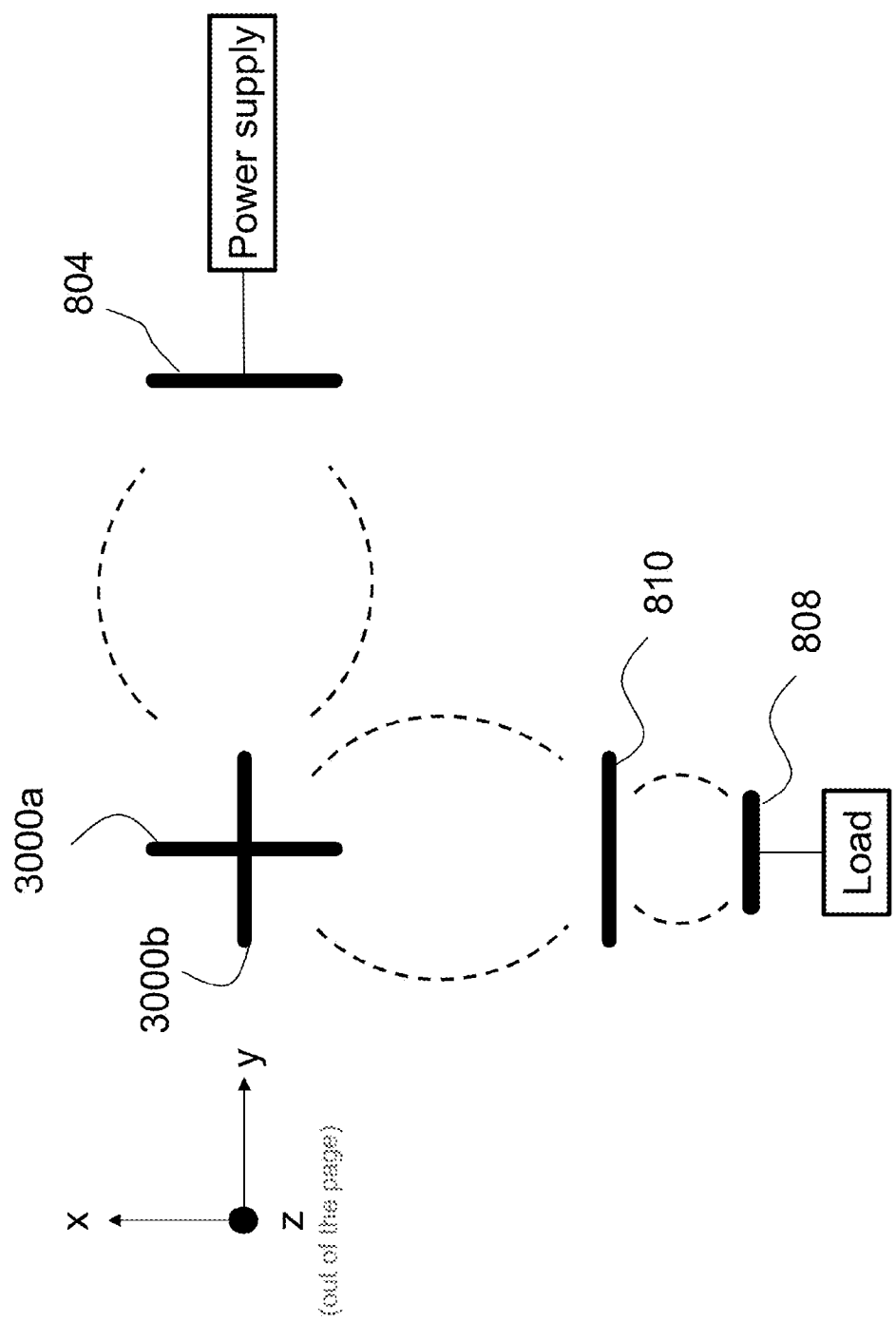
FIG. 30 shows a top view of approximately perpendicular repeaters in a wireless power transfer system.

2904, with a resonator coil 2906, can be attached to a wireless power outlet 1802 (which is described in detail below) through an adjustable resonator base 2908 similar to resonator base 2900. Future adjustment can be made based upon a schedule, where the orientation may be reassessed. Alternatively, there may be three resonator coils 2902a, 2902b, 2902c and one or more coils can be oriented at a particular time, while the remaining coil or coils are static. This paradigm can exist for other components of the wireless network as well. Alternatively, if two repeaters reside within a small particular region, then the network may compare the energy at the two repeaters. If one repeater is able to harvest and relay a field more efficiently then the repeater, or the network, may send a command either wirelessly or over a cable, to the other repeater to detune it, in order to avoid interference or shadow effects. FIG. 30 shows an embodiment of a top-view a repeater with two resonators 3000a and 3000b positioned approximately orthogonal or perpendicular to each other may achieve a better efficiency in wirelessly transferring power from a power supply with source resonator 804 to a load with device resonator 808.

In embodiments, a repeater resonator may operate as a source for one or more device 806 resonators. In embodiments, a device 806 resonator may serve as a repeater if it simultaneously receives a magnetic field and repeats a magnetic field, as may occur when the device 806 is not using power or needs only some of the power it is receiving. Accordingly, a particular resonator of the system may alternate between operating as a transmitting (source) resonator, harvesting (device) resonator, or repeater resonator. The alternation may be achieved through time multiplexing, frequency multiplexing, self-tuning, time-sharing or through a control algorithm implemented by any of the components of the system 800. In embodiments, multiple repeaters 810 that are positioned in an area can be manually or programmably tuned in and out of resonance to achieve a spatially varying magnetic field.

In embodiments, a local area of strong magnetic field may be created by an array of resonators, and the position of the strong field area may be adjusted by changing electrical components or operating characteristics of the resonators in the array. For example, varying the impedance or operating frequency of a set of resonators may allow for the creation of so-called "hot spots" or regions of relatively high amplitude oscillating magnetic fields. It may be useful to be able to change the location of these hot spots. When the network relies upon GPS or location sensing, then the hot spots may be adjusted to track a handheld device which receives the power. If a user places a lamp in a corner of a room, the network may preferentially deliver power to the lamp by creating a hot spot in that corner. At a later time, the user may move the lamp next to a chair, or may turn on a different lamp that is already next to the chair, and it may be preferable for the "hotspot" to follow the user and/or the lamp to the "active" location. In this example, the lamp may send a signal to the network manager 900, a user may use a network controller (such as software in their cellphone to communicates with a network manager 900) to change the hotspot, or the network can be configured to sense the change automatically. Hotspots can also be defined for quadrants of a room or otherwise implemented. A master network manager 900 may operate to tune capacitor networks, resonant frequencies, impedance networks and other network components to adjust the position and power level of the hotspot(s).

Repeater Maintenance

In some applications, changes of parameters related to the operating point of a repeater may create a runaway effect that may negatively impact the performance of the wireless power transfer system. For example, power transfer and operation may heat components of the resonator, such as the capacitors, changing their effective capacitance. The change in capacitance may shift the resonant frequency of the resonator and may cause a drop in power transfer efficiency. The drop in power transfer efficiency may in turn lead to increased heating of components causing further change in capacitance, causing a larger shift in resonant frequency, and so on. The various components of the wireless power system 800 may be able to adjust to environmental changes, and to halt operation and/or provide a visual, auditory, or other signal to a user, or even wirelessly transmit a text message or other digital alarm when the system malfunctions as described above.

In embodiments of a wireless power transfer system, components such as capacitors may be used in various parts of the system. Electrical components, such as capacitors, for example, may be used as part of the resonator and may set the resonant frequency of the resonator. Electrical components, such as capacitors, may be used in an impedance matching network between the power source and the resonator and in other parts of the circuits as described herein. Changes in parameters of the components due to temperature may affect characteristics of the wireless power transfer system such as the quality factor of the resonator, resonator frequency and impedance, system efficiency and power delivery and the like.

In some embodiments the changes in parameter values of components may be at least partially compensated with active tuning circuits comprising tunable components. Circuits which monitor the operating environment and operating point of components and system may be integrated in the design. The monitoring circuits may include tunable components that actively compensate for the changes in parameters. For example, a temperature reading may be used to calculate expected changes in capacitance of the system allowing compensation by switching in extra capacitors or tuning capacitors to maintain the desired capacitance. In some embodiments, open loop control may be utilized. For example, a resonator may have stored a table of capacitance values that should be added or subtracted from the resonator circuits to maintain certain performance criteria as a function of temperature. In embodiments, a temperature sensor may sense the operating temperature of a resonator and a processor may use the temperature reading to control the electrical parameters of a resonator.

In some embodiments, the changes in parameters of components may be compensated with active cooling, heating, active environment conditioning, and the like, and these components may be part of an environmental/location module 1324.

In embodiments, repeaters 810 may primarily function to relay the wireless power fields to adjacent components of a wireless power system 800 from a transmitter 802 in order to extend the reach of the transmitted magnetic field. In embodiments, it may be desirable to turn off a repeater that is to effectively remove it from the wireless power transmission path. In embodiments that comprise multiple repeaters 810, a subset of these repeaters may be turned off in order that the field transmitted by the transmitter 802 is not distributed to unwanted locations. In wireless power systems, potential power paths may be deactivated and/or re-routing by turning repeaters along the path on and off and or by detuning them. The amount of power carried by different paths may be adjusted by adjusting the resonant frequency of repeaters along the various paths. In certain embodiments, it may be desirable to turn off adjacent repeaters to a repeater being calibrated in order to isolate the evaluation of a particular repeater. For these reasons and others, it may be desirable to provide a repeater with an on-off switch as one of its controls 1708a. Further, instead of an on-off switch causing the input module 1316 to break a circuit of wireless harvesting module 1302, it may be beneficial to detune the resonant frequency of the resonator of the module 1302. In embodiments, a PPC 1002 can be configured with a calibration routine that can turn off and/or detune a set of X resonators in order to test a subset of Y resonators where Y is 1 or more.

Repeater Subsets

When using a set of repeaters 810 to provide power to a room, there may be reasons that a user may not want to activate all repeaters 810. For example, as shown in FIG. 9, repeaters 810 can be incorporated into floor or rug "tiles", and these tiles can exist across the entire span of the room. In one embodiment, the entire set of tiles can serve as a set of repeaters, and within this set, there may be at least two subsets. For this example, there is a device 800, such as a lamp in the left corner of the room and this device 806 may be sufficiently distant from the transmitter 802 that it may not receive power directly from the wireless power source. In this example, a set of repeaters may be arranged so that a first subset of repeaters powers the left side of the room and a second subset of repeaters powers the right side of the room. Under certain operating conditions, there may be no reason to activate the second subset of repeaters in order to provide power to the lamp. Unless power is also needed in the right side of the room, the wireless power system 800 may be configured to simply direct power to the first subset of repeaters 810. The subsets of repeaters can define two or more zones of a room, and the zones may be selectively activated.

This network design may have several advantages. For example, providing power to a subset of repeaters rather than an entire set can save power. This may be true for wireless energy transfer system with less than 100% efficiency. Secondly, there may be situations where a fluctuation in the fields of the first subset of repeaters causes fluctuations, detuning, field shaping, and the like in an adjacent second subset. Deactivating zones that are not needed may provide for activated zone(s) that are more stable and/or more efficient.

In embodiments where there may be multiple sources powering different subsets of repeaters, it may be desirable for the fields of the multiple repeater subsets to interact. This could be desirable if there is a large power drain on one of the resonator subsets. In that situation, enabling the fields of the multiple subsets to interact could allow additional power to be directed at the device to be powered. In this case, for example, the excess energy of a first zone might serve as a source or an additional source for a second zone.

Subsets, or individual repeaters 810 of the subsets that define a zone, can be defined by having a user manually turn repeaters 810 on or off using a manual switch on each repeater, or using a repeater accessory 1710 or PPC 1002. Additionally, if the subsets can be programmably defined, then in the case where one or more repeaters is not functioning correctly, the subsets can be dynamically redefined so that new clusters of repeaters are defined for each of one or more subsets.

In one embodiment, a series of four switches are provided on a wall, and these may look like "light switches". If a user switches any of the four switches to "on", then a particular repeater subset may be activated by the switch communicating with a repeater and/or a system manager 900 and/or at least one corresponding transmitter 802, or other system component. For example, the "light switches" may be physically connected to transmitters 802 which power each repeater subset or network components that turn subsets on and off using either physical or wireless signals. The "light switches" may communicate with a computer that serves as a system manager 900 and which has been programmed to activate or de-activate repeater subsets based upon the manual control of a user. The wireless power management system 900 can be a dedicated device that can communicate with a computer and which may be plugged into a wall outlet and may send commands to various components of a wireless power system. The "light switches" can also be similar to a keypad or touch sensitive display with a screen which allows user to adjust which subsets of repeaters or "zones" are "on" or "off" in a room. An embodiment of this setup can be seen in FIG. 18, in which the wall control 1822 is configured in a hard coded, or programmable manner, to control the provision of power to selected devices, or zones in which the devices are located. Unlike a conventional light switch, the control 1822 may be affixed to a wall and communicate power and data signals entirely wirelessly, or the control may be wired. In some embodiments, a first control can control power characteristics of a first zone and a second control can control power characteristics of a second zone.

In one embodiment, the system for providing wireless power may comprise a wireless power transmitter 802 and a set of repeaters 810, and the set may comprise at least two subsets of repeaters. Each subset may contain at least one repeater 810 which may be configured to harvest and/or relay energy from a transmitter 802 and which is further configured to be turned on or off or to be detuned. In one example, turning off a subset of repeaters may cause power to be provided only to a portion of a room rather than the entire room, such as would occur when each of the subsets provides power to half a room. A transmitter 802 can be configured with an input module 1316 which allows a user to determine which of the repeater subsets is active or alternatively, the controller of the transmitter 802 operates a software program in its control module 1304 to determine which of the repeater subsets is active (as may occur based upon a time or date schedule) Alternatively, the transmitter 802 may select the repeater subset based upon a wireless request sent from a remote device 806.

The input module 1316 of the transmitter 802 can be configured in order to allow a user, a device request, or a pre-defined program to redefine which of the repeaters is contained in each of two or more subsets. The controller of the transmitter 1304 can automatically redefine which of the set of repeaters 810 is contained in each of two or more subsets based upon a remote signal sent by a device 806 which requests power and information contained in the controller 1304 such as the most efficient path to provide power to the requesting device 806. Other data that the controller 1304 of the transmitter 802 or the controller 1304 of the wireless system manager 900 may use to define the repeater 810 subsets are: signals sent from remote repeaters 810 or devices 806; calibration date; data related to temperature; historical data related to usage patterns of wireless power within the room; instructions implemented by a computer program; a remote signal having information related to the location of a device that may require wireless power.

Repeater Set Protocols

The wireless power system 800 may have a transmitter 802 that may be configured to transmit wireless power using at least one wireless power transmission protocol, a target device 806 having a receiver 806 configured to receive wireless power, and a first repeater subset and second repeater subset. Each repeater subset can comprise a repeater 810 configured to relay power and to be controlled by at least one component of the wireless energy transfer network 800, such as the transmitter 802 and the receiver 806, in order to realize a repeater set protocol. The repeater set protocol can also be set and realized by a wireless system manager 900.

When the repeater set protocol is implemented by at least the transmitter 802 and repeaters 810, then it can be defined as part of the power transmission protocol implemented by the transmitters control module 1304, and therefore the protocol may be provided under the control of the transmitter 802. Alternatively, the repeater set protocol can be controlled by a target device 806 which interacts directly with the repeaters 810 or indirectly via communication which may be sent to at least one wireless power transmitter 802 which controls the repeaters 810. Such communication can encompass commands related to turning repeaters on or off, or can contain information related to, for example, power usage, location, or other aspects of at least one device 806. The repeater set protocol may also be derived using stored information the transmitter memory module 1312 has about where devices are located in a room, pre-defined hotspots, or may be adjusted using location information which is dynamically sent by target devices 806, or sensed by the network, about the location of devices in the room.

The repeater set protocol can define which repeaters 810 are activated, deactivated (e.g., detuned) and can also determine what paths energy takes when moving from a transmitter 802 to a target device 806. The repeater set protocol can also change the resonant frequency that the repeater set is tuned to. For example, one repeater set can be tuned to a first resonant frequency and a second repeater set can be tuned to a second resonant frequency in order to increase the independence of the two repeater subsets. This may also decrease the propensity for the two repeater subsets from interacting. In that manner, the two repeater subsets can be differentially activated and/or provide power with different characteristics.

The repeater set protocol can be one protocol that is selected from a set of stored repeater subset protocols in the memory module 1312 of a system component. The different protocols may be activated in response to different conditions. For example, the repeater set protocol may be one protocol selected from a set of repeater protocols, said selection being accomplished as a function of time of day or as a function of the results of a calibration routine, whereby more efficient protocol is selected. Such a calibration routine may be accomplished only when setting up the system, or may occur periodically as part of a schedule, or in response to certain events. A calibration routine may be accomplished responsively to a communication signal received due to a change in power being received by a target device. This can be caused by some type of interference of an intervening structure that has entered the room since the last calibration session occurred. The repeater set protocol may contain a default protocol and at least one alternative protocol which may be implemented if the default protocol does not meet a network criterion, such as successfully providing a sufficient amount of power to device 806.

Adjustable and Extendable Resonators and Repeaters

Figure 20:
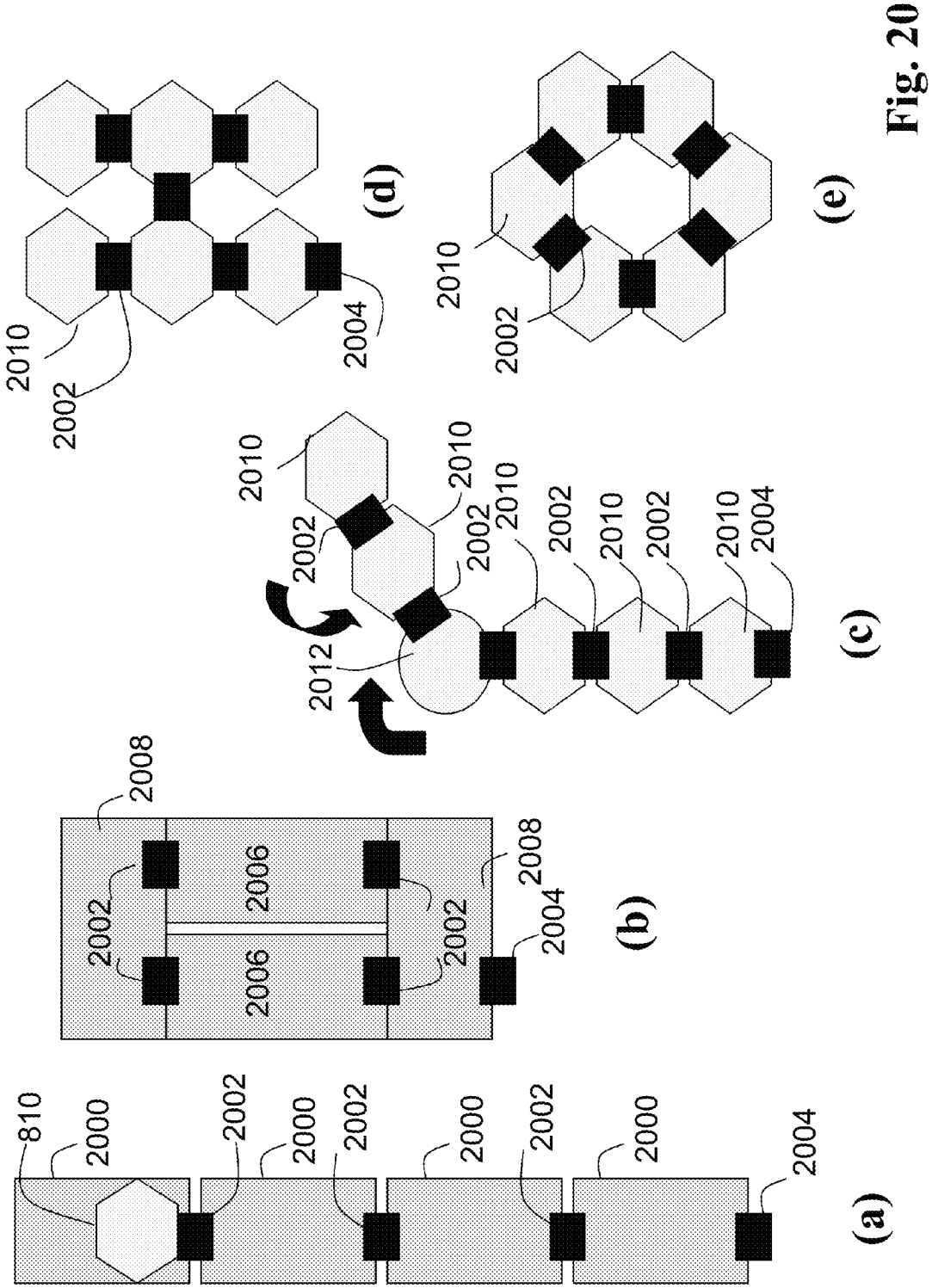
FIGS. 20(a) and 20(b) show block-shaped resonator cells which are configured to be connected by resonator connectors and FIGS. 20(c), 20(d), and 20(e) show pentagon and circular shaped resonator cells which allow for alternative shapes than are realizable from block-shaped resonator cell.
Figure 25:
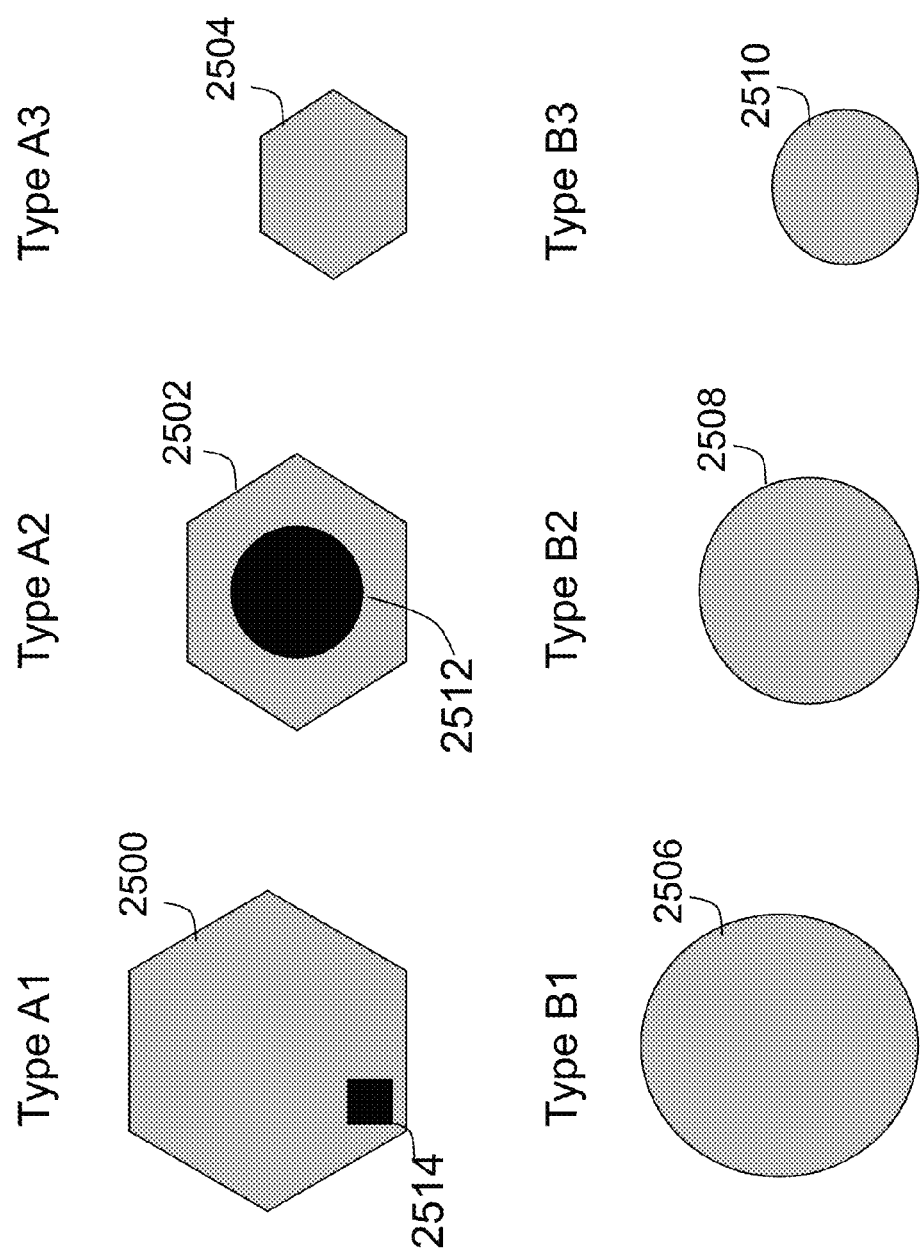
FIG. 25 shows 6 repeaters, 3 repeaters from two different classes of repeater, and the repeaters are provided with modular components which are replaceable.

FIG. 25 shows that system components such as repeaters can be configured in order to accept "resonator replacement modules" 2512, also known as "resonator cells", so that network components can be adjusted to carry different loads or implement different wireless power protocols. Resonator replacement modules 2512 may be cost effective and efficient because these modules may be exchanged within system components in order to change the resonator characteristics while maintaining much, if not all, the other circuitry of the system component. FIG. 25 shows a repeater that is able to accept a plug-in resonator coil in the form of a resonator cell 2512. This modular replacement can also be accomplished for other modules of system components such as the capacitor-cells 2514 also shown in FIG. 25. In addition to the resonator cells being replaceable, they may also be extendable, using a daisy-chain approach as shown in FIGS. 20(*a*)-20(*e*). In the same manner that a laptop can be configured with a regular battery or a long-length battery (which may protrude from the laptop casing), system components can have resonator cells that extend beyond the housing of the components and which may have connections that allow for connection between multiple resonator cells 2512. Such daisy chaining of resonator cells and/or components may be accomplished when components are configured in order to be attached or connected to each as will now be disclosed.

FIGS. 20(*a*)-20(*e*) show repeaters 810 can be configured with connectors so that they (and their corresponding resonator cells 2512) may be daisy-chained. Wireless system components may be physically connected electrically in various serial or parallel configurations. Connectors between components can contain circuitry, sections of coil, and other components for allowing the daisy-chained components to function in an intended manner. In FIGS. 20(*a*)-20(*e*), "field blocks" are used. Field blocks may be used to house resonator cells 2512 or repeaters 810 and may be the same shape as normal repeater 810, but are configured for connecting to other field blocks. When resonators cells 2512 or repeaters are configured with housings having multiple ports and fasteners that allow them to be daisy chained, then the use of field blocks may not be needed. However, for purposes of illustration, the following embodiments will rely upon the use of field blocks.

Figure 31:
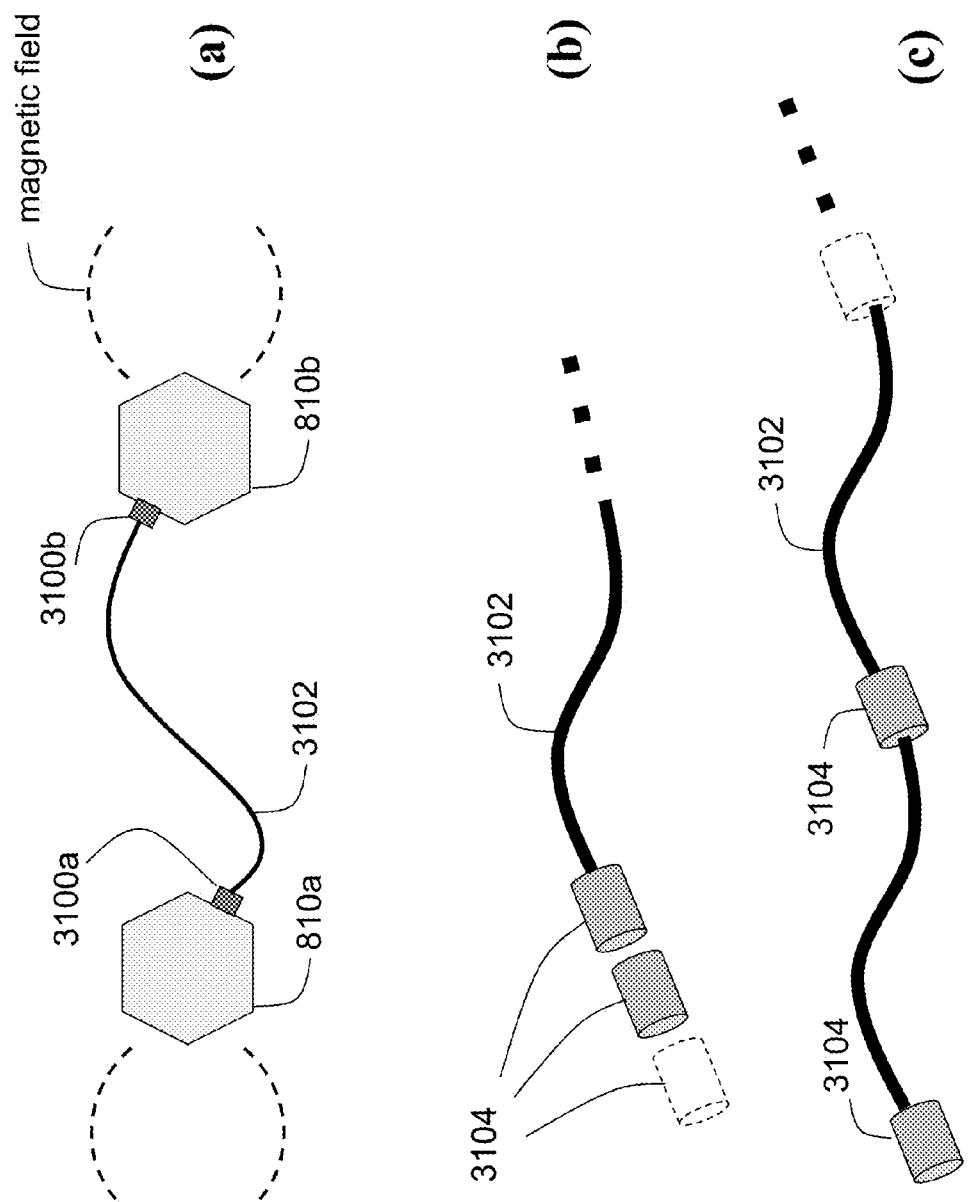
FIG. 31(a)-(c) show embodiments of a connector cable to connect resonators.

In FIG. 20(*a*), a set of 4 field blocks 2000 are shown in an elongated arrangement and are electrically connected by field block connectors 2002, which may contain electrical connections for connecting sequential field blocks in a serial or parallel manner. The top field block 2000 is shown housing a repeater 810 and this can be the case in all the other field blocks as well (not shown). A field block terminator 2004 may allow the field-block structure to be connected to a device such as a transmitter 802 or other component of a wireless network. Accordingly, the field block structure may serve as a set of resonators and/or resonator components that can greatly increase transmission or reception. The field blocks and field block connectors can be connected with physical connectors which simply provide physical and/or electrical connection or may also be provided with capacitive components such as those embodied in the port connectors shown in FIG. 31 and FIG. 32.

FIG. 20(*b*) shows field blocks configured for connection at middle regions 2008, or configured for connection at each end 2006. The field blocks 2006 and 2008 may be electrically and/or physically connected by connectors 2002.

FIG. 20(c) shows hexagonal field blocks 2010 connected to each other by connectors 2002, and a circular connector block 2012 that allows rotation of the connector blocks around the circumference of the field block housing in order to adjust the angle between its two connector blocks 2012.

FIGS. 20(d) and 20(e) are alternative embodiments of field block structures.

When repeaters 810 are configured with more than one connection port, the repeaters can be arranged and daisy chained using connectors 2002. The typical field block therefore may have at least two ports so that it can be connected to at least one device using its first port and one other field block using its second port. Further, the resonators within each repeater may be electrically connected to create a larger resonator structure.

Figure 21:
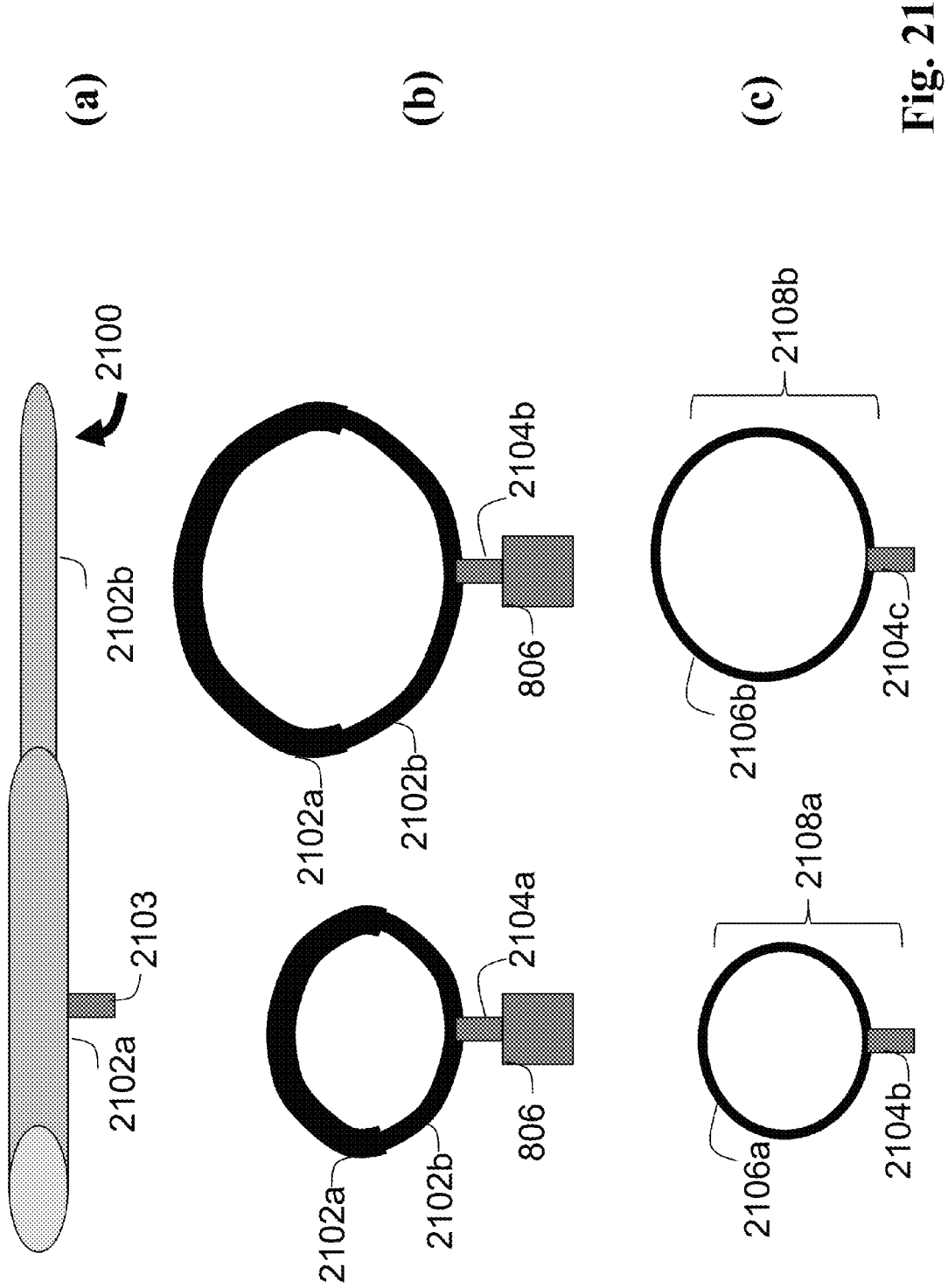
FIG. 21(a) shows a resonator that is configured with one end that is shaped to be slid through the second end in order to produce a resonator of variable circumference.
FIG. 21(b) shows two resonators of FIG. 21(a) deployed to particular circumferences and FIG. 21(c) shows two different fixed circumference resonators which are configured with connecting mechanisms which allow the resonators to work as intended when plugged into devices with the connecting mechanisms.

Instead of increasing the transmission or reception structure through daisy chaining accomplished with ports, the resonators in the system 800 may be configured to be adjustable. For example, the wireless power system 800 can use at least one resonator coil that is configured to enable the circumference of a resonator coil to expand and contract. FIG. 21(a) shows a resonator tube 2100 with a proximal portion 2102a and distal portion 2102b having two different circumferences. In order to create a coil loop, the proximal portion 2102a is slid through the distal portion 2102b. A loop of a particular circumference may be formed by sliding the first portion 2102a of the coil through the second portion 2102b until the desired circumference is obtained. FIG. 21(b) illustrates resonator tube 2100 of FIG. 21(a) configured into a smaller loop or a larger loop. Friction may be relied upon to cause the resulting loop to maintain its circumference, or alternatively, various fasteners may be incorporated in order to preserve a selected shape (not shown).

The capacitor and other circuitry which communicates with the resonator tube 2102a, 2102b may be adjustable, or programmable, and can be contained in a resonator base 2104a. Resonator bases 2104a, 2104b may be configured to be plugged into a resonator coil on one side, and the other side may connect with other components of the wireless power system such as a transmitter 802, or harvester 806, or wand 1114 of a PPC 1002. Resonator bases 2104a may contain an adjustment module 1318 in order to work with particular resonator coils. Additionally, resonator bases may be configured to automatically adjust to different resonator coils so that the user may experience plug-and-play functionality. The connectors used by the resonator bases may be adapted to engage only with certain types of connectors 2103 of the resonator coil.

FIG. 21(c) shows two resonator modules 2108a, 2108b containing resonator coils 2106a and 2106b which are of fixed circumference and which contain resonator bases 2104b and 2104c. The resonator bases 2104b, 2104c allow the coils to be plugged into system components. This may occur without adjustment being needed. For example, since the coil 2106a is smaller than 2106b, the resonator bases 2104b, 2104c will have appropriate capacitance circuitry so that either resonator coil 2106a, 2106b can be plugged into a system component without much adjustment making them approximately plug-and-play.

In alternative embodiments, the wireless power system and user of the system may change the size, shape, or length of the resonators or otherwise adjust the physical dimensions of the resonators. One manner is by utilizing resonators that are interchangeable with other resonators selected from a set of compatible resonators. FIG. 21(c) is an illustrative example of this principle and shows two resonators with circumferences of different sizes which are further configured with resonator bases 2104b, 2104c, which may have circuitry for allowing devices to be connected. The resonator bases 2104b, 2104c may be provided with impedance or capacitance circuitry that is appropriate for their respective resonator's characteristics. Accordingly, the different resonators of a set of resonators related to a compatible resonator class may be plugged into various devices without additional adjustment by a user. A set of resonators may include at least two resonators and each resonator can comprise a resonator coil and a resonator base (adapter) which may be configured to attach to a device and to also electrically connect the resonator coil to the wireless energy harvesting circuitry of the device. Each of the resonators may also be configured with a resonator base that may be configured to engage the wireless energy transmitting circuitry of a source. The resonator bases can also contain adjustable components which may be manually adjusted, such as at least one switch that can be toggled to set the impedance at different values. Impedance adjustment can also operate automatically by a circuit of the resonator base, or this can be programmably adjusted, for example by a PPC.

Figure 22:
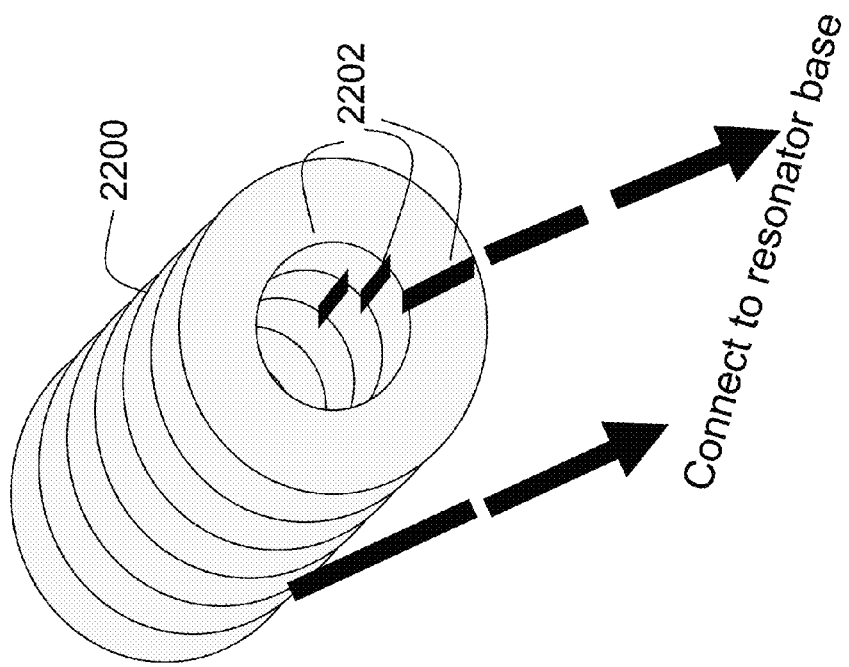
FIG. 22 shows the daisy chainable components of a wireless power coil.

In the case where resonator coils may be changed, re-arranged, or extended (e.g. via daisy chaining), then the circuitry which connect to these coils may be adjustable to compensate for changes related to the adjustments made to the coils. FIG. 22 shows a resonator coil configured with multiple loops 2200 configured for serial daisy-chaining to create an extended helix. The loops may be connected in series or in parallel or in some combination of series and parallel, and the input and output connections to the ensemble may be attached to a resonator base. The multiple loops can be connected with physical connectors which simply provide physical and electrical connection or may also be provided with capacitive components such as are embodied in the port connectors shown in FIG. 31 and FIG. 32.

Figure 23:
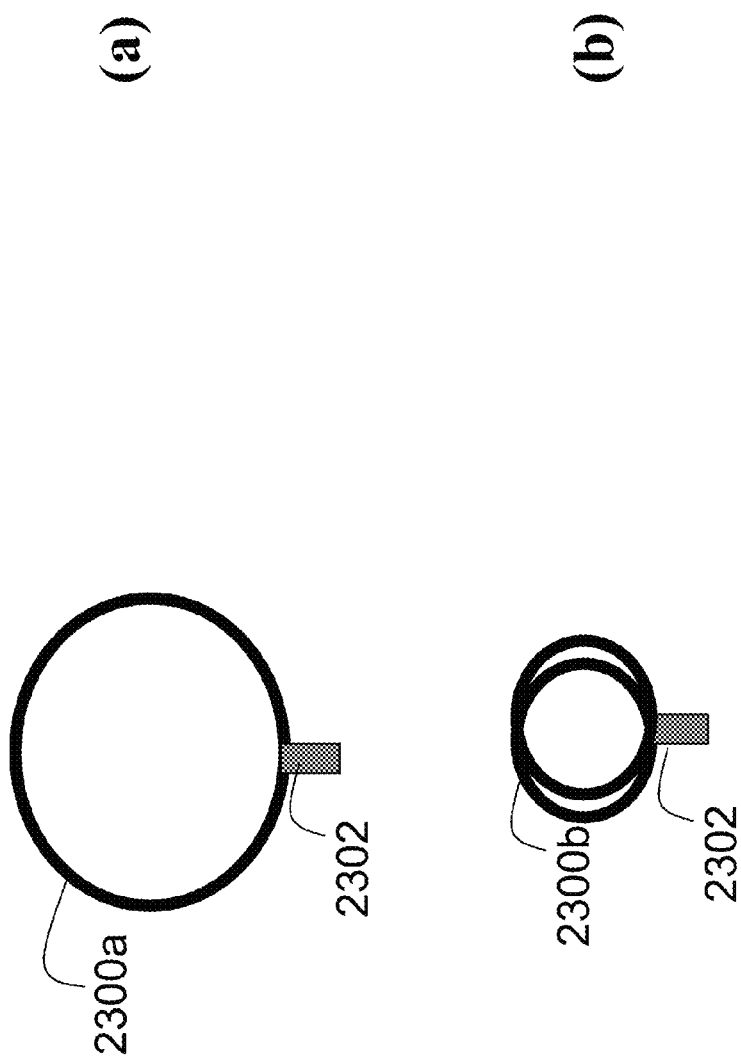
FIG. 23(a) and FIG. 23(b) show embodiments of a reconfigurable resonator coil.

FIG. 23(a) shows an alternative embodiment of a resonator 2300a configured to enable one coil with a larger circumference to be reconfigured as multiple smaller coils 2300b, as seen in FIG. 23(b). The resonator coil base 2302 may have electronics which allow capacitance and other characteristics of the circuit to function properly both when the resonator coil is in the "folded" arrangement shown in FIG. 23(b) and the "expanded" arrangement shown in FIG. 23(a).

Figure 24:
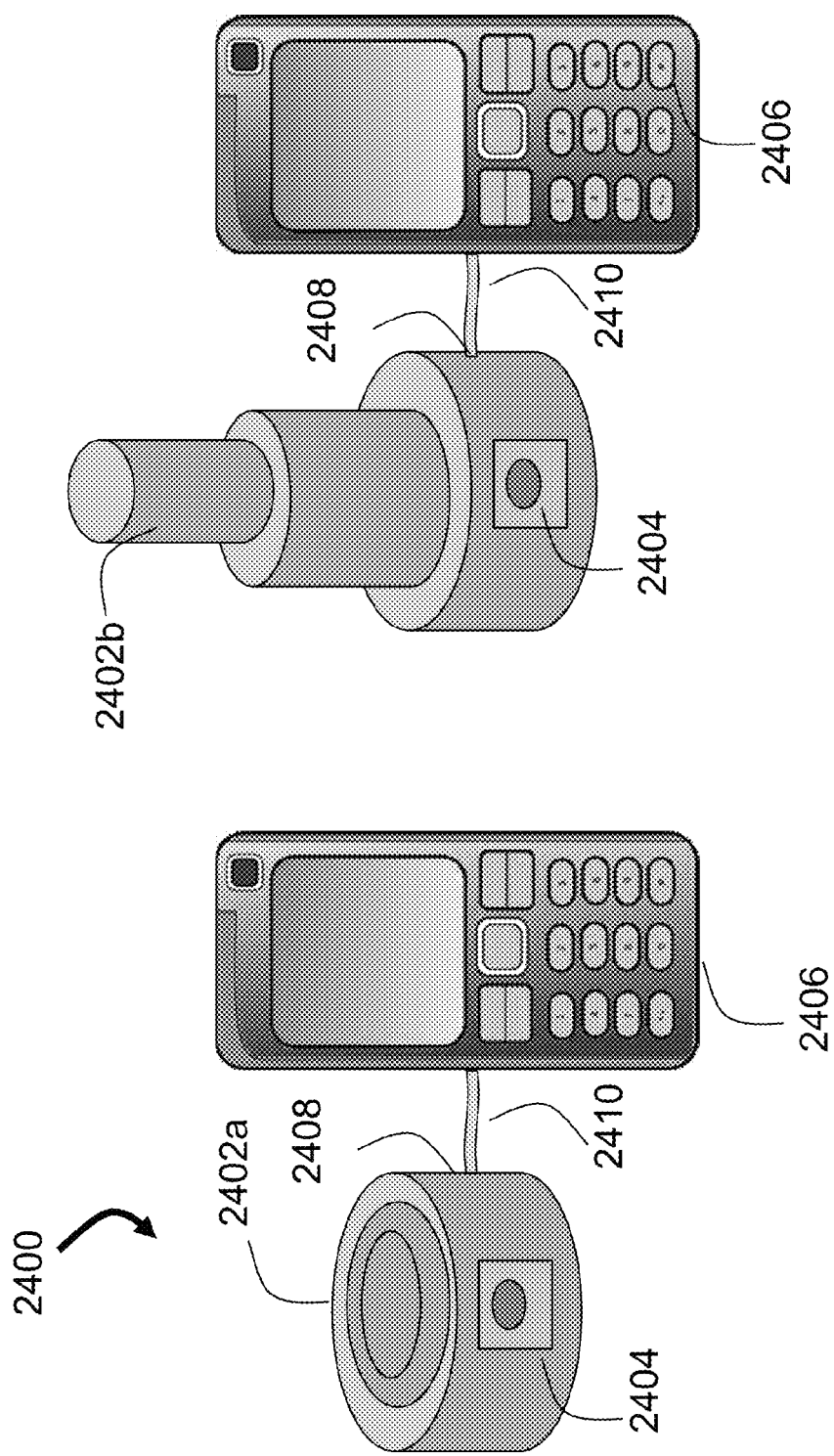
FIG. 24 shows a reconfigurable telescoping resonator and a manual control.

FIG. 24 shows an exemplary telescopic resonator coil accessory 2400. The resonator coils can be configured as a harvesting device which may be a telescopic resonator coil accessory 2400 having an expandable housing 2402a, 2402b and a manual control 2404 which allows a user to adjust circuitry related to harvesting, such as a variable capacitor. The expandable housing can also contain power circuitry 1326 that may communicate with a connector port 2408 that allows for a wired connection 2410 for connecting to a device 806 such as a cellphone 2406, and providing that device with power. If the cellphone 2406 is configured for wireless power reception then the telescopic resonator coil accessory 2400 may also be configured to operate as a type of wireless repeater.

Wireless System Component Class Types

A first system class of wireless power 800 can comprise a wireless power transmitter 802 which has a single resonator 804 which may be configured to work with a first class of system components. A second system class can also comprise a wireless power transmitter 802 which has a single resonator 804 which may be configured to work with a second class type of system components. Alternatively, a transmitter 802 can be configured to work with either the first or second class of resonator (and either resonator can be plugged into the transmitter 802) and either the first or second class of system components. In other words, a transmitter 802 may be designed to operate in conjunction with a first class of system components, which are configured to operate in a first operating environment, or a second class of system components, which are configured to operate in a second operating environment. In this embodiment, the first and second operating environments may be sufficiently different that the first class of system components would, when operated in the second environment, produce a network error. A network error can be, for example, a system in which some of the components operate below a network efficiency criterion (e.g., power transmission is below some threshold amount such as the network operating at 80% of the expected efficiency). Another example of a network error would occur if a power system component of a first class would have an increased risk of becoming damaged, or the occurrence of actual damage.

FIG. 25 shows two classes of power system components, which in this example are repeaters 810, for use in a wireless power system 6. The two rows are representative of first and second class system components. The top row shows three Class A repeaters, of Type A1 (2500), A2 (2502), and A3 (2504). The bottom row shows three class B repeaters of Types B1 (2506), B2 (2508), and B3 (2510). In this example, Class A repeaters are designed to be used indoors (with the corresponding temperature ranges), while Class B repeaters are designed to be used outdoors, (with corresponding temperature ranges, environmental conditions, and the like). These exemplary embodiments are given to illustrate the idea of classes but not to limit how the classes might be implemented in any way. For example, Class C repeaters may be a subset of Class B repeaters and may be designed to be used outdoors in the summer. Other system classes can relate characteristics of the power system such as power level, operating frequency range, dipole moment orientation, unshielded and shielded, incorporation of magnetic material, weatherproofed, submersible, configured to be used in medical environments, configured to be used in surgical environments, configured to be used in higher magnetic field environments, configured to be used in highly lossy environments, and the like.

Continuing with the exemplary embodiment of repeater classes illustrated in FIG. 25, in addition to Class A or B, the components shown in FIG. 25, have further have subclass designations. In this embodiment, the numeric designation (of 1, 2, or 3) reflects how close the neighboring repeaters should be for example. That is, since Class A, Type 1 repeaters 2500 are larger than Class A, Type 3 repeaters 2504, Class A1 may work best as long as adjacent components are within a certain distance, say D1, of the Class A1 repeater. Class A3 repeaters on the other hand, may work best when adjacent components are within distance D3, where D3<D1. Alternatively, or in addition to this type of designation, there can be additional types such as Class A1-1-1, where the final value is a class, for example, relating to the range of power that is to be relayed by the system. In this manner, components of a wireless power system can be created to work as intended with other system components of the same class. In embodiments, the classification of repeaters and other elements in a wireless power system may make it simpler to order, design, deploy, maintain, and the like wireless power networks. For example, the classification of repeaters may easily identify mismatched components in systems. In some cases, mismatched components may not work well together, such as if the wireless repeaters are tuned to substantially different operating frequencies. In other embodiments, mismatched components may increase the cost of wireless power systems such as if a repeater class intended to relay large current loads were deployed in a system intended to provide a slow trickle-like charge to a consumer electronic device, such as a cell phone for example.

A system 800 class may be designed to be used indoors and be highly efficient within a selected temperature range that does not vary by more than, for example, +/−20 degrees C. In this case, the design goal may be to provide sufficient efficiency operation within a limited temperature range. A second class of system components can be configured to be used outdoors, where the temperature range across a season is larger than that which occurs indoors. In this case, the goal may be reliably providing power across a larger range of temperatures, with efficiency as a secondary consideration. In order to improve the performance of the outdoor system, there can be two outdoor system classes, one for the summer and one for the winter, and each class may be designed to operate within an associated range.

In one embodiment, the user can replace the summer and winter components. In another embodiment both the summer and winter components can remain in position and the components which are not used may be detuned either by the system or manually in order to functionally remove their influence upon the wireless power network. In a third embodiment, the system components may have modules (e.g. resonators) that are designed to work in the summer or the winter, and the modules may be activated according to a network protocol. In this case, a system component may belong to more than one class or subclass.

Different power system component classes can be intended to be used in different countries or regions. For example, a first class can be used in the USA and a second class can be used in England, whereby the components within the USA Class or England Class are optimized to operate in those two regions (taking into account considerations such as mains frequency, 110 or 220 voltage, and differences in regulatory requirements for EMC, EMI and human exposure, etc.). Classes thereby may improve interaction between the wireless network and wired power networks by accounting for the characteristics of wired power used in that region.

A selected power system component may be configurable to operate as more than one class. For example, system components can have replaceable modules and modules can be replaced to allow system components of one class to function with a different class. A repeater may have a replaceable resonator module 2512 that can be attached to the repeater which will configure the repeater to operate as part of a particular class. In an exemplary embodiment, a system component that is configured to operate with other class A system components can be modified to work with Class B components by replacing a capacitor module 2514, resonator module 2512 (i.e. a modular replaceable coil), or other module of the component, for example.

In another example, if the first class of system is configured to operate between 1 and 5 Watts, and a second class of system is configured to operate between 1 and 10 Watts, then replacing a module of a wireless system component may allow it to function in the other class. Similarly, if a Class 1 system is configured to operate between 5 and 10 Volts, and Class 2 system is configured to operate between 10 and 12 Volts, then replacing a module of a Class 1 component of the wireless energy transfer system 800 may allow it to function as a Class 2 component.

The classes can relate to power levels such as High, Medium, and Low power. In one example, High power repeaters may be rated from 1000 to 100,000 Watts and may contain resonators comprising capacitors rated for 1 kV, 5 kV, 10 kV and/or 100 kV for example. Medium power repeaters may be rated from 100 to 1000 Watts, and may contain resonators comprising capacitors rated for voltages between 100V and 5 kV, for example. In one embodiment, related to classes defined for temperature ranges, it might be specified that for temperature ranges from 0 degrees C. to 40 degrees C., a resonator may require a tunable capacitance range of 10-500 pf when the operating frequency is in the MHz range, and up to 10 of or more, when the operating frequency is the kHz range, in order to maintain the resonant frequency to within a specified range. The range of tunable capacitance needed to keep a resonator within a specified range of resonant frequencies and input/output impedances will depend on the application, the operating frequency, the amount of inductance of the inductive elements of the resonator, the tolerable ranges, and the like. It should be understood that the example ranges and values given here are not intended to be limiting in any way. A second class of repeaters may tolerate a larger variance in the center frequency and so may include a smaller tunable capacitor range for the same temperature range for example. The classes described here can be analogous to specified tolerances on electrical parts. For example, Class A capacitors may be specified to have a stated capacitance value ±10% and may be less expensive that Class B capacitors that have a stated capacitance value ±5%. A user might expect a Class B capacitor to be more expensive and may be willing to pay more money if their application demanded the tighter tolerance. In wireless power networks, users may understand that resonators designed to carry higher power may be larger and potentially more expensive than resonators designed to carry lower power. In embodiments, either through simple design rules and/or through the use of the various user test and deployment modules such as the PPC described herein, users may choose wireless power transmitters, receivers and repeaters based on their classes to achieve certain wireless power transmission system goals.

Additional examples of classes can include different sized conductors, capacitors rated for different voltages, current and/or power levels. Different classes of power system components may be required to be realized within housing that meets certain criterion, which is made of certain material, or which passes certain tests. Different classes may include manually tunable, electronically tunable, remotely tunable or fixed components. Addition classes may specify whether the resonators require authentication and/or passwords for control. We envision that classes of resonators may capture any and all of the designs, design trade-offs, design choices, and the like, described within this and the incorporated references.

Components related to a particular class may be required to adhere to labeling and signaling requirements and guidelines.

Wireless Power Outlet Accessory

The following section describes embodiments of a wireless power outlet. Wireless power outlets may be useful in implementing wireless power near devices, appliances, or other electronics that may still require a wire or cord to draw power. Discussion on wireless power outlets, circuit breakers, and other concepts are described in commonly owned U.S. patent application Ser. No. 13/267,796 published on Apr. 19, 2012 as U.S. publication 2012/0091820A1 and entitled, "Wireless power transfer within a circuit breaker".

Figure 18:
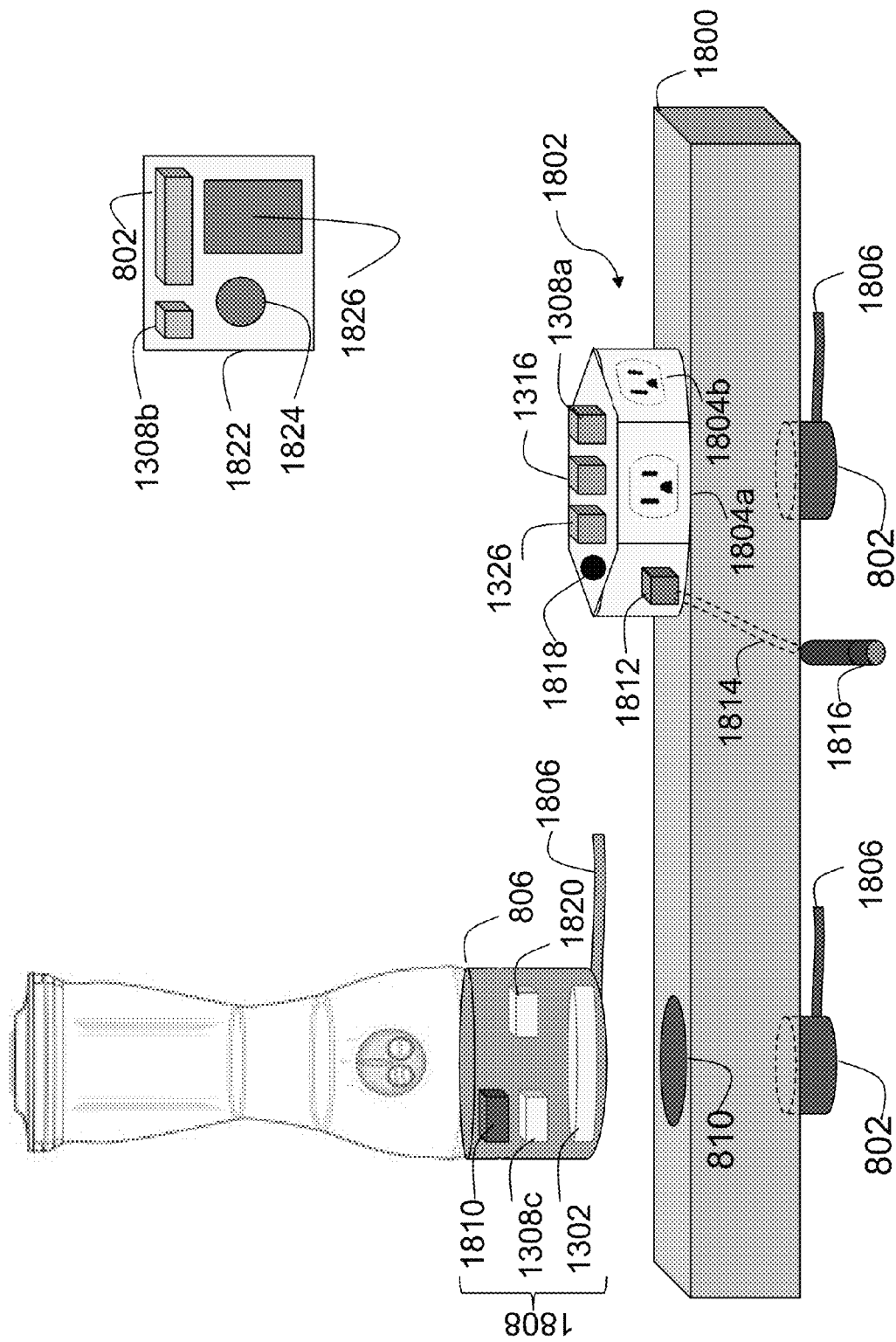
FIG. 18 shows a wireless power system including an outlet accessory and wireless dimmer control. A blender is configured to receive wired power which is harvested using wireless power harvesting.

FIG. 18 shows that wireless power may be transmitted to a device directly from a source 802, after being relayed by a repeater 810, or may be provided in a wired manner after being harvested and transformed to wired power by a wireless power outlet 1802. The wireless power outlet 1802 can have a power receiver module 1302 comprising a resonator configured for harvesting wireless energy and an input/output (I/O) module 1316 which may comprise circuitry for providing power to sockets 1804*a*, 1804*b*. Additionally, I/O module 1316 may include a simple switch that may allow a user to manually turn the wireless power outlet 1802 on and off. The power receiver module 1302 may work with a resonator that is located within the housing of the wireless power outlet, or there may be a port in the housing of the wireless power outlet 1802 which allows a resonator to be connected to the power receiver module 1302. There may also be provided a power module 1326 with power converters, regulator, and circuit-breaker circuitry. The wireless power outlet 1802 may also be configured with a ground connector 1812 to interface with a ground connector link 1814, which can be attached to a ground source such as a water pipe 1816 to provide a ground or "earth connection" for a device which may be powered. Additionally, the wireless power outlet 1802 may have an on/off switch in order to deactivate the sockets 1804*a*, 1804*b*. There may also be provided visual display elements that visually signal to a user whether a wireless power outlet 1802 is supplying power to either or both of the sockets 1804*a*, 1804*b*. The visual display may be part of a display module 1306 which may show information about operation, such as indicating when power has been halted due to an electrical malfunction (of either the outlet 1802 or the device 806), and can also simply show if wired or wireless power is "on" or "off". In order to provide for a wireless power system 800 in which a wireless power outlet 1802 (and a device powered by the outlet) is turned on and off, the wireless power outlet 1802 may be provided with communication circuitry 1308*a* for communicating with a system component such as a transmitter 802 or a wall control unit 1822. A wireless power outlet 1802 may be further configured to provide power wirelessly by serving as a repeater.

The wireless power outlet 1802 may offer a power for devices and/or appliances that may not yet be configured to receive power wirelessly. Accordingly, rather than purchasing new wirelessly powered devices for a kitchen, a consumer may purchase a wireless power outlet 1802 and place it adjacent to devices which are to be powered using a conventional power cord. In this manner, the wireless power system 800 can provide power to conventional devices without a need for adapting the devices to receive wireless power or requiring a consumer to purchase new appliances. The wireless power outlet 1802 can provide the advantage that normal appliances do not have to be modified in order to receive wireless power but rather the outlet accessory can be placed on tables, floors, or other locations around a room where conventional appliances are located and these can be plugged into the outlet accessory.

FIG. 18 shows an embodiment of a wirelessly powered device 806 which is a blender. A device 806 can be configured with a wireless power receiver module 1302 which can harness energy from a wireless power source such as a repeater 810 or transmitter 802. For example, the device 806 can be placed on top of a wireless power source 810 which is located on, or in, a table 1800.

The device 806 can be configured with a power module base 1808 which allows the device to be powered by either a wireless power means or wired means. The device power module base 1808 may be provided with a power cord 1806 (and circuitry for using wired power) which terminates with a conventional A/C plug. Whether the power is derived through wireless or wired means may be controlled by a switch 1810 provided in the device's power module base 1808. The switch 1810 may be manually adjusted or automatically adjusted by circuitry of the power module base 1808.

Because a device 806 may experience an electrical malfunction, it may be important to provide methods for halting the provision of power supplied to a device 806 from a wireless power outlet 1802 or other wireless power source 802. Alternatively, the device 806 may halt the reception of power. Halting power transmission or reception may be essential in order to prevent damage to the device 806 circuitry or to a user.

In a conventional wired configuration, a fuse or circuit breaker can serve to halt the provision of electricity to a device or the reception of electricity by the device. The fuse or circuit breaker can be located either in the device or, for example, in the fuse box of the electrical system of a house. In a wireless embodiment, this may not be the case. Problems may arise if a wireless transmitter continues to provide power to a device which normally would cause a circuit breaker to open with power provided using wired means. Accordingly, there may be methods for allowing a wireless power outlet 1802 or a wireless transmitter 802 which is transmitting power to the wireless power outlet 1802, or to a device 806, to halt power in a manner that is similar to that which occurs when blowing a fuse or "tripping" a circuit breaker.

The wireless power outlet 1802 can be configured with a power module 1326 that has a fuse or a circuit breaker that may protect the device 806 if there is an electrical malfunction in the device 806 or in the wireless power outlet 1802 itself. The wireless power outlet 1802 may be provided with an access area 1818 for a user to replace a fuse or reset a circuit breaker. Further, the device 806 which is powered either by wired means or wirelessly from the accessory 1802 may also have a fuse or a circuit breaker 1820 or other circuit configured to halt the reception of power. For example, a circuit in the power receiver module 1302 may, upon detection of an error condition, detune the resonator of the device 806 so that it stops receiving wireless power.

In a further embodiment, a circuit in the device 806 that responds to the electrical malfunction may also use its communication module 1308c to communicate a signal to the wireless power outlet 1802 which, in turn, may cause a fuse/circuit breaker/de-tuner in the power module 1326, or other module, to halt provision of either wired or wireless power or both.

A wall control unit 1822 may be configured with a transmitter module 1314 or may send signals over a wired connection to a transmitter so that it can directly control wireless power transmission to network components. Alternatively, wall control unit 1822 may be configured with a communication module 1308b that may send (and receive) wireless command signals to network components such as a wireless power outlet 1802. Communication module 1308b may also be designed to communicate with devices, repeaters 810, and/or remote transmitters 802 and other network components in order to turn these on or off, or adjust the amount of power that is being supplied. The power that is supplied to different devices or power zones may be controlled by knobs 1824 on the wall control unit 1822. In other words, the wall control unit 1822 may be configured with a module 1308b for sending and receiving wireless commands related to the on/off state of, or power levels supplied to, wireless system components. In embodiments, a wall control unit 1822 may have functionally akin to a traditional "light switch" or "light dimmer switch".

In exemplary embodiments, the wall control unit 1822 knob 1824 can have an 'on' and 'off'-position which may cause the control 1822 to send commands to a set of one or more wireless system components to toggle the "on" or "off" state, or may be configured with a touch sensitive screen 1826 for providing additional control functionality and display of information to a user. Individual system components can be programmably linked to a particular wall control unit 1822 in a manner which may be determined and customized in a number of ways such as by using a PPC 1002 or wireless system manager 900. The wall control unit 1822 may also serve as a physical switch which can open or close a circuit which provides both wired and wireless power (either directly or by controlling a transmitter 802) to a device or zone. Accordingly, if a dimmer switch of the wall control unit 1822 is turned counter clockwise by a user, a wirelessly powered light may become dimmer, in a number of wireless manners including: a) sending a wireless signal to a lighting device which will then decrease the amount of electricity sent to a bulb, CFL, LED and the like; b) sending a wireless signal to the harvesting circuit of a device in order to cause it to harvest or otherwise provide less power (and this can be accomplished by detuning the resonator in one embodiment); c) sending a wireless signal to a transmitter which transmits power to the lamp device; d) sending a wireless signal to at least one repeater in the path between a transmitter and the lamp device; e) sending a wireless signal to control a zone which supplies wireless power to the lamp device; or f) sending a wireless signal to a system management device 900.

When the wall control unit 1822 is configured to communicate by radio, WiFi, or other wireless signals that are related to values of a dimmer control, then these commands may serve to increase or decrease the amount of power that is being transmitted or received by components of the wireless power system. For example, adjusting the dimmer switch may cause wireless communication between the control 1822 and devices in the room such as a lamp. Accordingly, rotation of the dimmer control will cause the lamp to emit a greater or lesser amount of light.

Returning to FIG. 18, the wireless power outlet 1802 can communicate with the communication module 1308 of a device 806 that has a power module 1326 with a wireless power circuit breaker which can halt electrical power from being supplied to the other modules of the device 806. The circuit breaker can open a circuit and/or can operate to detune the resonator of the device in order to halt electrical power from being supplied to the device 806. The wireless power circuit breaker may also provide a signal, wirelessly, visually, sonically, or otherwise to indicate that it has been "tripped".

As shown in FIG. 18, in one embodiment of a wireless power outlet 1802, a resonator coil 2006b can be reoriented by a motor of a resonator base 2004c, and the angle which produces the best wireless power coupling may be selected, at least temporarily under control of the adjustment module 1318. Alternatively, the resonator base 2004c can be rotated under control of a user. The resonator 2004c base may have additional modules such as a sensing module that is configured with motion or position sensors in order to halt power harvesting if the wireless power outlet 1802 falls on its side.

Figure 19:
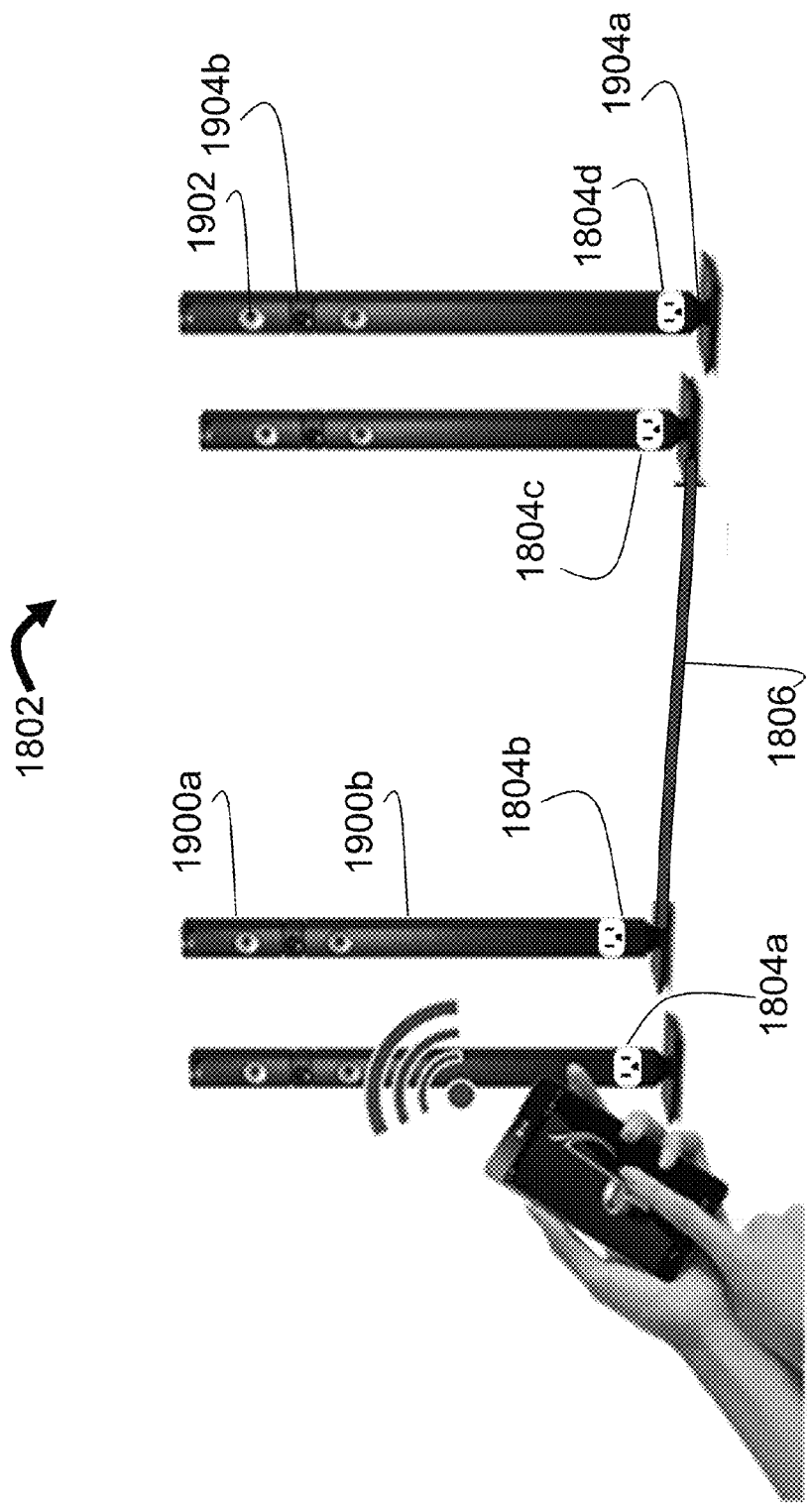
FIG. 19 shows a set of wireless power outlets.
Figure 26:
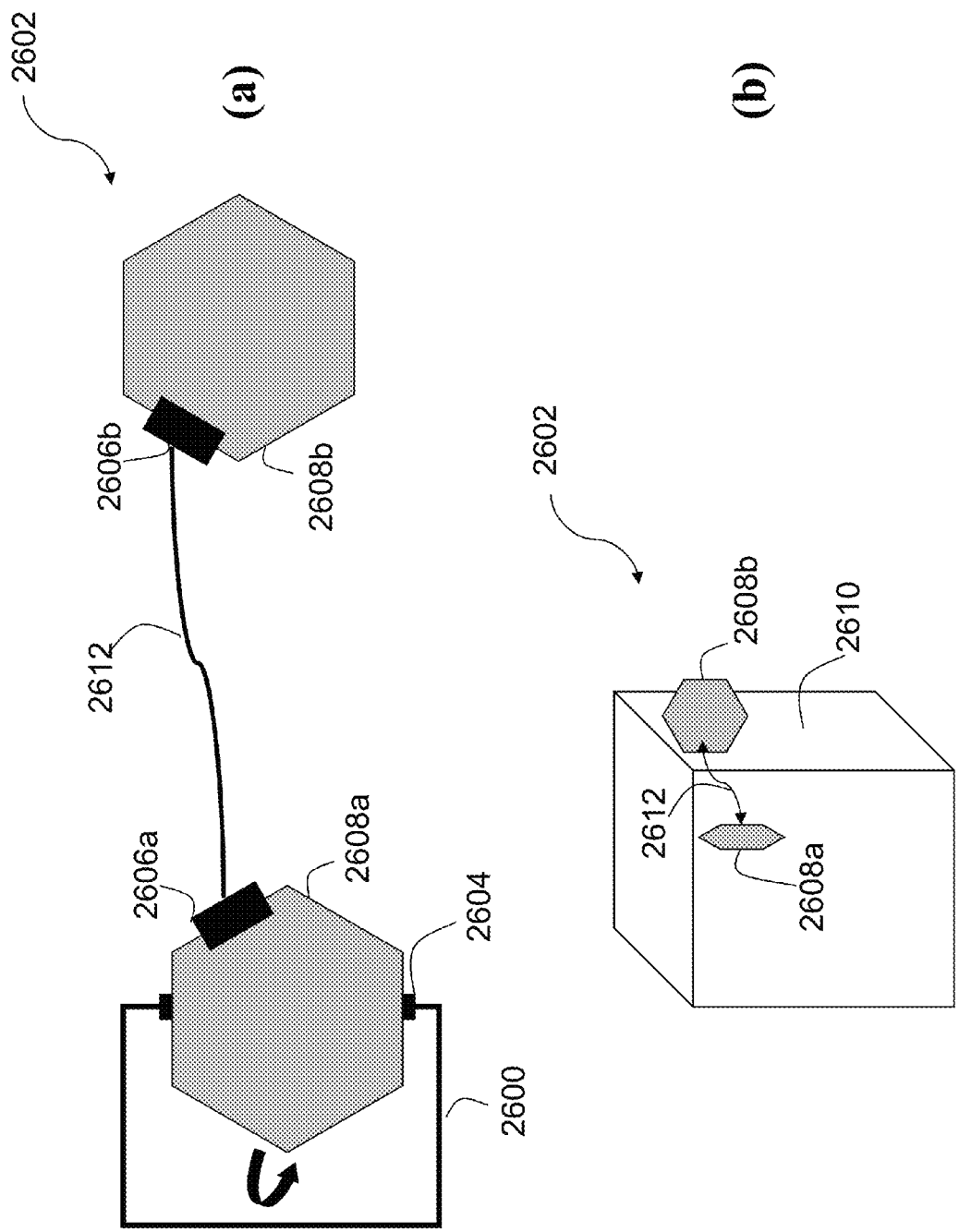
FIG. 26(a) shows an embodiment of a first and second repeater, each configured with a port for allowing signals to be transmitted between repeaters.
FIG. 26(b) shows an embodiment of a first and second repeater configured at a corner of a wall.

FIG. 19 shows, an embodiment of a set of a wireless power outlets 1802. A resonator within the housing element 1900a, 1900b can be oriented by a motor of a resonator base 1904a, and the angle which produces the best wireless power coupling may be selected, at least temporarily under control of the adjustment module 1318. Alternatively, the resonator base 1904a can be rotated under control of a user, either manually or using wireless communication and control signals. The resonator base 1904a or housing may also have at least one port for daisy chaining one or more components of the wireless power outlets 1802 using a cord 1806 which may be configured with plugs and/or connectors on each of its ends. This may occur using a port connector which allows combining resonator coils as is shown in FIG. 26. By daisy chaining the wireless power outlets, the power harvested at each wireless power outlet may be combined and provided to a single socket. FIG. 19 shows a set of four wireless power outlets which may be configured to reside outdoors on an outdoor deck, for example. FIG. 19 also shows that the housing 1900a, 1900b may be compartmentalized. Accordingly, an upper housing 1900a may contain a first resonator and be rotatable using an upper resonator base 1904b and housing 1900b may contain a second resonator that is rotatable using a lower resonator base 1904a. The first and second housing segments may be rotated independently so that the wireless power outlet may receive power from resonators oriented in different directions. This may be useful, for example, to harvest energy corresponding to two different transmitters situated in different locations. In addition to providing power, the wireless power outlet 1802 may include additional accessories, such as lighting, speakers 1902, and electronics configured to work with remotely located stereo equipment.

Wired Resonators

Two or more repeaters can be paired or connected to operate jointly or to have additional function. Paired or connected repeaters can be combined to serve to redirect a magnetic field, enhance power transfer efficiency, mitigate performance impairments in lossy environments, decrease the need for multiple repeaters to be used to span a large distance, provide for increasingly customizable configurations of network components, provide for daisy-chaining components to achieve various power transfer reception or transmission goals, and the like. In an embodiment shown in FIG. 26(a), a wireless power system 2602 comprises at least a first 2608a and second 2608b repeater, each having a resonator and at least a first connector port. Connector ports 2606a, 2606b are configured to allow signals to be communicated through a port connector 2612 and between the first and second repeater. The port connector 2612 may be configured so that at least one electrical contact of the first connector port 2606a can be electrically connected to at least one contact of the second connector port 2606b. In one embodiment, the port connector 2612 may be realized as a cable with a proximal end plug which connects to the first connector port 2606a and a distal end plug which connects to the second connector port 2606b. The port connector 2612 may be configured for communicating a signal between at least one contact of the first connector port and a contact of the second connector port.

Each repeater may be configured with circuitry and modules as shown in FIG. 13. A communication module 1308 may provide for routing electrical signals communicated by the connector ports to at least one intended module of the repeater.

The electrical signals that are sent between the two repeaters 2608a, 2608b may be communication, control, and/or power signals. When these are power signals, they may be electrical signals which are derived from the wireless power signals that are received by the at least first or second repeater. The port connector 2612 may be realized as a cable which connects the two repeaters. Alternatively, the port connector 2612 may comprise elongated resonator structures, realized as a connection that extends between the two repeaters, which serves to connect the two resonators of the first and second repeaters in order achieve various advantages. For example, the first repeater 2608a can serve to harvest wireless power and can relay the power signal to the second repeater 2608b using a port connector 2612 in order to relay power along an intended path. Further, the first repeater can receive a wireless power signal, which it sends, through a port connector 2612, to power a source 802 (rather than a second repeater). The source can then re-transmit a wireless power field. Additionally, the first repeater can harvest a wireless power signal and can send the power to a device 806 connected to the other end of the port connector 2612. Such configurations of connected repeaters or resonators may be advantageous for transmitting a wireless power signal around a corner in the presence of a lossy and/or materials and/or objects, or over larger distances, with minimized loss of field strength (as shown in FIG. 26(b)). For example, walls or parts 2610 of a room may be constructed with lossy materials such as metallic bars, nails, panels, and the like. These lossy materials may decrease the Q of a resonator and therefore decrease power transfer efficiency.

For electromagnetic resonators, extrinsic loss mechanisms that perturb the intrinsic Q may include absorption losses inside the materials of nearby extraneous objects and radiation losses related to scattering of the resonant fields from nearby extraneous objects. Absorption losses may be associated with materials that, over the frequency range of interest, have non-zero, but finite, conductivity, $\sigma$, (or equivalently a non-zero and finite imaginary part of the dielectric permittivity), such that electromagnetic fields can penetrate it and induce currents in it, which then dissipate energy through resistive losses. An object may be described as lossy if it at least partly includes lossy materials.

Additionally, rather than using multiple repeaters which are spaced relatively closely for wireless power transfer, wired resonators may be located at greater distances and achieve a power transfer efficiency that may have been otherwise difficult to attain, while still providing wireless power to devices that are not wired to the repeaters. Therefore, hybrid wireless/wired systems or networks may provide advantages of both cost and performance.

A port connector 2612 may be able to communicate signals across the ports of the repeaters 2606a, 2606b and can allow intended modules of the first repeater and second repeater to work together. The modules may include resonators which are connected by the port connector 2612. The connection allows the resonators of the two repeaters to be electrically connected. When at least N electrical contacts are provided in each port 2606a, 2606b then each of the N electrical contacts can potentially allow an additional repeater to be connected. Additionally, multiple ports or port connectors can be used to connect a repeater to more than one other repeater. Although the port connections allow for daisy chaining of various modules within the repeaters, the connectors may also be configured so that the repeaters may be connected to at least one device 806 as well.

Accordingly, connector port 2606a, 2606b can be configured for connection to one or more devices, to other repeaters, or to one or more sources. Furthermore, the port connector 2612 can be configured to connect the electrical connectors in serial or in parallel. The connector ports 2606a, 2606b, and associated modules of the repeaters, may be manually or programmably configured to interact with other repeaters in either a serial or parallel fashion.

Further, as is shown in FIG. 26, a repeater 2608a may be configured to operate using a wall mount 2600 having attachment members 2604 that rotatably attach to the repeater 2608a in order to allow the repeater to be rotated with respect to at least one axis. In some embodiments, the rotation of a repeater may be controlled by motors, provided upon the wall mount 2600, that are under the control of, for example, a power source 802 and powered by energy harvested by the repeater. In other embodiments, the rotation may be manually adjusted and the repeater may simply remain in a particular position after an adjustment.

At least one wall mount 2600 and at least one connector may be utilized in order to allow two repeaters 2606a, 2606b to relay, harvest, and transmit power in a manner that does not cause their fields to influence each other, or decreases unwanted field interaction. In embodiments, two repeaters may operate by allowing a wireless power field to hop between repeaters. However, when repeaters are aligned in certain manners, they may not share power fields in a favorable manner. One repeater may produce unwanted interference with respect to the field generated by the other repeater. In these cases, the repeaters can be connected by wired means and positioned so that the fields do not interact in an unwanted manner and so that transmission and relay of energy is extended over a longer distance and/or over serpentine paths.

Figure 27:
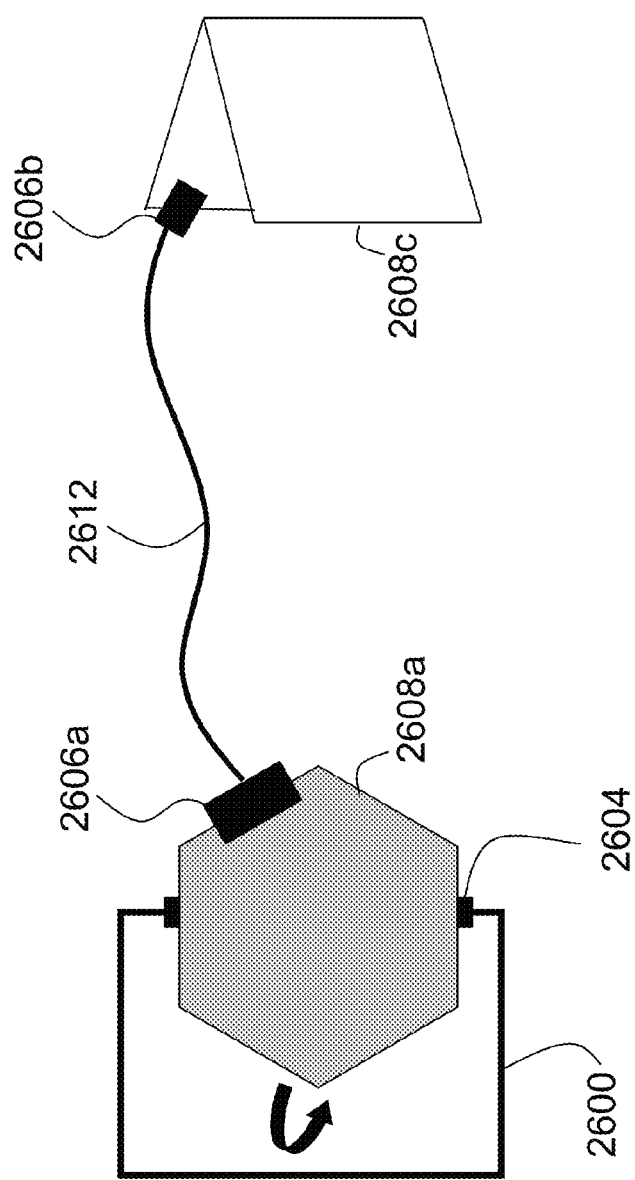
FIG. 27 shows an embodiment where the second repeater is shaped to provide a different magnetic field than that of the first resonator.

A hybrid repeater configuration may be used to transmit power around obstacles that might impact the field in a lossy manner. FIG. 27 shows another embodiment where a repeater may be shaped specifically 2608c to create a magnetic field different than the magnetic field that may have been created by a different repeater 2608b that is configured and positioned to well receive a transmitted field.

A wireless power system may also have two or more repeaters which are configured with connector ports 2606a, 2606b which allow the housings of the repeaters to be physically connected, without necessitating electrical port connectors 2612. In this manner, the repeaters can be physical oriented to achieve certain advantages such as directing and or changing the direction of the dipole moment of the combined resonator system. This embodiment is shown in FIGS. 20(a)-20(e), in the case where some of the connectors 2002 between field blocks 2000 serve to simply physically connect the adjacent blocks and do not have electrical connections for allowing signals to pass between blocks and their components.

Figure 28:
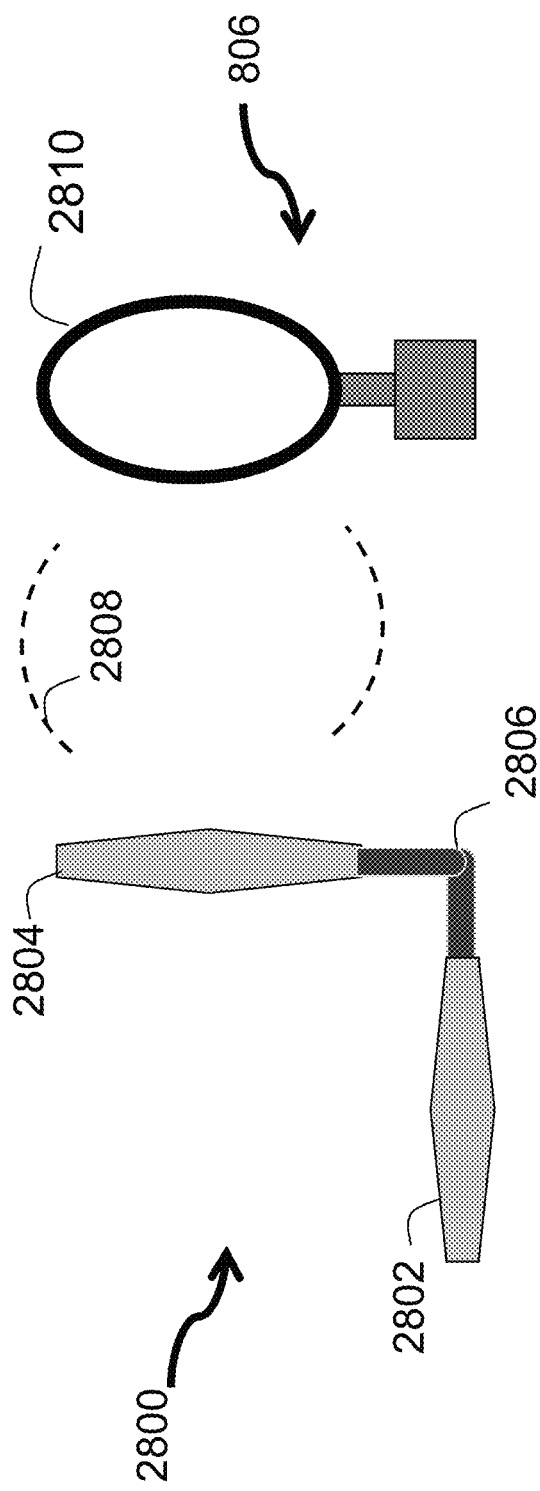
FIG. 28 shows an embodiment of a repeater, which comprises a hinge.
Figure 29:
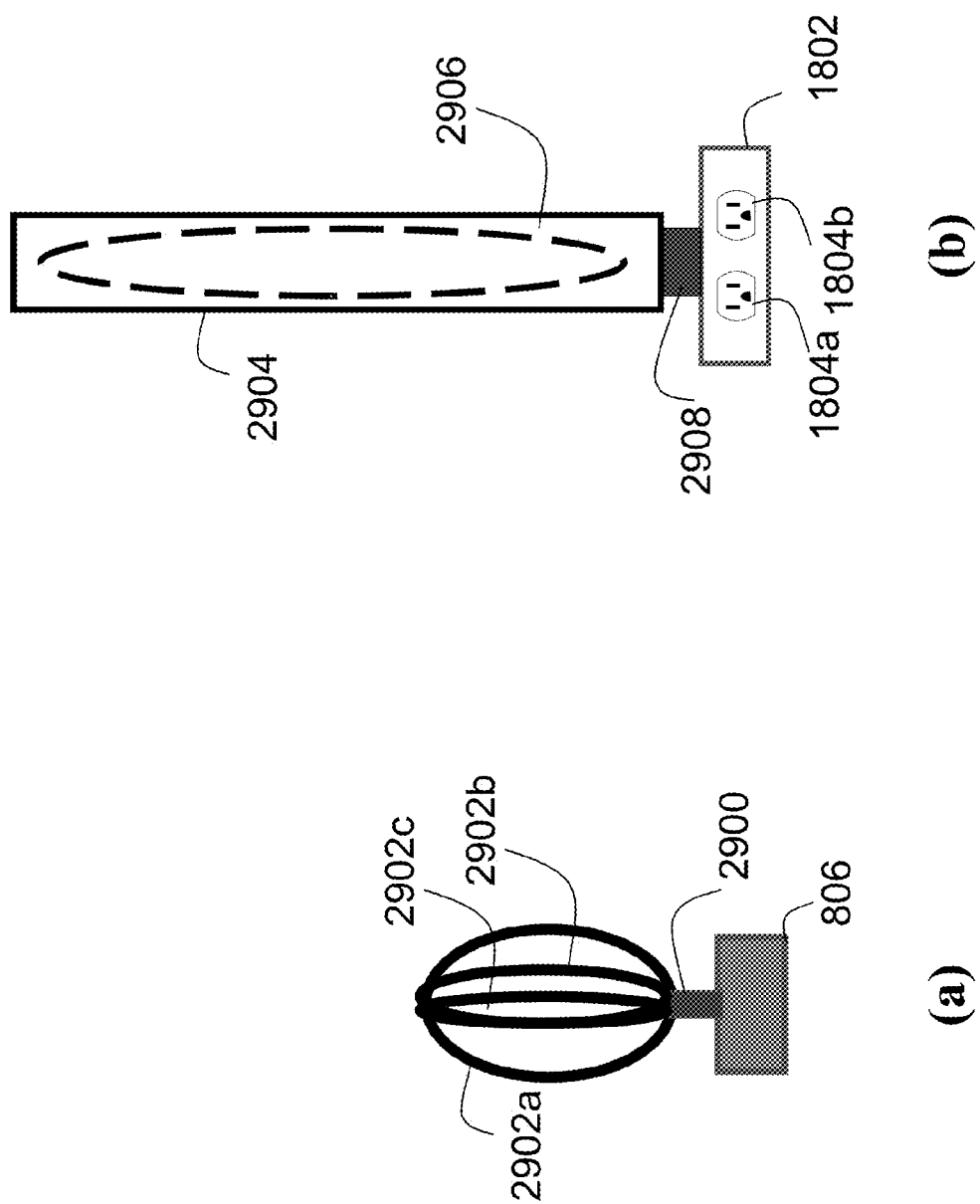
FIG. 29(a) and FIG. 29(b) show embodiments of adjustable repeaters.

FIG. 28 shows a hybrid wired/wireless energy transfer system 2800 in which the first repeater 2802 is magnetically coupled with a repeater. The first repeater 2802 is physically and electrically connected to a second repeater 2804 by a connector 2806 which can be set at different angles and at variable distances. Such a scheme may be advantageous when the device resonator is at a distance that has a significant impact on the coupling rate. The second repeater 2804 may be aligned to magnetically couple 2808 with a device resonator 2810 which may be attached to a device 806. By installing a repeater 2804 that is closer and better aligned with a device 806, the overall efficiency of the wireless transfer system may be maintained at a desired threshold or increased.

In an exemplary and non-limiting embodiment, a resonator connector, such as a port connector 3102 shown in FIG. 31(a)-(c), may be used to create a wired connection between ports 3100a and 3100b of magnetic resonators of a wireless power transmission system, including between one or more sources, one or more repeaters, and/or one or more devices. A resonator port connector may be made of solid, stranded, Litz, coaxial, shielded, insulated, ribbon, or other types of wire or conducting materials to carry electricity between two or more resonators. In some embodiments, shielding a cable may be important to reduce electrical noise as well to reduce electromagnetic radiation that may affect or detune the overall system. In other embodiments, the shield may be made of copper or other type of metal and may act as a return path or a ground for a power, communication, or other signal. In embodiments, the cable used to wire two resonators together may comprise at least one conducting strand, at least two conducting strands or more than two conducting strands. Characteristics and properties of a connector wire may be engineered to be optimized for a specific application of power transfer. These characteristics and properties may include conductivity, capacitance, inductance, resistance, and the like. These properties may change with the length of wire used. In some cases, these properties may need to be adjusted for the length of wire required, types of resonators being connected, properties of the overall power transfer system, and the like. The properties resulting from the wire designed or chosen for a wireless energy transfer system may impact overall power transfer efficiency.

In embodiments, attaching resonators to source power and control circuitry and to device power and control circuitry may include designing impedance matching networks to increase the end-to-end efficiency of a wireless power system. In a similar fashion, attaching two repeater resonators 810a, 810b together with a wired connection may also include designing impedance matching networks to optimize the wired power transfer between the resonators. In embodiments, the impedance matching networks may be realized in the connecting cables themselves. In other embodiments, the impedance matching networks, or segments of impedance matching networks may be realized in adapters 3104 that may be connected to between the resonators and the connecting cable. In embodiments, impedance matching adapters 3104 may be designed to match impedances for certain types of resonators and over certain lengths of cables. In embodiments, a hybrid impedance matching adapter may be designed to compensate for a 1 meter long cable. In embodiments, two such adapters may be connected to a 2 meter long cable connecting two wireless repeaters together in a hybrid architecture as shown in FIG. 31(b).

In embodiments, cables and or adapters may be designed for certain preferred operating modes of a hybrid wired/wireless repeater component. For example, cables and/or adapters may be designed to preferentially route power received from one repeater to drive another repeater. In this manner, the wired repeaters may work asymmetrically and may allow low loss transmission of power in one direction and may frustrate transmission of power in the opposite direction.

In addition, cables and adapters may be designed so that the repeaters on opposite ends of the cables may be optimized for performance at different power levels, at different frequencies, for different operating environments and the like. The adapters and cables may be designed to control voltage and/or current levels within the hybrid system.

Figure 32:
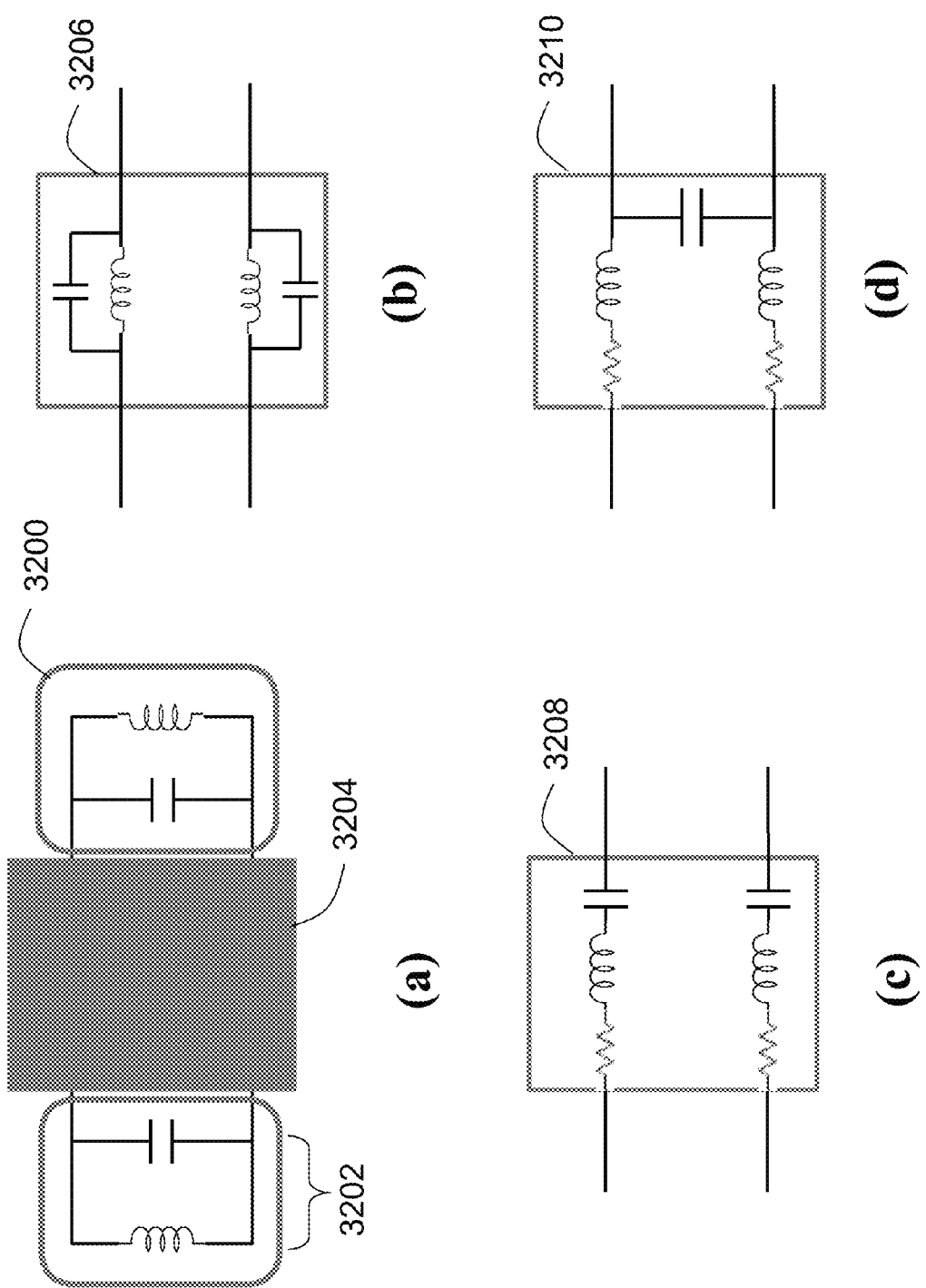
FIG. 32(a)-(d) show embodiments of the design of a connector cable.

In a further embodiment, a resonator connector may be designed so that its intrinsic capacitance, inductance, resistance, and/or conductivity may scale linearly or non-linearly with its length. Various embodiments of the capacitance, inductance, and resistance of the connector cable is shown in FIG. 32. FIG. 32(a) shows two resonators 3202 each in housing 3200 connected via a connector 3204. The capacitance, inductance, and resistance of a connector may be designed as seen in FIG. 32(b)-(d). Elements 3206, 3208, and 3210 are examples of connectors. For example, FIG. 32(b) shows the connector's inductance and capacitance in parallel 3206 while FIG. 32(d) shows inductance and resistance in series while capacitance in parallel 3210 between the two sides of the connector 3204. For example, in installing a hybrid wired/wireless energy transfer system, a user or installer could be tasked with choosing the length of the connection between the resonators. In such an example, if the properties of a wire scaled linearly with length, the user may be able to appropriate a certain length for a connection without further analysis of the system or set of resonators. In some embodiments, a connector wire may be manufactured in segments as shown in FIG. 31(c). These segments may be able to be connected to one another via the terminals. The user would therefore have the option of elongating the length of wire for a particular energy transfer system.

In embodiments, adapters 3104 may also be designed with specific properties such as particular conductive, capacitive, inductive, and/or resistive properties. Such adapters could be used to connect the segments of cable to the resonators to ensure the required value of capacitance, inductance, resistance, and the like for a particular set-up of the hybrid energy transfer system, application, resonator type, etc., was met. In some embodiments, adapters 3104 may be designed for different lengths of wire connectors. In further embodiments, the adapters may be designed such that their properties are additive, multiplicative, exponential, and the like. In such a case, for manufacturing and other reasons, adapters could be designed to have uniform properties and a user would be instructed to use the appropriate number of adapters for a length of wire connector.

In other embodiments, adapters may be designed such that the resulting value of capacitance, inductance, and/or resistance from one terminal to the other terminal of the overall connector is determined by the resonators being connected. In other words, the properties of the connector and/or adapters may be dependent on the resonators achieving resonance.

In still further embodiments, adapters may be designed to cause the capacitive, inductive, and/or resistive values of the overall connector to be added in series or parallel to achieve overall capacitance, inductance and resistive values. In some cases, the overall connector, including segments and adapters, may need to be adjusted according the load or device in the energy transfer system. For example, a device coupling with a repeater or source resonator may cause detuning in other parts of the system, including the resonators that may be connected via a wire connector. In this case, the connector, or a circuit of the communication module 1308 may need to be manually or automatically adjusted to ensure optimal power transfer efficiency.

Another approach to implementing a port connector may be to design impedance matching networks for specific cable lengths, energy transfer systems, frequency chosen to drive the system, environments, and the like. In embodiments, an impedance matching network or circuit may be implemented at a wireless energy transfer component such as a repeater, source, device or other resonator. For example, in a system with two repeaters to be connected, an impedance matching network may be installed in either or both repeaters. In other embodiments, an impedance matching network may be designed or integrated into or on a connector cable. Such a matching network may also be realized in an adaptor for a cable for ease of use and manufacturability.

In some embodiments, the properties of a connector cable or wire can be chosen to tune part or all of the wireless energy transfer system. For example, a quarter wave impedance transformer may be used as a method of impedance matching. In this method, the quarter wave length is a function of the frequency chosen to drive the energy transfer system. For a system being driven at 6.78 MHz, the corresponding wavelength is approximately 44.25 meters. Therefore, the quarter wave length is approximately 11.06 meters with a characteristic impedance Z1. In this method, the impedance transformer provided by the cable or wire is given by $$Z_{in}=Z_1^2/R_{load}.$$

Thus, the impedance can be designed be choosing appropriate lengths of cable.

For some applications, the connector cable or wire may be used additionally as a communication line between resonators or components. This ability may be in addition to power transmission over the same connector or in some embodiments, power and communication signals may alternate in time or space in the connector. In other embodiments, different types of connectors may be chosen for power or communication or other signals; these different types of connectors may fit to the same port. In further embodiments, different ports may be designed in the housings of resonators to accommodate different types of port connectors.

In further embodiments, wired or wireless communication may be used to control, adjust, open, and/or close the wired electrical connection, for example, under control of at least one communication module 1308. In other embodiments, a wireless energy transfer system may comprise a controller that may adjust, open, or close the electrical connection. In some cases, the controller may be an electronic or mechanical and may further allow user input.

Additional embodiments are within the scope of the following claims.

What is claimed is:
1. A wireless power network comprising:
   a. multiple electromagnetic resonators each capable of storing electromagnetic energy at a resonant frequency, wherein the multiple resonators comprise:
      i. a first resonator configured to be coupled to a power source to receive power from the power source;
      ii. a second resonator configured to be coupled to a load to provide power to the load, and
      iii. one or more intermediate resonators, wherein the first resonator is configured to provide power from the power source to the second resonator through the one or more intermediate resonators,
   b. wherein at least a first pair of resonators among the multiple resonators is configured to exchange power wirelessly, and at least a second pair of the resonators among the multiple resonators is configured to exchange power through a wired electrically conductive connection.

2. The wireless power network of claim 1, wherein multiple pairs among the multiple resonators are configured to exchange power wirelessly.

3. The wireless power network of claim 1, wherein multiple pairs among the multiple resonators are configured to exchange power through a wired electrical connection.

4. The wireless power network of claim 1, wherein the multiple resonators comprise a third resonator configured to be coupled to another load to provide power to this other load, and wherein the third resonator receives power from the power source through one or more other resonators among the multiple resonators.

5. The wireless power network of claim 1, wherein each resonator in the second pair comprises a housing containing at least one inductor and at least one capacitor to define the resonant frequency for the resonator, and wherein the wired electrical connection connects to an electrical port connection in each of the housings of the resonators in the second pair.

6. The wireless power network of claim 1, wherein the wired electrical connection comprises a length of capacitively loaded conducting material.

7. The wireless power network of claim 6, wherein the capacitive loading of the conductive material is configured to substantially maintain the resonant frequencies of the resonators in the second pair of resonators when the resonators in the second pair exchange energy through the wired electrical connection.

8. The wireless power network of claim 7, wherein the capacitive loading of the conductive material is configured to maintain the resonant frequencies of the resonators in the second pair of resonators when the second pair of resonators exchange energy through the wired connection to within 5% of the resonant frequencies of the resonators in the second pair, respectively, when the resonators in the second pair are isolated from all other resonators.

9. The wireless power network of claim 7, wherein the capacitive loading of the conductive material scales with the length of the conductive material.

10. The wireless power network of claim 5, wherein each housing comprise a receptacle for removably engaging the length of capacitively loaded conducting material to establish the wired electrical connection.

11. The wireless power network of claim 6, wherein the wired electrical connection comprises a length of a pair of capacitively loaded stranded wires.

12. The wireless power network of claim 1, wherein the wired electrical connection facilitates communication with circuitry within at least one of the resonators in the second pair in order to cause the circuitry to activate, deactivate, or adjust a property of at least one of the resonators in the second pair.

13. The wireless power network of claim 1, further comprising a controller configured to adjustably open or close the wired electrical connection between at least the resonators in the second pair.

14. The wireless power network of claim 1, wherein the wireless power network is deployed in a home to wirelessly power multiple household devices across a range of locations.

15. The wireless power network of claim 1, wherein the resonators in the second pair each comprise at least one loop of conductive material substantially aligned in respective planes, and wherein the respective planes intersect at a right angle to within 30 degrees.

16. The wireless power network of claim 1, wherein the resonators in the second pair are separated by a lossy barrier that substantially reduces wireless power transfer between the resonators in the second pair but does not substantially reduce the wired power transfer between the resonators in the second pair.

17. The wireless power network of claim 16, wherein the barrier comprises a mass of conductive material having a size that is at least comparable to the resonators in the second pair.

18. The wireless power network of claim 1, wherein the second pair of resonators comprises a transmitter and a repeater.

19. The wireless power network of claim 1, wherein the second pair of resonators comprises a first repeater and a second repeater.

* * * * *